(12) United States Patent
Zhang et al.

(10) Patent No.: US 10,110,282 B2
(45) Date of Patent: Oct. 23, 2018

(54) DATA TRANSMISSION METHOD, BASE STATION, AND USER EQUIPMENT

(71) Applicant: Huawei Technologies Co., Ltd., Shenzhen, Guangdong (CN)

(72) Inventors: Jian Zhang, Shanghai (CN); Qinghai Zeng, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 14/709,922

(22) Filed: May 12, 2015

(65) Prior Publication Data

US 2015/0244429 A1 Aug. 27, 2015

Related U.S. Application Data

(63) Continuation of application No. PCT/CN2012/084506, filed on Nov. 13, 2012.

(51) Int. Cl.
*H04W 72/04* (2009.01)
*H04B 7/024* (2017.01)
(Continued)

(52) U.S. Cl.
CPC .......... *H04B 7/024* (2013.01); *H04W 72/042* (2013.01); *H04W 76/15* (2018.02); *H04W 76/20* (2018.02); *H04W 88/06* (2013.01)

(58) Field of Classification Search
CPC .. H04W 76/046; H04W 72/042; H04W 88/06
See application file for complete search history.

(56) References Cited

U.S. PATENT DOCUMENTS

2009/0170524 A1* 7/2009 Yoshizawa ............ H04W 28/16
   455/453
2009/0175214 A1   7/2009 Sfar et al.
   (Continued)

FOREIGN PATENT DOCUMENTS

CN   101965741 A   2/2011
CN   102098725 A   6/2011
   (Continued)

OTHER PUBLICATIONS

Technical Specification Group Radio Access Network; Evolved Universal Terrestrial Radio Access (E-UTRA); Medium Access Control (MAC) protocol specification (Release 10) 3GPP TS 36.321 V10.6.0 (Sep. 2012).*

(Continued)

*Primary Examiner* — Asad Nawaz
*Assistant Examiner* — Zhaohui Yang

(57) ABSTRACT

Embodiments of the present invention provide a data transmission method, a base station, and a user equipment (UE). The method includes: generating, by a first base station, downlink radio link control (RLC) protocol data units (PDUs); and sending, by the first base station, a first part of downlink RLC PDUs in the downlink RLC PDUs to a user equipment UE, and sending a second part of downlink RLC PDUs in the downlink RLC PDUs to a second base station, so that the second base station sends the second part of downlink RLC PDUs to the UE. Hence, the first base station and the second base station are capable of jointly sending data to the UE, thereby improving a peak rate and a throughput of the UE.

8 Claims, 22 Drawing Sheets

(51) Int. Cl.
*H04W 76/15* (2018.01)
*H04W 88/06* (2009.01)
*H04W 76/20* (2018.01)

(56) References Cited

U.S. PATENT DOCUMENTS

| | | | |
|---|---|---|---|
| 2012/0140704 | A1 | 6/2012 | Zhao et al. |
| 2012/0147805 | A1 | 6/2012 | Kim et al. |
| 2012/0196645 | A1* | 8/2012 | Kim ............... H04W 52/36 455/524 |
| 2013/0094431 | A1 | 4/2013 | Terry et al. |
| 2014/0056243 | A1* | 2/2014 | Pelletier ............ H04W 74/04 370/329 |
| 2015/0003418 | A1* | 1/2015 | Rosa ............... H04W 36/0005 370/331 |
| 2015/0282239 | A1* | 10/2015 | Han ............... H04W 76/025 370/329 |
| 2016/0050652 | A1* | 2/2016 | Wu ............... H04L 5/001 370/329 |

FOREIGN PATENT DOCUMENTS

| | | |
|---|---|---|
| EP | 2 509 373 A1 | 10/2012 |
| EP | 2 670 191 A1 | 12/2013 |
| RU | 2388181 C2 | 4/2010 |
| TW | 201008168 A1 | 2/2010 |
| WO | WO 2011/020233 A1 | 2/2011 |
| WO | WO 2011/100492 A1 | 8/2011 |
| WO | WO 2012/101688 A1 | 8/2012 |
| WO | WO 2012/113449 A1 | 8/2012 |
| WO | 2012/133449 A1 | 10/2012 |
| WO | 2012/134567 A1 | 10/2012 |
| WO | WO 2012/136256 A1 | 10/2012 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.0.0, Sep. 2012, 55 pages.

"3rd Generation Partnership Project; Technical Specification Group Radio Access Network; Evolved Universal Terrestrial Radio Access (E-UTRA); Radio Link Control (RLC) protocol specification (Release 11)", 3GPP TS 36.322 V11.0.0, Sep. 2012, 39 pages.

"Discussion on DL coordinated multipoint transmission", Fujitsu, 3GPP TSG-RAN1 #54, Aug. 18-22, 2008, 7 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.3.0, Sep. 2012, 205 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, 325 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.0.0, Jun. 2010, 183 pages.

Yang Lee, et al., "A Combined Handover Scheme for LTE-Advanced System", IEEE, Feb. 19, 2012, p. 154-157.

* cited by examiner

DATA TRANSMISSION METHOD, BASE STATION, AND USER EQUIPMENT

CROSS-REFERENCE TO RELATED APPLICATIONS

This application is a continuation of International Application No. PCT/CN2012/084506, filed on Nov. 13, 2012, all of which are hereby incorporated by reference in their entireties.

TECHNICAL FIELD

The present invention relates to the field of communications, and in particular, to a data transmission method, a base station, and a user equipment.

BACKGROUND

With the respective development of mobile communications and broadband wireless access technologies, services of the two technologies interpenetrate each other. To cater to a demand of broadband mobile communications and to cope with a challenge of mobile broadband communications, the Third Generation Partnership Project (the 3rd generation partnership project, 3GPP) working group raises a higher performance requirement for communications systems, such as, higher requirements for a peak rate and system bandwidth. To meet these requirements, the 3GPP Long Term Evolution Advanced (long term evolution advanced, LTE-A) introduces carrier aggregation (Carrier Aggregation, CA).

In CA, larger bandwidth can be obtained by aggregating multiple continuous or discontinuous component carriers (component carrier, CC), thereby improving a peak data rate and a system throughput, and also solving a problem of discontinuous spectra of an operator. A user equipment (User Equipment, UE) can support aggregation of multiple CCs in uplink and downlink separately, and the CCs may be at a same band (band) or different bands. The CCs aggregated by the UE are provided by a same base station, for example, multiple co-site CCs provided by the base station, or multiple non-co-site CCs separately provided by the base station and a remote radio head (Remote Radio Head, RRH) of the base station.

A conventional LTE-A technology only supports aggregation of CCs provided by the same base station, and CA cannot be performed when CCs of different base stations have a common coverage area. Therefore, a UE located in the common coverage area of the CCs of the different base stations requires a handover (handover) to a cell (cell) in a good radio condition in a moving procedure, and a handover procedure may lead to a service delay or interruption, and reduce a peak rate and a throughput.

SUMMARY

Embodiments of the present invention provide a data transmission method, a base station, and a user equipment, which can improve a peak rate and a throughput of a UE.

According to a first aspect, a data transmission method is provided, including: generating, by a first base station, downlink radio link control RLC protocol data units PDUs; sending, by the first base station, a first part of downlink RLC PDUs in the downlink RLC PDUs to a user equipment UE, and sending a second part of downlink RLC PDUs in the downlink RLC PDUs to a second base station, so that the second base station sends the second part of downlink RLC PDUs to the UE.

With reference to the first aspect, in a first possible implementation manner, the method further includes: receiving, by the first base station from the UE, a first part of uplink RLC PDUs in uplink RLC PDUs generated by the UE, and receiving, from the second base station, a second part of uplink RLC PDUs in the uplink RLC PDUs, where the second part of uplink RLC PDUs are received by the second base station from the UE.

With reference to the first aspect, in a second possible implementation manner, the method further includes: receiving, by the first base station, a first RLC status report from the UE; when the first RLC status report indicates to-be-retransmitted RLC PDUs in the first part of downlink RLC PDUs, retransmitting, by the first base station to the UE, the to-be-retransmitted RLC PDUs in the first part of downlink RLC PDUs; and forwarding, by the first base station, the first RLC status report to the second base station, where the first RLC status report indicates to-be-retransmitted RLC PDUs in the second part of downlink RLC PDUs, or sending, by the first base station, a retransmission message to the second base station, where the retransmission message is generated by the first base station according to the first RLC status report, and the retransmission message indicates the to-be-retransmitted RLC PDUs in the second part of downlink RLC PDUs.

With reference to the first aspect, in a third possible implementation manner, the method further includes: receiving, by the first base station, a first RLC status report from the second base station, where the first RLC status report is received by the second base station from the UE; determining, by the first base station according to the first RLC status report, to-be-retransmitted RLC PDUs in the first part of downlink RLC PDUs; and retransmitting, by the first base station, the to-be-retransmitted RLC PDUs in the first part of downlink RLC PDUs to the UE.

With reference to the first possible implementation manner of the first aspect, in a fourth possible implementation manner, the method further includes: generating, by the first base station, a second RLC status report according to reception situations of the first part of uplink RLC PDUs and the second part of uplink RLC PDUs, and sending the second RLC status report to the UE; and receiving, by the first base station, RLC PDUs in an uplink retransmission set determined by the UE according to the second RLC status report, where the uplink retransmission set includes to-be-retransmitted RLC PDUs in the first part of uplink RLC PDUs and/or to-be-retransmitted RLC PDUs in the second part of uplink RLC PDUs.

With reference to the fourth possible implementation manner of the first aspect, in a fifth possible implementation manner, the receiving, by the first base station, RLC PDUs in an uplink retransmission set determined by the UE according to the second RLC status report includes: receiving, by the first base station, the RLC PDUs in the uplink retransmission set from the UE; or, receiving, by the first base station, RLC PDUs in a first uplink retransmission subset from the UE, and receiving RLC PDUs in a second uplink retransmission subset from the second base station, where the RLC PDUs in the second uplink retransmission subset are received by the second base station from the UE, and the first uplink retransmission subset and the second uplink retransmission subset are obtained by the UE by dividing the uplink retransmission set; or, receiving, by the first base station, the RLC PDUs in the uplink retransmission set from the second base station, where the RLC PDUs in the uplink retransmission set are received by the second base station from the UE.

According to a second aspect, a data transmission method is provided, including: receiving, by a second base station from a first base station, a second part of downlink RLC PDUs in downlink radio link control RLC protocol data units PDUs generated by the first base station; and sending, by the second base station, the second part of downlink RLC PDUs to a user equipment UE.

With reference to the second aspect, in a first possible implementation manner, the method further includes: receiving, by the second base station from the UE, a second part of uplink RLC PDUs in uplink RLC PDUs generated by the UE; and sending, by the second base station, the second part of uplink RLC PDUs to the first base station.

With reference to the second aspect, in a second possible implementation manner, the method further includes: receiving, by the second base station, a first RLC status report from the first base station, determining, according to the first RLC status report, to-be-retransmitted RLC PDUs in the second part of downlink RLC PDUs, and retransmitting the to-be-retransmitted RLC PDUs in the second part of downlink RLC PDUs to the UE; or, receiving, by the second base station, a retransmission message from the first base station, and retransmitting, according to the retransmission message, to-be-retransmitted RLC PDUs in the second part of downlink RLC PDUs to the UE, where the first retransmission message indicates the to-be-retransmitted RLC PDUs in the second part of downlink RLC PDUs.

With reference to the second aspect, in a third possible implementation manner, the method further includes: receiving, by the second base station, a first RLC status report from the UE; forwarding, by the second base station, the first RLC status report to the first base station, so that when the first RLC status report indicates to-be-retransmitted RLC PDUs in a first part of downlink RLC PDUs, the first base station retransmits the to-be-retransmitted RLC PDUs in the first part of downlink RLC PDUs to the UE; and when the first RLC status report indicates to-be-retransmitted RLC PDUs in the second part of downlink RLC PDUs, retransmitting, by the second base station, the to-be-retransmitted RLC PDUs in the second part of downlink RLC PDUs to the UE.

With reference to the first possible implementation manner of the second aspect, in a fourth possible implementation manner, the method further includes: receiving, by the second base station, RLC PDUs in an uplink retransmission set from the UE, and sending the RLC PDUs in the uplink retransmission set to the first base station, where the uplink retransmission set includes to-be-retransmitted RLC PDUs in the first part of uplink RLC PDUs and/or to-be-retransmitted RLC PDUs in the second part of uplink RLC PDUs; or, receiving, by the second base station, RLC PDUs in a second uplink retransmission subset from the UE, and sending the RLC PDUs in the second uplink retransmission subset to the first base station, where the second uplink retransmission subset is obtained by the UE by dividing the uplink retransmission set.

According to a third aspect, a data transmission method is provided, including: receiving, by a user equipment UE from a first base station, a first part of downlink RLC PDUs in downlink radio link control RLC protocol data units PDUs generated by the first base station, and receiving, from a second base station, a second part of downlink RLC PDUs in the downlink RLC PDUs, where the second part of downlink RLC PDUs are received by the second base station from the first base station.

With reference to the third aspect, in a first possible implementation manner, the method further includes: generating, by the UE, uplink RLC PDUs; and sending, by the UE, a first part of uplink RLC PDUs in the uplink RLC PDUs to the first base station, and sending a second part of uplink RLC PDUs in the uplink RLC PDUs to the second base station.

With reference to the third aspect, in a second possible implementation manner, the method further includes: generating, by the UE, a first RLC status report according to reception situations of the first part of downlink RLC PDUs and the second part of downlink RLC PDUs, where the first RLC status report indicates to-be-retransmitted RLC PDUs in the first part of downlink RLC PDUs and/or to-be-retransmitted RLC PDUs in the second part of downlink RLC PDUs; sending, by the UE, the first RLC status report to the first base station or the second base station; and receiving, by the UE, the to-be-retransmitted RLC PDUs in the first part of downlink RLC PDUs from the first base station and/or receiving the to-be-retransmitted RLC PDUs in the second part of downlink RLC PDUs from the second base station.

With reference to the first possible implementation manner of the third aspect, in a fourth possible implementation manner, the method further includes: receiving, by the UE, a second RLC status report from the first base station; determining, by the UE, an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs; sending, by the UE, RLC PDUs in the uplink retransmission set to the first base station, or sending RLC PDUs in the uplink retransmission set to the second base station, or sending RLC PDUs in a first uplink retransmission subset to the first base station and sending RLC PDUs in a second uplink retransmission subset to the second base station, where the first uplink retransmission subset and the second uplink retransmission subset are obtained by the UE by dividing the uplink retransmission set.

According to a fourth aspect, a base station is provided, including: a generating unit, configured to generate downlink radio link control RLC protocol data units PDUs; a sending unit, configured to send a first part of downlink RLC PDUs in the downlink RLC PDUs to a user equipment UE, and send a second part of downlink RLC PDUs in the downlink RLC PDUs to a second base station, so that the second base station sends the second part of downlink RLC PDUs to the UE.

With reference to the fourth aspect, in a first possible implementation manner, the base station further includes: a first receiving unit, configured to receive, from the UE, a first part of uplink RLC PDUs in uplink RLC PDUs generated by the UE, and receive, from the second base station, a second part of uplink RLC PDUs in the uplink RLC PDUs, where the second part of uplink RLC PDUs are received by the second base station from the UE.

With reference to the fourth aspect, in a second possible implementation manner, the base station further includes: a second receiving unit, where the second receiving unit is configured to receive a first RLC status report from the UE; the sending unit is further configured to: when the first RLC status report indicates to-be-retransmitted RLC PDUs in the first part of downlink RLC PDUs, retransmit the to-beretransmitted RLC PDUs in the first part of downlink RLC PDUs to the UE; and the sending unit is further configured to forward the first RLC status report to the second base station, where the first RLC status report indicates to-be-retransmitted RLC PDUs in the second part of downlink RLC PDUs, or send a retransmission message to the second base station, where the retransmission message is generated by the first base station according to the first RLC status report, and the retransmission message indicates the to-be-retransmitted RLC PDUs in the second part of downlink RLC PDUs.

With reference to the fourth aspect, in a third possible implementation manner, the base station further includes a third receiving unit and a first determining unit, where the third receiving unit is configured to receive a first RLC status report from the second base station, where the first RLC status report is received by the second base station from the UE; the first determining unit is configured to determine, according to the first RLC status report, to-be-retransmitted RLC PDUs in the first part of downlink RLC PDUs; and the sending unit is further configured to retransmit the to-be-retransmitted RLC PDUs in the first part of downlink RLC PDUs to the UE.

With reference to the first possible implementation manner of the fourth aspect, in a fourth possible implementation manner, the base station further includes a fourth receiving unit, where the generating unit is further configured to generate a second RLC status report according to reception situations of the first part of uplink RLC PDUs and the second part of uplink RLC PDUs, and the sending unit is further configured to send the second RLC status report to the UE; and the fourth receiving unit is configured to receive RLC PDUs in an uplink retransmission set determined by the UE according to the second RLC status report, where the uplink retransmission set includes to-be-retransmitted RLC PDUs in the first part of uplink RLC PDUs and/or to-be-retransmitted RLC PDUs in the second part of uplink RLC PDUs.

With reference to the fourth possible implementation manner of the fourth aspect, in a fifth possible implementation manner, the fourth receiving unit is specifically configured to receive the RLC PDUs in the uplink retransmission set from the UE; or receive RLC PDUs in a first uplink retransmission subset from the UE, and receive RLC PDUs in a second uplink retransmission subset from the second base station, where the RLC PDUs in the second uplink retransmission subset are received by the second base station from the UE, and the first uplink retransmission subset and the second uplink retransmission subset are obtained by the UE by dividing the uplink retransmission set; or receive the RLC PDUs in the uplink retransmission set from the second base station, where the RLC PDUs in the uplink retransmission set are received by the second base station from the UE.

According to a fifth aspect, a base station is provided, including: a receiving unit, configured to receive, from a first base station, a second part of downlink RLC PDUs in downlink radio link control RLC protocol data units PDUs generated by the first base station; and a sending unit, configured to send the second part of downlink RLC PDUs to a user equipment UE.

With reference to the fifth aspect, in a first possible implementation manner, the receiving unit is further configured to receive, from the UE, a second part of uplink RLC PDUs in uplink RLC PDUs generated by the UE; and the sending unit is further configured to send the second part of uplink RLC PDUs to the first base station.

With reference to the fifth aspect, in a second possible implementation manner, the base station further includes a first determining unit, where the receiving unit is further configured to receive a first RLC status report from the first base station, the first determining unit is configured to determine, according to the first RLC status report, to-be-retransmitted RLC PDUs in the second part of downlink RLC PDUs, and the sending unit is further configured to retransmit the to-be-retransmitted RLC PDUs in the second part of downlink RLC PDUs to the UE; or, the receiving unit is further configured to receive a retransmission message from the first base station, and the sending unit is further configured to retransmit, according to the retransmission message, to-be-retransmitted RLC PDUs in the second part of downlink RLC PDUs to the UE, where the first retransmission message indicates the to-be-retransmitted RLC PDUs in the second part of downlink RLC PDUs.

With reference to the fifth aspect, in a third possible implementation manner, the receiving unit is further configured to receive a first RLC status report from the UE; and sending unit is further configured to forward the first RLC status report to the first base station, so that when the first RLC status report indicates to-be-retransmitted RLC PDUs in a first part of downlink RLC PDUs, the first base station retransmits the to-be-retransmitted RLC PDUs in the first part of downlink RLC PDUs to the UE; and the sending unit is further configured to: when the first RLC status report indicates to-be-retransmitted RLC PDUs in the second part of downlink RLC PDUs, retransmit the to-be-retransmitted RLC PDUs in the second part of downlink RLC PDUs to the UE.

With reference to the first possible implementation manner of the fifth aspect, in a fourth possible implementation manner, the receiving unit is further configured to receive RLC PDUs in an uplink retransmission set from the UE, and the sending unit is further configured to send the RLC PDUs in the uplink retransmission set to the first base station, where the uplink retransmission set includes to-be-retransmitted RLC PDUs in the first part of uplink RLC PDUs and/or to-be-retransmitted RLC PDUs in the second part of uplink RLC PDUs; or, the receiving unit is further configured to receive RLC PDUs in a second uplink retransmission subset from the UE, and the sending unit is further configured to send the RLC PDUs in the second uplink retransmission subset to the first base station, where the second uplink retransmission subset is obtained by the UE by dividing the uplink retransmission set.

According to a sixth aspect, a user equipment is provided, including: a receiving unit, configured to receive, from a first base station, a first part of downlink RLC PDUs in downlink radio link control RLC protocol data units PDUs generated by the first base station, and receive, from a second base station, a second part of downlink RLC PDUs in the downlink RLC PDUs, where the second part of downlink RLC PDUs are received by the second base station from the first base station; and a first generating unit, configured to reassemble the first part of downlink RLC PDUs and the second part of downlink RLC PDUs to form downlink RLC service data units SDUs.

With reference to the sixth aspect, in a first possible implementation manner, the user equipment further includes: a first sending unit, where the first generating unit is further configured to generate uplink RLC PDUs; and the first sending unit is configured to send a first part of uplink RLC PDUs in the uplink RLC PDUs to the first base station, and send a second part of uplink RLC PDUs in the uplink RLC PDUs to the second base station.

With reference to the sixth aspect, in a second possible implementation manner, the user equipment further includes a second generating unit and a second sending unit, where the second generating unit is configured to generate a first RLC status report according to reception situations of the first part of downlink RLC PDUs and the second part of downlink RLC PDUs, where the first RLC status report indicates to-be-retransmitted RLC PDUs in the first part of downlink RLC PDUs and/or to-be-retransmitted RLC PDUs in the second part of downlink RLC PDUs; the second sending unit is configured to send the first RLC status report to the first base station or the second base station; and the receiving unit is further configured to receive the to-be-retransmitted RLC PDUs in the first part of downlink RLC PDUs from the first base station and/or receive the to-be-retransmitted RLC PDUs in the second part of downlink RLC PDUs from the second base station.

With reference to the first possible implementation manner of the sixth aspect, in a third possible implementation manner, the user equipment further includes a determining unit and a third sending unit, where the receiving unit is further configured to receive a second RLC status report from the first base station; the determining unit is configured to determine an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs; and the third sending unit is configured to send RLC PDUs in the uplink retransmission set to the first base station, or send RLC PDUs in the uplink retransmission set to the second base station, or send RLC PDUs in a first uplink retransmission subset to the first base station and send RLC PDUs in a second uplink retransmission subset to the second base station, where the first uplink retransmission subset and the second uplink retransmission subset are obtained by the UE by dividing the uplink retransmission set.

According to a seventh aspect, a base station is provided, including: a processor, configured to generate downlink radio link control RLC protocol data units PDUs; a transmitter, configured to send a first part of downlink RLC PDUs in the downlink RLC PDUs to a user equipment UE, and send a second part of downlink RLC PDUs in the downlink RLC PDUs to a second base station, so that the second base station sends the second part of downlink RLC PDUs to the UE.

With reference to the seventh aspect, in a first possible implementation manner, the base station further includes: a receiver, configured to receive, from the UE, a first part of uplink RLC PDUs in uplink RLC PDUs generated by the UE, and receive, from the second base station, a second part of uplink RLC PDUs in the uplink RLC PDUs, where the second part of uplink RLC PDUs are received by the second base station from the UE.

With reference to the seventh aspect, in a second possible implementation manner, the base station further includes a receiver, where the receiver is configured to receive a first RLC status report from the UE; the transmitter is further configured to: when the first RLC status report indicates to-be-retransmitted RLC PDUs in the first part of downlink RLC PDUs, retransmit the to-be-retransmitted RLC PDUs in the first part of downlink RLC PDUs to the UE; and the transmitter is further configured to forward the first RLC status report to the second base station, where the first RLC status report indicates to-be-retransmitted RLC PDUs in the second part of downlink RLC PDUs, or send a retransmission message, which is generated by the base station according to the first RLC status report, to the second base station, where the retransmission message indicates the to-be-retransmitted RLC PDUs in the second part of downlink RLC PDUs.

With reference to the seventh aspect, in a third possible implementation manner, the base station further includes a receiver, where the receiver is configured to receive a first RLC status report from the second base station, where the first RLC status report is received by the second base station from the UE; the processor is further configured to determine, according to the first RLC status report, to-be-retransmitted RLC PDUs in the first part of downlink RLC PDUs; and the transmitter is further configured to retransmit the to-be-retransmitted RLC PDUs in the first part of downlink RLC PDUs to the UE.

With reference to the first possible implementation manner of the seventh aspect, in a fourth possible implementation manner, the processor is further configured to generate a second RLC status report according to reception situations of the first part of uplink RLC PDUs and the second part of uplink RLC PDUs, and the transmitter is further configured to send the second RLC status report to the UE; and the receiver is further configured to receive RLC PDUs in an uplink retransmission set determined by the UE according to the second RLC status report, where the uplink retransmission set includes to-be-retransmitted RLC PDUs in the first part of uplink RLC PDUs and/or to-be-retransmitted RLC PDUs in the second part of uplink RLC PDUs.

With reference to the fourth possible implementation manner of the seventh aspect, in a fifth possible implementation manner, the receiver is specifically configured to receive the RLC PDUs in the uplink retransmission set from the UE; or receive RLC PDUs in a first uplink retransmission subset from the UE, and receive RLC PDUs in a second uplink retransmission subset from the second base station, where the RLC PDUs in the second uplink retransmission subset are received by the second base station from the UE, and the first uplink retransmission subset and the second uplink retransmission subset are obtained by the UE by dividing the uplink retransmission set; or receive the RLC PDUs in the uplink retransmission set from the second base station, where the RLC PDUs in the uplink retransmission set are received by the second base station from the UE.

According to an eighth aspect, a base station is provided, including: a receiver, configured to receive, from a first base station, a second part of downlink RLC PDUs in downlink radio link control RLC protocol data units PDUs generated by the first base station; and a transmitter, configured to send the second part of downlink RLC PDUs to a user equipment UE.

With reference to the eighth aspect, in a first possible implementation manner, the receiver is further configured to receive, from the UE, a second part of uplink RLC PDUs in uplink RLC PDUs generated by the UE; and the transmitter is further configured to send the second part of uplink RLC PDUs to the first base station.

With reference to the eighth aspect, in a second possible implementation manner, the base station further includes a processor, where the receiver is further configured to receive a first RLC status report from the first base station, the processor is configured to determine, according to the first RLC status report, to-be-retransmitted RLC PDUs in the second part of downlink RLC PDUs, and the transmitter is further configured to retransmit the to-be-retransmitted RLC PDUs in the second part of downlink RLC PDUs to the UE; or, the receiver is further configured to receive a retransmission message from the first base station, and transmitter is further configured to retransmit, according to the retransmission message, to-be-retransmitted RLC PDUs in the second part of downlink RLC PDUs to the UE, where the first retransmission message indicates the to-be-retransmitted RLC PDUs in the second part of downlink RLC PDUs.

With reference to the eighth aspect, in a third possible implementation manner, the receiver is further configured to receive a first RLC status report from the UE; and transmitter is further configured to forward the first RLC status report to the first base station, so that when the first RLC status report indicates to-be-retransmitted RLC PDUs in the first part of downlink RLC PDUs, the first base station retransmits the to-be-retransmitted RLC PDUs in the first part of downlink RLC PDUs to the UE; and the transmitter is further configured to: when the first RLC status report indicates to-be-retransmitted RLC PDUs in the second part of downlink RLC PDUs, retransmit the to-be-retransmitted RLC PDUs in the second part of downlink RLC PDUs to the UE.

With reference to the first possible implementation manner of the eighth aspect, in a fourth possible implementation manner, the receiver is further configured to receive RLC PDUs in an uplink retransmission set from the UE, and the transmitter is further configured to send the RLC PDUs in the uplink retransmission set to the first base station, where the uplink retransmission set includes to-be-retransmitted RLC PDUs in the first part of uplink RLC PDUs and/or to-be-retransmitted RLC PDUs in the second part of uplink RLC PDUs; or, the receiver is further configured to receive RLC PDUs in a second uplink retransmission subset from the UE, and the transmitter is further configured to send the RLC PDUs in the second uplink retransmission subset to the first base station, where the second uplink retransmission subset is obtained by the UE by dividing the uplink retransmission set.

According to a ninth aspect, a user equipment is provided, including: a receiver, configured to receive, from a first base station, a first part of downlink RLC PDUs in downlink radio link control RLC protocol data units PDUs generated by the first base station, and receive, from a second base station, a second part of downlink RLC PDUs in the downlink RLC PDUs, where the second part of downlink RLC PDUs are received by the second base station from the first base station; and a processor, configured to reassemble the first part of downlink RLC PDUs and the second part of downlink RLC PDUs to form downlink RLC service data units SDUs.

With reference to the ninth aspect, in a first possible implementation manner, the user equipment further includes a transmitter, where the processor is further configured to generate uplink RLC PDUs; and the transmitter is configured to send a first part of uplink RLC PDUs in the uplink RLC PDUs to the first base station, and send a second part of uplink RLC PDUs in the uplink RLC PDUs to the second base station.

With reference to the ninth aspect, in a second possible implementation manner, the user equipment further includes a transmitter, where the processor is further configured to generate a first RLC status report according to reception situations of the first part of downlink RLC PDUs and the second part of downlink RLC PDUs, where the first RLC status report indicates to-be-retransmitted RLC PDUs in the first part of downlink RLC PDUs and/or to-be-retransmitted RLC PDUs in the second part of downlink RLC PDUs; the transmitter is configured to send the first RLC status report to the first base station or the second base station; and the receiver is further configured to receive the to-be-retransmitted RLC PDUs in the first part of downlink RLC PDUs from the first base station and/or receive the to-be-retransmitted RLC PDUs in the second part of downlink RLC PDUs from the second base station.

With reference to the first possible implementation manner of the ninth aspect, in a third possible implementation manner, the receiver is further configured to receive a second RLC status report from the first base station; the processor is further configured to determine an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs; and the transmitter is further configured to send RLC PDUs in the uplink retransmission set to the first base station, or send RLC PDUs in the uplink retransmission set to the second base station, or send RLC PDUs in a first uplink retransmission subset to the first base station and send RLC PDUs in a second uplink retransmission subset to the second base station, where the first uplink retransmission subset and the second uplink retransmission subset are obtained by the UE by dividing the uplink retransmission set.

In the embodiments of the present invention, a first base station sends a first part of downlink RLC PDUs in downlink RLC PDUs to a UE, and sends a second part of downlink RLC PDUs in the downlink RLC PDUs to a second base station, and the second base station sends the second part of downlink RLC PDUs to the UE, so that the first base station and the second base station are capable of jointly sending data to the UE, thereby improving a peak rate and a throughput of the UE.

BRIEF DESCRIPTION OF THE DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The following uses examples to describe in detail scenarios where embodiments of the present invention are applicable. It should be noted that these examples are merely intended to help a person skilled in the art better understand the embodiments of the present invention, but are not intended to limit the scope of the embodiments of the present invention.

Figure 1A:
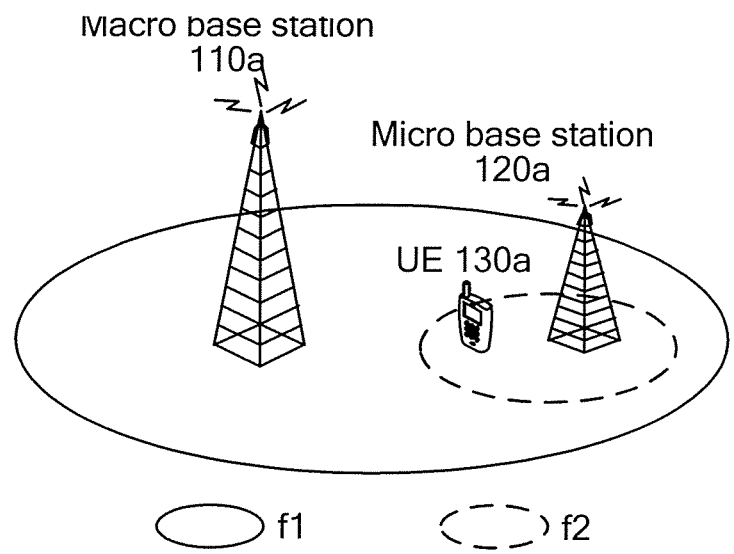
FIG. 1a is a schematic diagram of an example of a scenario where an embodiment of the present invention is applicable.

FIG. 1a is a schematic diagram of an example of a scenario where an embodiment of the present invention is applicable.

FIG. 1a may be a scenario of an LTE-A system. In FIG. 1a, a macro base station (Macro eNB (eNodeB)) 110a may have a CC1 whose frequency is f1, a micro base station (pico eNB) 120a may have a CC2 whose frequency is f2, and a coverage area of the CC2 may be within a coverage area of the CC1. A UE 130a may be located in the area covered by the CC2, that is, located in a common coverage area of the CC1 and the CC2. Then, according to the embodiment of the present invention, after CA is performed on the CC1 and the CC2, the macro base station 110a and the micro base station 120a can jointly perform data transmission with the UE 130a, so that the UE 130a does not need to be handed over between the macro base station 110a and the micro base station 120a.

For example, if the UE 130a currently has a radio resource control (Radio Resource Control, RRC) connection with the macro base station 110a, during aggregation of the CC1 and the CC2, the CC1 may be used as a primary CC (Primary CC, PCC), and the CC2 may be used as a secondary CC (Secondary CC, SCC). The PCC may be used for mobility management, and the SCC may provide service splitting. Because the macro base station has a large coverage, using the macro base station as a PCC for mobility management can reduce the occurrence of handovers. If the UE 130*a* currently has an RRC connection with the micro base station 120*a*, during aggregation of the CC1 and the CC2, the CC2 may be used as a PCC, and the CC1 may be used as an SCC.

Figure 1B:
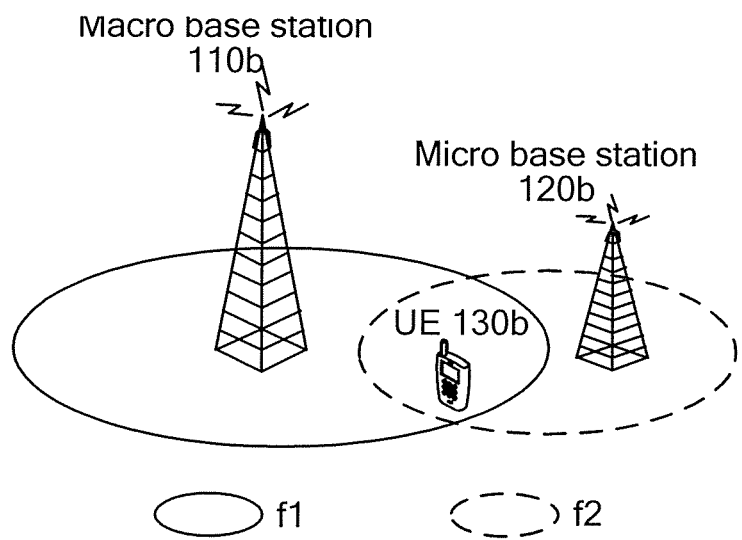
FIG. 1b is a schematic diagram of another example of a scenario where an embodiment of the present invention is applicable.

FIG. 1*b* is a schematic diagram of another example of a scenario where an embodiment of the present invention is applicable.

FIG. 1*b* may be another scenario of an LTE-A system. In FIG. 1*b*, a macro base station 110*b* may have a CC1 whose frequency is f1, and a micro base station 120*b* may have a CC2 whose frequency is f2. The CC1 and the CC2 have a common coverage area. The UE 130*b* may be located in the common coverage area of the CC1 and the CC2. Similar to FIG. 1*a*, according to the embodiment of the present invention, after CA is performed on the CC1 and the CC2, the macro base station 110*b* and the micro base station 120*b* can also jointly perform data transmission with the UE 130*b*, and the UE 130*b* does not need to be handed over between the macro base station 110*b* and the micro base station 120*b*.

Figure 1C:
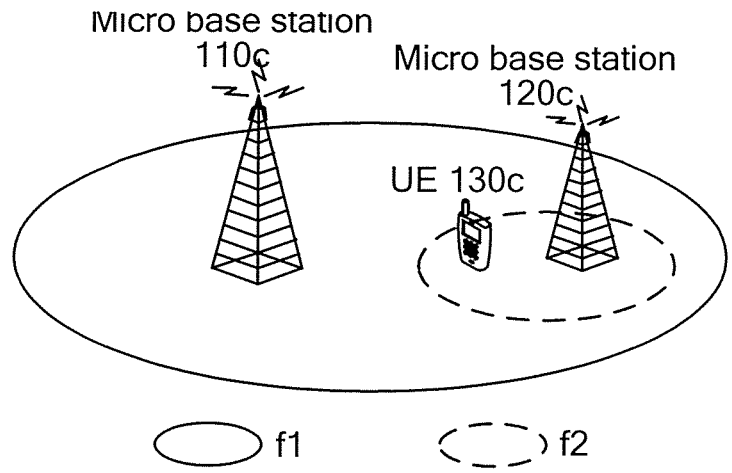
FIG. 1c is a schematic diagram of another example of a scenario where an embodiment of the present invention is applicable.

FIG. 1*c* is a schematic diagram of another example of a scenario where an embodiment of the present invention is applicable.

FIG. 1*c* may be another scenario of an LTE-A system. In FIG. 1*c*, a micro base station 110*c* may have a CC1 whose frequency is f1, and a micro base station 120*c* may have a CC2 whose frequency is f2. A coverage area of the CC2 may be within a coverage area of the CC1. A UE 130*c* may be located in the area covered by the CC2, that is, located in a common coverage area of the CC1 and the CC2. Similar to FIG. 1*a*, according to the embodiment of the present invention, after CA is performed on the CC1 and the CC2, the micro base station 110*c* and the micro base station 120*c* can also jointly perform data transmission with the UE 130*c*, and the UE 130*c* does not need to be handed over between the micro base station 110*c* and the micro base station 120*c*.

It should be noted that, although FIG. 1*c* describes a scenario of two micro base stations, the embodiment of the present invention may also be applied to a scenario of two macro base stations, namely, a scenario where a coverage area of one macro base station may be within a coverage area of the other macro base station. Other procedures are similar to the procedures described in FIG. 1*c*, and are not described herein again to avoid repetition.

Figure 1D:
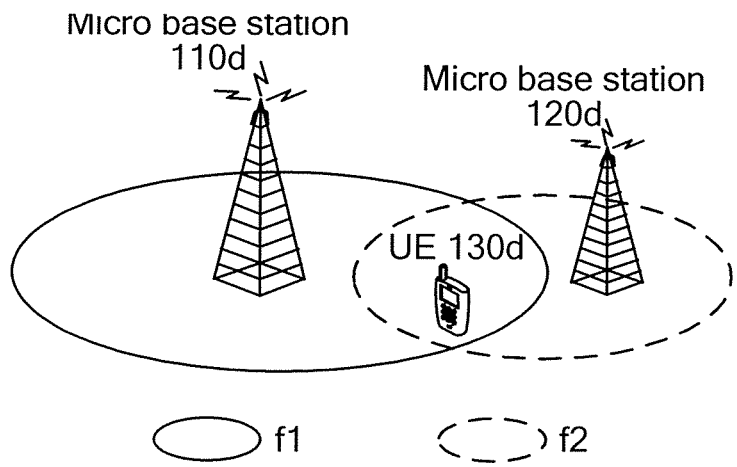
FIG. 1d is a schematic diagram of another example of a scenario where an embodiment of the present invention is applicable.

FIG. 1*d* is a schematic diagram of another example of a scenario where an embodiment of the present invention is applicable.

FIG. 1*d* may be another scenario of an LTE-A system. In FIG. 1*d*, a micro base station 110*d* may have a CC1 whose frequency is f1, and a micro base station 120*d* may have a CC2 whose frequency is f2. The CC1 and the CC2 have a common coverage area. The UE 130*d* may be located in the common coverage area of the CC1 and the CC2. Similar to FIG. 1*a*, according to the embodiment of the present invention, after CA is performed on the CC1 and the CC2, the micro base station 110*d* and the micro base station 120*d* can also jointly perform data transmission with the UE 130*d*, and the UE 130*d* does not need to be handed over between the micro base station 110*d* and the micro base station 120*d*.

It should be noted that, although FIG. 1*d* describes a scenario of two micro base stations, the embodiment of the present invention may also be applied to a scenario of two macro base stations, namely, a scenario where two macro base stations have a common coverage area. Other procedures are similar to the procedures described in FIG. 1*d*, and are not described herein again to avoid repetition.

It should be noted that, although FIG. 1*a* to FIG. 1*d* describe two CCs, the embodiment of the present invention may also be applied to a scenario where two or more base stations have multiple CCs each and the multiple CCs have a common coverage area; and multiple CCs of two base stations have different frequencies, or have overlapping frequencies. For example, two base stations each provide a carrier whose frequency is f1 and a carrier whose frequency is f2, and the f1 carrier and the f2 carrier of each of the two base stations have a common coverage area; and the UE may perform CA by aggregating f1 of the first base station and f2 of the second base station, or perform CA by aggregating f2 of the first base station and f1 of the second base station. A case that the UE may perform CA by aggregating f1 of the first base station and f1 of the second base station may also be referred to as coordinated multi-point (coordinated multi point, CoMP) transmission/reception (transmission/reception), where the first base station and the second base station communicate with the UE in a coordinated scheduling manner, which is not limited in the embodiment of the present invention.

Figure 2A:
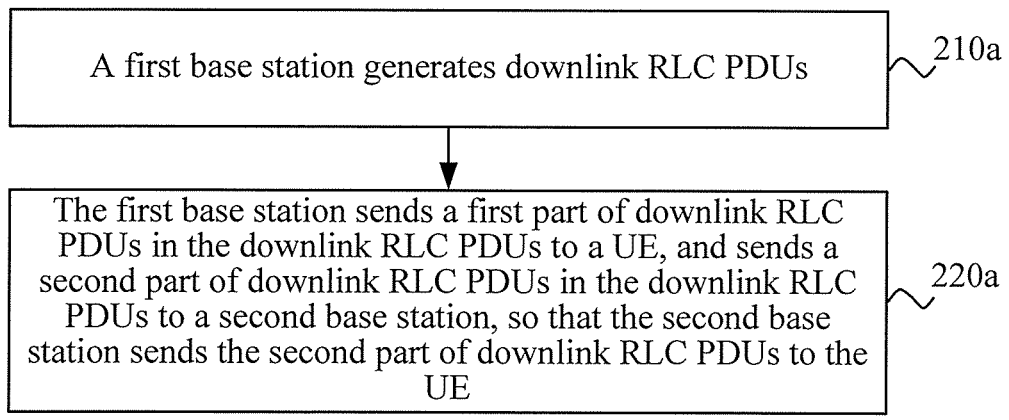
FIG. 2a is a schematic flowchart of a data transmission method according to an embodiment of the present invention.

FIG. 2*a* is a schematic flowchart of a data transmission method according to an embodiment of the present invention. The method of FIG. 2*a* is executed by a first base station.

210*a*: A first base station generates downlink radio link control (Radio Link Control, RLC) protocol data units (Protocol Data Unit, PDU).

220*a*: The first base station sends a first part of downlink RLC PDUs in the downlink RLC PDUs to a user equipment (User Equipment, UE), and sends a second part of downlink RLC PDUs in the downlink RLC PDUs to a second base station, so that the second base station sends the second part of downlink RLC PDUs to the UE.

In the embodiment of the present invention, the first base station may serve as a user plane anchor point (anchor point) and be responsible for downlink data splitting. For example, the first base station may be one of the macro base station 110*a* and the micro base station 120*a* in FIG. 1*a*, and the second base station may be the other. The first base station may also be one of the macro base station 120*a* and the micro base station 120*b* in FIG. 1*b*, and the second base station may be the other. The first base station may also be one of the micro base station 110*c* and the micro base station 120*c* in FIG. 1*c*, and the second base station may be the other. The first base station may also be one of the micro base station 110*d* and the micro base station 120*d* in FIG. 1*d*, and the second base station may be the other. The UE may also be referred to as a mobile terminal (Mobile Terminal, MT), a mobile user equipment, and so on, such as a mobile phone (or called a "cellular" phone) and a computer having a mobile terminal.

It should be noted that, the first base station may serve as the user plane anchor point, and a Packet Data Convergence Protocol (Packet Data Convergence Protocol, PDCP) layer thereof receives, from an application layer, an Internet Protocol (Internet Protocol, IP) data packet from a serving gateway (Serving Gateway, SGW), and uses the IP data packet as a PDCP service data unit (Service Data Unit, SDU); and after processing at the PDCP layer, PDCP PDUs are generated and passed to an RLC layer to serve as RLC SDUs. It should be understood that after generating downlink RLC PDUs according to the RLC SDUs, the first base station may divide the generated downlink RLC PDUs into a first part of downlink RLC PDUs and a second part of downlink RLC PDUs. In addition, the first base station may also divide the RLC SDUs into a first part of RLC SDUs and a second part of RLC SDUs first, and after generating downlink RLC PDUs, use RLC PDUs that are in the downlink RLC PDUs and corresponding to the first part of RLC SDUs as a first part of downlink RLC PDUs, and use RLC PDUs that are in the downlink RLC PDUs and corresponding to the second part of RLC SDUs as a second part of downlink RLC PDUs.

It should be understood that, the first part of downlink RLC PDUs may include one or more RLC PDUs, and the second part of downlink RLC PDUs may also include one or more RLC PDUs.

That the first base station sends the first part of downlink RLC PDUs to the UE may refer to that the first base station sends the first part of downlink RLC PDUs to the UE after subjecting the first part of downlink RLC PDUs to processing at various protocol layers. For example, the first base station may send the first part of downlink RLC PDUs to the UE after subjecting the first part of downlink RLC PDUs to processing at a medium access control (Medium Access Control, MAC) layer and a physical (Physical, PHY) layer. Similarly, that the second base station sends the second part of downlink RLC PDUs to the UE may refer to that the second base station sends the second part of downlink RLC PDUs to the UE after subjecting the second part of downlink RLC PDUs to processing at various protocol layers. For example, the second base station may send the second part of downlink RLC PDUs to the UE after subjecting the second part of downlink RLC PDUs to processing at a MAC layer and a PHY layer.

In the embodiment of the present invention, the first base station sends the first part of downlink RLC PDUs in the downlink RLC PDUs to the UE, and sends the second part of downlink RLC PDUs in the downlink RLC PDUs to the second base station, and the second base station sends the second part of downlink RLC PDUs to the UE, so that the first base station and the second base station are capable of jointly sending data to the UE, thereby improving a peak rate and a throughput of the UE.

In this way, the UE does not need to be handed over between two base stations, thereby also avoiding a service delay or interruption caused by the handover.

Optionally, as an embodiment, the first base station may receive, from the UE, a first part of uplink RLC PDUs in uplink RLC PDUs generated by the UE, and receive, from the second base station, a second part of uplink RLC PDUs in the uplink RLC PDUs, where the second part of uplink RLC PDUs are received by the second base station from the UE.

It should be understood that, the first part of uplink RLC PDUs may include one or more RLC PDUs, and the second part of uplink RLC PDUs may also include one or more RLC PDUs.

In an uplink direction, the first base station may receive the first part of uplink RLC PDUs from the UE, and receive, from the second base station, the second part of uplink RLC PDUs sent by the UE to the second base station; and the first base station may reassemble the two parts of uplink RLC PDUs to generate RLC SDUs and pass the RLC SDUs to the PDCP layer in sequence, where the RLC SDUs are used as PDCP PDUs, and the PDCP PDUs are sent to the SGW after subsequent processing.

It should be noted that, that the first base station receives the first part of uplink RLC PDUs from the UE may refer to that the first base station receives a first part of uplink data packets from the UE, and obtains the first part of uplink RLC PDUs after subjecting the first part of uplink data packets to processing at various protocol layers. For example, the first base station may obtain the first part of uplink RLC PDUs after subjecting the first part of uplink data packets to processing at a PHY layer and a MAC layer. A procedure in which the second base station receives the second part of uplink RLC PDUs from the UE is similar to the case of the first base station, and is not described herein again to avoid repetition.

Optionally, as another embodiment, in an RLC acknowledged mode (Acknowledged Mode, AM), the first base station may receive a first RLC status report from the UE. When the first RLC status report indicates to-be-retransmitted RLC PDUs in a first part of downlink RLC PDUs, the first base station may retransmit the to-be-retransmitted RLC PDUs in the first part of downlink RLC PDUs to the UE. The first base station may forward the first RLC status report to the second base station, where the first RLC status report may be used to indicate to-be-retransmitted RLC PDUs in the second part of downlink RLC PDUs, or the first base station may send a retransmission message to the second base station, where the retransmission message is generated by the first base station according to the first RLC status report, and the retransmission message may indicate to-be-retransmitted RLC PDUs in the second part of downlink RLC PDUs.

When the first RLC status report indicates an RLC PDU which, as acknowledged by the UE, is received successfully, the first base station updates an RLC AM send window and a corresponding status variable, so as to continue to send a new RLC PDU.

The UE may generate the first RLC status report according to reception situations of the first part of downlink RLC PDUs and the second part of downlink RLC PDUs.

The first base station may determine, according to the first RLC status report, whether the first part of downlink RLC PDUs and the second part of downlink RLC PDUs have any RLC PDU to be retransmitted. When to-be-retransmitted RLC PDUs exist in the first part of downlink RLC PDUs, the first base station may retransmit the to-be-retransmitted RLC PDUs in the first part of downlink RLC PDUs to the UE. When to-be-retransmitted RLC PDUs exist in the second part of downlink RLC PDUs, the first base station needs to notify the second base station of the to-be-retransmitted RLC PDUs in the second part of downlink RLC PDUs. For example, the first base station may forward the first RLC status report to the second base station, or the first base station may generate a retransmission message according to the first RLC status report, and indicate, by using the retransmission message, to the second base station, the to-be-retransmitted RLC PDUs in the second part of downlink RLC PDUs.

It should be understood that, in the embodiments of the present invention, the RLC status report and related content of RLC PDU retransmission are applicable only to the RLC AM; and procedures for generating, sending, and receiving RLC PDUs are applicable to both the RLC AM and an RLC unacknowledged mode (Unacknowledged Mode, UM).

Optionally, as another embodiment, in the RLC AM, the first base station may determine a downlink RLC PDU retransmission set according to the first RLC status report, where the downlink RLC PDU retransmission set may include the to-be-retransmitted RLC PDUs in the first part of downlink RLC PDUs and/or the to-be-retransmitted RLC PDUs in the second part of downlink RLC PDUs. The first base station may divide the downlink RLC PDU retransmission set into a first downlink retransmission subset and a second downlink retransmission subset. The first base station may retransmit the RLC PDU in the first downlink retransmission subset to the UE. The first base station may generate a second retransmission message and send the second retransmission message to the second base station, where the second retransmission message may indicate the second downlink retransmission subset. If one or more RLC PDUs in the second downlink retransmission subset belong to the original first part of downlink RLC PDUs, because the first base station is originally responsible for transmission of the first part of downlink RLC PDUs and the second base station does not have this part of RLC PDUs, the first base station further needs to send these RLC PDUs to the second base station.

That is, the first base station may re-divide the to-be-retransmitted RLC PDUs, and determine that a part of the RLC PDUs is retransmitted by the first base station, and the other part of the RLC PDUs is retransmitted by the second base station. This manner can adapt to a real-time radio resource situation of the first base station and the second base station and satisfy a quality of service (quality of service, QoS) requirement of services, and therefore retransmission efficiency can be improved.

Optionally, as another embodiment, in the RLC AM, the first base station may receive the first RLC status report from the second base station, where the first RLC status report is received by the second base station from the UE. The first base station may determine, according to the first RLC status report, to-be-retransmitted RLC PDUs in the first part of downlink RLC PDUs. The first base station may retransmit the to-be-retransmitted RLC PDUs in the first part of downlink RLC PDUs to the UE.

When the first RLC status report indicates an RLC PDU which, as acknowledged by the UE, is received successfully, the first base station updates an RLC AM send window and a corresponding status variable, so as to continue to send a new RLC PDU. Because the UE sends the first RLC status report according to an uplink resource situation, when the first RLC status report is sent through the second base station, the first base station needs to receive the first RLC status report forwarded by the second base station.

In the RLC AM, after generating the first RLC status report, the UE may send the first RLC status report to the second base station, and the second base station forwards the first RLC status report to the first base station. The first base station may retransmit, according to the first RLC status report, the to-be-retransmitted RLC PDUs in the first part of downlink RLC PDUs to the UE.

Optionally, as another embodiment, in the RLC AM, the first base station may generate a second RLC status report according to reception situations of the first part of uplink RLC PDUs and the second part of uplink RLC PDUs, and send the second RLC status report to the UE. The first base station may receive RLC PDUs in an uplink retransmission set determined by the UE according to the second RLC status report, where the uplink retransmission set may include to-be-retransmitted RLC PDUs in the first part of uplink RLC PDUs and/or to-be-retransmitted RLC PDUs in the second part of uplink RLC PDUs.

Optionally, as another embodiment, in the RLC AM, the first base station may generate a second RLC status report according to reception situations of the first part of uplink RLC PDUs and the second part of uplink RLC PDUs, and send the second RLC status report to the second base station, so that the second base station forwards the second RLC status report to the UE. The first base station may receive RLC PDUs in an uplink retransmission set determined by the UE according to the second RLC status report, where the uplink retransmission set may include to-be-retransmitted RLC PDUs in the first part of uplink RLC PDUs and/or to-be-retransmitted RLC PDUs in the second part of uplink RLC PDUs.

When the first base station has heavy load or a poor radio condition while the second base station has light load or a good radio condition, the second base station forwards the second RLC status report to the UE, so that the sending reliability of the second RLC status report can be improved.

Optionally, as another embodiment, in the RLC AM, the first base station may receive RLC PDUs in the uplink retransmission set from the UE. Alternatively, the first base station may receive RLC PDUs in a first uplink retransmission subset from the UE, and receive RLC PDUs in a second uplink retransmission subset from the second base station, where the second uplink retransmission subset is received by the second base station from the UE, and the first uplink retransmission subset and the second uplink retransmission subset are obtained by the UE by dividing the uplink retransmission set. Alternatively, the first base station may receive the RLC PDUs in the uplink retransmission set from the second base station, where the RLC PDUs in the uplink retransmission set are received by the second base station from the UE.

In the RLC AM, the first base station may generate a second RLC status report according to reception situations of the first part of uplink RLC PDUs and the second part of uplink RLC PDUs, and send the second RLC status report to the UE. The UE may determine, according to the second RLC status report, to-be-retransmitted RLC PDUs, that is, determine the uplink retransmission set.

The first base station may receive, from the UE, all to-be-retransmitted uplink RLC PDUs, that is, the RLC PDUs in the uplink retransmission set. Alternatively, the first base station may receive, from the UE, a part of to-be-retransmitted uplink RLC PDUs, that is, the RLC PDUs in the first uplink retransmission subset. The second base station may receive, from the UE, another part of to-be-retransmitted uplink RLC PDUs, and then send this part of uplink RLC PDUs, that is, the RLC PDUs in the second uplink retransmission subset, to the first base station. Alternatively, the second base station may receive, from the UE, all to-be-retransmitted uplink RLC PDUs, that is, the RLC PDUs in the uplink retransmission set, and then send the RLC PDUs to the first base station.

Optionally, as another embodiment, the first base station may send, on a first cell of the first base station, the first part of downlink RLC PDUs to the UE, and send the second part of downlink RLC PDUs to the second base station, so that the second base station sends, on a second cell of the second base station, the second part of downlink RLC PDUs to the UE, where coverages of the first cell and the second cell overlap.

The first cell exists on a carrier of the first base station, the second cell exists on a carrier of the second base station, and the UE may be located in an overlapping area of the coverage of the first cell and the coverage of the second cell. Therefore, after CA is performed on the carrier of the first base station and the carrier of the second base station, the first base station may send the first part of downlink RLC PDUs to the UE through the first cell, and the second base station may send the second part of downlink RLC PDUs to the UE through the second cell.

Optionally, as another embodiment, the first base station may send a first request message to the second base station, where the first request message may be used to instruct the second base station to configure a second cell for the UE. The first base station may receive a first response message from the second base station, where the first response message carries resource information of the second cell, such as radio resource configuration common information and radio resource configuration dedicated information of the second cell, and the resource information of the second cell is determined by the second base station according to the first request message. The first base station may send an RRC connection reconfiguration (RRCConnectionReconfiguration) message to the UE, where the RRC connection reconfiguration message carries the resource information of the second cell. The first base station may be a macro base station.

For example, the first base station may determine to add a cell according to a measurement report of the UE or a measurement result of an uplink sounding reference signal (Sounding Reference Signal, SRS), where the measurement report of the UE may include a measurement result of reference signal received power (Reference Signal Received Power, RSRP) of a current serving cell and a neighboring cell. The first base station may also determine to add a cell according to other measurement results, such as a channel quality indication (Channel Quality Indication, CQI) reported by the UE. In this way, after determining that a cell needs to be added for the UE for data splitting, the first base station may instruct the second base station to configure the second cell of the second base station for the UE. After receiving the resource information of the second cell from the second base station, the first base station may notify, by using the RRC connection reconfiguration message, the UE of the resource information of the second cell. In this way, the UE may perform RRC connection reconfiguration according to the resource information of the second cell. In this case, an RRC connection and a data radio bearer (Data Radio Bearer, DRB) may already exist between the first cell of the first base station and the UE.

Optionally, as another embodiment, the first request message may be further used to instruct the second base station to establish a DRB for the UE.

For example, the first base station may determine, according to information of the DRB, such as a QoS parameter, a traffic volume, a throughput, and a peak rate, whether the second base station needs to establish a DRB for the UE. In this way, the first base station may add DRB configuration information in the first request message, and the second base station may establish, according to the DRB configuration information, an RLC entity and a logical channel (Logical Channel, LCH) that are corresponding to the DRB. For example, the DRB configuration information may include at least one of the following: an evolved radio access bearer (Evolved Radio Access Bearer, E-RAB) identifier, an E-RAB quality of service (Quality of Service, QoS) parameter, a DRB identifier, RLC configuration information, and logical channel configuration information. In addition, the DRB configuration information may also include other related information. The E-RAB quality of service parameter may be a QoS parameter after the first base station makes a splitting decision. For example, the first base station may segment a guaranteed bit rate (Guaranteed Bit Rate, GBR); if 60% is distributed to the DRB of the first base station, and 40% is distributed to the second base station, a GBR parameter value sent to the second base station is 40% multiplied by an original GBR parameter value. The E-RAB quality of service parameter may also be the original QoS parameter received by the first base station from the SGW, and after the first base station and the second base station negotiate a splitting decision, the second base station adjusts the QoS parameter during scheduling. Similarly, the first base station may add signaling radio bearer (Signaling Radio Bearer, SRB) configuration information in the first request message, and when the first base station is a user plane anchor point, the second base station may establish, according to the SRB configuration information, an RLC entity and an LCH that are corresponding to the SRB.

Optionally, as another embodiment, the first base station may receive a second request message from the second base station, where the second request message may be used to instruct the first base station to configure a first cell for the UE. The first base station may determine, according to the second request message, resource information of the first cell, such as radio resource configuration common information and radio resource configuration dedicated information of the first cell. The first base station may send a second response message to the second base station, where the second response message carries the resource information of the first cell, so that the second base station notifies the UE of the resource information of the first cell. The first base station may be a micro base station.

Specifically, the first base station may configure the first cell for the UE according to the instruction of the second base station. In this case, an RRC connection and a DRB may already exist between the second cell of the second base station and the UE. The first base station may configure a resource of the first cell for the UE according to the second request message, and may notify, by using the second response message, the second base station of the resource information of the first cell, and the second base station notifies the UE of the resource information of the first cell, so that the UE performs connection reconfiguration according to the resource information of the first cell.

Optionally, as another embodiment, the second request message may be further used to instruct the first base station to establish a DRB for the UE. When the first base station is a user plane anchor point, the first base station may establish, according to the second request message, a Packet Data Convergence Protocol (Packet Data Convergence Protocol, PDCP) entity, an RLC entity, and an LCH that are corresponding to the DRB.

Similarly, the second request message may be further used to instruct the first base station to establish an SRB for the UE. The first base station may establish, according to the second request message, a PDCP entity, an RLC entity, and a logical channel that are corresponding to the SRB.

In the RLC AM, the RLC entity may include a sending end and a receiving end; the sending end may include at least one of the following functional units: a transmission buffer (transmission buffer), a retransmission buffer (retransmission buffer), a segmentation (segmentation) and concatenation (concatenation) unit, an RLC PDU header information generating unit (add RLC header), an RLC control unit (RLC control) used for an automatic retransmission request (Automatic Retransmission Request, ARQ) function, and so on, where the RLC control unit may include at least one of the following functions: ARQ send window control and maintenance, ARQ receive window control and maintenance, generating an RLC status report according to a receiving situation of the receiving end entity and sending the RLC status report, and controlling retransmission at the sending end according to the received RLC status report. The receiving end may include at least one of the following functional units: a routing (routing) unit, a reception buffer (reception buffer), a reordering (reordering) function unit, RLC header information removing (remove RLC header)

unit, an SDU reassembly (reassembly) unit, and so on; the routing unit includes a function of distinguishing an RLC PDU from an RLC status report, and so on; the reordering function is used to reorder RLC PDUs that a MAC layer fails to pass to an RLC layer in order, where the disorder at the MAC layer occurs because the receiving end fails to receive transport blocks TBs in order due to hybrid automatic retransmission request (Hybrid Automatic Repeat Request, HARQ) retransmission. The sending end may also support RLC PDU resegmentation (resegmentation).

In an RLC unacknowledged mode (Unacknowledged Mode, UM), the RLC entity may be a sending entity or a receiving entity. The sending entity may include at least one of the following functional units: a transmission buffer, a segmentation and concatenation unit, an RLC PDU header information generating unit, and so on. The receiving entity may include at least one of the following functional units: a reception buffer, a reordering function unit, RLC header information removing unit, an SDU reassembly unit, and so on.

Optionally, as another embodiment, the second request message may be further used to indicate that the first base station is responsible for data splitting. The first base station may send a path switch request message to a mobility management entity (Mobility Management Entity, MME) according to the second request message, so that the MME requests, according to the path switch request message, an SGW to switch a data transmission path to a path from the SGW to the first base station.

For example, the second base station is a macro base station, the first base station is a micro base station, the macro base station provides wide coverage and mobility management, the micro base station provides hotspot coverage and capacity, and user service data is mainly sent and received by using the micro base station. In this case, the anchor point may be migrated to the micro base station, to improve data transmission efficiency.

The second base station may decide, according to a condition of a communication procedure, which base station serves as the user plane anchor point, or the second base station and the first base station negotiate to decide which base station serves as the user plane anchor point. For example, the second base station may determine the user plane anchor point according to a splitting decision or splitting proportions. If the first base station takes a larger splitting proportion, for example, 30% of the GBR is distributed to the second base station and 70% of the GBR is distributed to the first base station, the second base station may determine the first base station as the user plane anchor point. If the second base station serves as the user plane anchor point previously, anchor point migration, or referred to as path switch (Path Switch), needs to be performed in this case, to migrate a corresponding E-RAB to an interface between the first base station and the SGW. The first base station may send a path switch request message to the MME, and the MME sends a bearer change request message to the SGW, thereby completing switch of the data transmission path. In this way, by means of anchor point migration, splitting efficiency can be improved and delay can be reduced.

For example, the second base station is a macro base station, the first base station is a micro base station, the UE has a good radio condition in the micro base station, and the micro base station has a light load, so the micro base station may bear a larger proportion of user service data; in this case, the anchor point may be migrated to the micro base station, to improve data transmission efficiency.

It should be noted that, in the downlink direction, data volumes of the first part of downlink RLC PDUs and the second part of downlink RLC PDUs may be statically configured, and may also be dynamically adjusted. In the uplink direction, data volumes of the first part of uplink RLC PDUs and the second part of uplink RLC PDUs may also be statically configured or dynamically adjusted.

For example, before splitting data, the first base station may send a capacity allocation request message to the second base station, to request the second base station to prepare or reserve a radio resource for sending the second part of downlink RLC PDUs or receiving the second part of uplink RLC PDUs. The second base station may reserve a radio resource for the second part of downlink RLC PDUs or the second part of uplink RLC PDUs in response to the capacity allocation request message of the first base station. Alternatively, the second base station may actively send a capacity allocation indication message to the first base station, where the capacity allocation indication message may indicate information about capacity or reserved buffer of the second base station, so that the first base station sends a second part of downlink RLC PDUs corresponding to the capacity or buffer, or the first base station learns, from the capacity allocation indication message, information about a radio resource that the second base station may allocate to the UE for sending the second part of uplink RLC PDUs.

In addition, the second base station may further send a capacity adjustment indication message to the first base station according to a scheduling capability and/or a buffer change situation of the second base station, and notify, by using the capacity adjustment indication message, the first base station of information about a capacity decrease or a capacity increase.

Figure 2B:
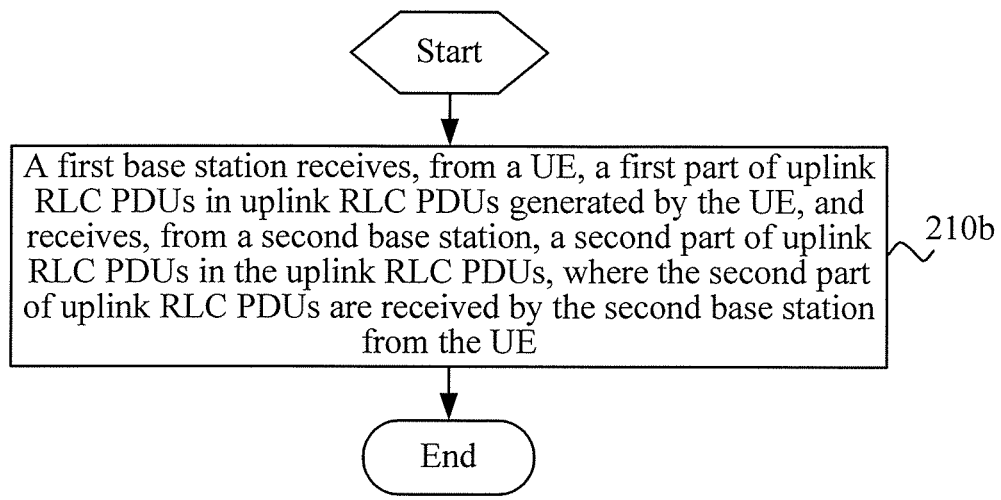
FIG. 2b is a schematic flowchart of a data transmission method according to an embodiment of the present invention.

FIG. 2b is a schematic flowchart of a data transmission method according to an embodiment of the present invention. The method of FIG. 2b is executed by a first base station.

210b: A first base station receives, from a UE, a first part of uplink RLC PDUs in uplink RLC PDUs generated by the UE, and receives, from a second base station, a second part of uplink RLC PDUs in the uplink RLC PDUs, where the second part of uplink RLC PDUs are received by the second base station from the UE.

Optionally, as an embodiment, after receiving the first part of uplink RLC PDUs and the second part of uplink RLC PDUs, the first base station may reassemble the first part of uplink RLC PDUs and the second part of uplink RLC PDUs.

Optionally, as another embodiment, the first base station may generate a second RLC status report according to reception situations of the first part of uplink RLC PDUs and the second part of uplink RLC PDUs, and send the second RLC status report to the UE. The first base station may receive RLC PDUs in an uplink retransmission set determined by the UE according to the second RLC status report, where the uplink retransmission set includes to-be-retransmitted RLC PDUs in the first part of uplink RLC PDUs and/or to-be-retransmitted RLC PDUs in the second part of uplink RLC PDUs.

Optionally, as another embodiment, the first base station may receive RLC PDUs in the uplink retransmission set from the UE. Alternatively, the first base station may receive RLC PDUs in a first uplink retransmission subset from the UE, and receive RLC PDUs in a second uplink retransmission subset from the second base station, where the RLC PDUs in the second uplink retransmission subset are received by the second base station from the UE, and the first uplink retransmission subset and the second uplink retransmission subset are obtained by the UE by dividing the uplink retransmission set. Alternatively, the first base station may receive the RLC PDUs in the uplink retransmission set from the second base station, where the RLC PDUs in the uplink retransmission set are received by the second base station from the UE.

In the embodiment of the present invention, the first base station receives, from the UE, the first part of uplink RLC PDUs in the uplink RLC PDUs generated by the UE, and receives, from the second base station, the second part of uplink RLC PDUs in the uplink RLC PDUs, so that the first base station and the second base station are capable of jointly transmitting data with the UE, thereby improving a peak rate and a throughput of the UE.

In this way, the UE does not need to be handed over between two base stations, thereby also avoiding a service delay or interruption caused by the handover.

Figure 3:
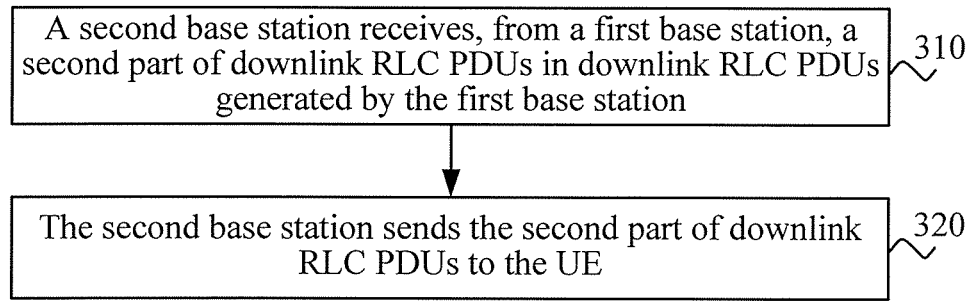
FIG. 3 is a schematic flowchart of a data transmission method according to an embodiment of the present invention.

FIG. 3 is a schematic flowchart of a data transmission method according to an embodiment of the present invention. The method of FIG. 3 is executed by a second base station.

310: A second base station receives, from a first base station, a second part of downlink RLC PDUs in downlink RLC PDUs generated by the first base station.

320: The second base station sends the second part of downlink RLC PDUs to a UE.

The first base station may be a user plane anchor point responsible for data splitting. The first base station may send a first part of downlink RLC PDUs in the downlink RLC PDUs to the UE, and send the second part of downlink RLC PDUs to the second base station. The second base station sends the second part of downlink RLC PDUs to the UE. For example, the first base station may be one of the macro base station 110a and the micro base station 120a in FIG. 1a, and the second base station may be the other. The first base station may also be one of the macro base station 110b and the micro base station 120b in FIG. 1b, and the second base station may be the other.

In the embodiment of the present invention, the second base station sends, to the UE, the second part of downlink RLC PDUs in the downlink RLC PDUs generated by the first base station, thereby improving a peak rate and a throughput of the UE.

Optionally, as another embodiment, the second base station may receive, from the UE, a second part of uplink RLC PDUs in uplink RLC PDUs generated by the UE. The second base station may send the second part of uplink RLC PDUs to the first base station.

That the second base station receives the second part of uplink RLC PDUs from the UE may refer to that the second base station receives a second part of uplink data packets from the UE, and obtains the second part of uplink RLC PDUs after subjecting the second part of uplink data packets to processing at various protocol layers. For example, the second base station may obtain the second part of uplink RLC PDUs after subjecting the second part of uplink data packets to processing at a PHY layer and a MAC layer.

Optionally, as another embodiment, in the RLC AM, the second base station may receive a first RLC status report from the first base station, determine, according to the first RLC status report, to-be-retransmitted RLC PDUs in the second part of downlink RLC PDUs, and retransmit the to-be-retransmitted RLC PDUs in the second part of downlink RLC PDUs to the UE. Alternatively, the second base station may receive a retransmission message from the first base station, and retransmit, according to the retransmission message, to-be-retransmitted RLC PDUs in the second part of downlink RLC PDUs to the UE, where the retransmission message indicates the to-be-retransmitted RLC PDUs in the second part of downlink RLC PDUs.

Specifically, in the RLC AM, the second base station may retransmit, according to the first RLC status report forwarded by the first base station, or the retransmission message generated by the first base station according to the first RLC status report, the to-be-retransmitted RLC PDUs in the second part of downlink RLC PDUs to the UE.

Optionally, as another embodiment, in the RLC AM, the second base station may receive a second retransmission message from the first base station, where the second retransmission message may indicate a second downlink retransmission subset. The second base station may retransmit, according to the second retransmission message, RLC PDUs in the second downlink retransmission subset to the UE.

The first base station may determine a downlink RLC PDU retransmission set according to the first RLC status report, where the downlink RLC PDU retransmission set may include the to-be-retransmitted RLC PDUs in the first part of downlink RLC PDUs and/or the to-be-retransmitted RLC PDUs in the second part of downlink RLC PDUs. The first base station may divide the downlink RLC PDU retransmission set into a first downlink retransmission subset and a second downlink retransmission subset. The first base station may retransmit RLC PDUs in the first downlink retransmission subset to the UE, and notify, by using the second retransmission message, the second base station of RLC PDUs that the second base station needs to be responsible for retransmitting. If one or more RLC PDUs in the second downlink retransmission subset belong to the original first part of downlink RLC PDUs, because the first base station is originally responsible for transmission of the first part of downlink RLC PDUs and the second base station does not have this part of RLC PDUs, the second base station further needs to receive these RLC PDUs from the first base station.

This manner can adapt to a real-time radio resource situation of the first base station and the second base station and satisfy a quality of service (quality of service, QoS) requirement of services, and therefore retransmission efficiency can be improved.

Optionally, as another embodiment, in the RLC AM, the second base station may receive a first RLC status report from the UE. The second base station may forward the first RLC status report to the first base station, so that when the first RLC status report indicates to-be-retransmitted RLC PDUs in a first part of downlink RLC PDUs, the first base station retransmits the to-be-retransmitted RLC PDUs in the first part of downlink RLC PDUs to the UE. When the first RLC status report indicates to-be-retransmitted RLC PDUs in the second part of downlink RLC PDUs, the second base station may retransmit the to-be-retransmitted RLC PDUs in the second part of downlink RLC PDUs to the UE.

In addition, the second base station may forward the first RLC status report to the first base station, so that when the first base station determines, according to the first RLC status report, that to-be-retransmitted RLC PDUs exist in the first part of downlink RLC PDUs, the first base station retransmits the to-be-retransmitted RLC PDUs in the first part of downlink RLC PDUs to the UE.

Optionally, as another embodiment, in the RLC AM, the second base station may receive RLC PDUs in an uplink retransmission set from the UE, and send the RLC PDUs in the uplink retransmission set to the first base station, where the uplink retransmission set may include to-be-retransmitted RLC PDUs in a first part of uplink RLC PDUs and/or to-be-retransmitted RLC PDUs in a second part of uplink RLC PDUs. Alternatively, the second base station may receive RLC PDUs in a second uplink retransmission subset from the UE, and send the RLC PDUs in the second uplink retransmission subset to the first base station, where the second uplink retransmission subset is obtained by the UE by dividing the uplink retransmission set.

In the RLC AM, in an uplink direction, the UE may retransmit, to the second base station, all to-be-retransmitted uplink RLC PDUs, and the second base station sends, to the first base station, these to-be-retransmitted uplink RLC PDUs. The UE may also divide the to-be-retransmitted uplink RLC PDUs into two parts, where one part is retransmitted to the first base station, and the other part is retransmitted to the second base station; the second base station sends the received part of RLC PDUs to the first base station.

Optionally, as another embodiment, the second base station may send, on a second cell of the second base station, the second part of downlink RLC PDUs to the UE.

Optionally, as another embodiment, the second base station may receive a first request message from the first base station, where the first request message may be used to instruct the second base station to configure the second cell for the UE. The second base station may determine resource information of the second cell according to the first request message. The second base station may send a first response message to the first base station, where the first response message carries the resource information of the second cell, so that the first base station notifies the UE of the resource information of the second cell.

Optionally, as another embodiment, the first request message may be further used to instruct the second base station to establish a DRB for the UE. The second base station may establish, according to the first request message, an RLC entity and a logical channel that are corresponding to the DRB.

The second base station does not serve as a user plane anchor point, and therefore, a PDCP entity may be not established. Alternatively, the second base station may establish a PDCP entity, and because a function of the PDCP entity is not needed, the PDCP entity may be disabled after being established.

In the RLC AM, the RLC entity may include a sending end and a receiving end; the sending end may include at least one of the following functional units: a transmission buffer and a retransmission buffer; and optionally, the sending end includes a segmentation unit and an RLC PDU header information generating unit, and may only support an RLC PDU resegmentation function and generating RLC header information due to resegmentation; the transmission buffer is used to receive RLC PDUs sent by the first base station; the retransmission buffer is used to store RLC PDUs potentially to be retransmitted, for example, after being sent to the UE for the first time, an RLC PDU in the transmission buffer is migrated to the retransmission buffer. Optionally, the sending end includes an RLC control unit, where the RLC control unit controls RLC PDU retransmission of the second base station according to an RLC status report from the first base station; the RLC control unit controls RLC PDU retransmission of the second base station according to an RLC status report from the UE, and forwards the complete RLC status report to the second base station; and the RLC control unit itself does not generate an RLC status report, and does not need to maintain an ARQ send window or receive window. The sending end may also only include a transmission buffer, which is used to receive RLC PDUs sent by the first base station and forward the RLC PDUs to the UE; the second base station does not need to support RLC PDU retransmission; or the first base station retransmits an RLC PDU, which needs to be retransmitted, as a new RLC PDU to the transmission buffer of the second base station, so that the RLC PDU is forwarded by the second base station to the UE. The receiving end may include at least one of the following functional units: a reception buffer; optionally, the receiving end includes a reordering function; optionally, the receiving end includes a routing function; optionally, the receiving end includes an SDU reassembly unit, but the SDU reassembly unit is set to a disabled status.

In an RLC UM, the RLC entity may be a sending entity or a receiving entity. The sending entity may include at least one of the following functional units: a transmission buffer; optionally, the sending entity further includes a segmentation unit and an RLC PDU header information generating unit, and may only support an RLC PDU resegmentation function and generate RLC header information due to resegmentation. The receiving entity may include at least one of the following functional units: a reception buffer; optionally, the receiving entity includes a reordering function; optionally, the receiving entity includes an SDU reassembly unit, but the SDU reassembly unit is set to a disabled status.

Optionally, as another embodiment, the second base station may send a second request message to the first base station, where the second request message may be used to instruct the first base station to configure a first cell of the first base station for the UE. The second base station receives a second response message from the first base station, where the second response message carries resource information of the first cell, and the resource information of the first cell is determined by the first base station according to the second request message. The second base station sends an RRC connection reconfiguration message to the UE, where the RRC connection reconfiguration message carries the resource information of the first cell.

Optionally, as another embodiment, the second request message may be further used to instruct the first base station to establish a DRB for the UE.

Figure 4:
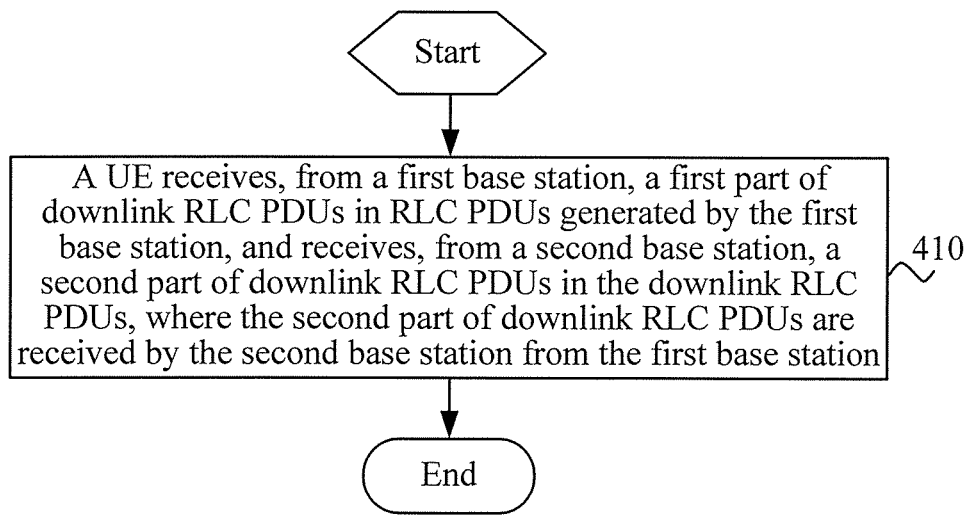
FIG. 4 is a schematic flowchart of a data transmission method according to an embodiment of the present invention.

FIG. 4 is a schematic flowchart of a data transmission method according to an embodiment of the present invention. The method of FIG. 4 is executed by a UE, which, for example, may be the UE 130$a$ in FIG. 1$a$, or UE 130$b$ in FIG. 1$b$.

410: A UE receives, from a first base station, a first part of downlink RLC PDUs in RLC PDUs generated by the first base station, and receives, from a second base station, a second part of downlink RLC PDUs in the downlink RLC PDUs, where the second part of downlink RLC PDUs are received by the second base station from the first base station.

In the embodiment of the present invention, the UE receives, from the first base station, the first part of downlink RLC PDUs in the downlink RLC PDUs, and receives, from the second base station, the second part of downlink RLC PDUs that are obtained by the second base station from the first base station, so that the UE is capable of transmitting data with the two base stations jointly, thereby improving a peak rate and a throughput of the UE.

In this way, the UE located in a common coverage area of the two base stations does not need to be handed over between the two base stations, thereby also avoiding a service delay or interruption caused by the handover.

Optionally, as an embodiment, the UE may reassemble the first part of downlink RLC PDUs and the second part of downlink RLC PDUs to form downlink RLC SDUs.

Optionally, as another embodiment, the UE may generate uplink RLC PDUs. The UE may send a first part of uplink RLC PDUs in the uplink RLC PDUs to the first base station, and send a second part of uplink RLC PDUs in the uplink RLC PDUs to the second base station.

A PDCP layer of the UE may receive IP data packets from an application layer and use the IP data packets as PDCP SDUs; after processing at the PDCP layer, PDCP PDUs are generated and passed to an RLC layer; and the RLC layer uses the PDCP PDUs as RLC SDUs, and generates uplink RLC PDUs from the RLC SDUs.

In an uplink direction, the UE may send a part of RLC PDUs to the first base station, and send another part of RLC PDUs to the second base station, and the second base station sends this part of RLC PDUs to the first base station, thereby improving a peak rate and a throughput of the UE.

It should be noted that, that the UE sends a first part of uplink RLC PDUs to the first base station may refer to that the UE sends the first part of uplink RLC PDUs to the first base station after subjecting the first part of uplink RLC PDUs to processing at various protocol layers, for example, the UE may send the first part of uplink RLC PDUs to the first base station after subjecting the first part of uplink RLC PDUs to processing at a MAC layer and a PHY layer. A procedure in which the UE sends a second part of uplink RLC PDUs to the second base station is similar, and is not described herein again to avoid repetition.

Optionally, as another embodiment, the UE generates a first RLC status report according to reception situations of the first part of downlink RLC PDUs and the second part of downlink RLC PDUs, where the first RLC status report indicates to-be-retransmitted RLC PDUs in the first part of downlink RLC PDUs and/or to-be-retransmitted RLC PDUs in the second part of downlink RLC PDUs. The UE may send the first RLC status report to the first base station or the second base station. The UE may receive the to-be-retransmitted RLC PDUs in the first part of downlink RLC PDUs from the first base station and/or receive the to-be-retransmitted RLC PDUs in the second part of downlink RLC PDUs from the second base station.

In an RLC AM, the UE may generate a first RLC status report according to reception situations of the first part of downlink RLC PDUs and the second part of downlink RLC PDUs. The UE may send the first RLC status report to the first base station, and may also send the first RLC status report to the second base station. If to-be-retransmitted RLC PDUs exist in the first part of downlink RLC PDUs, the UE may receive the to-be-retransmitted RLC PDUs in the first part of downlink RLC PDUs from the first base station. If to-be-retransmitted RLC PDUs exist in the second part of downlink RLC PDUs, the UE may receive the to-be-retransmitted RLC PDUs in the second part of downlink RLC PDUs from the second base station.

It should be noted that, the UE may also divide the first RLC status report into two segments according to an uplink resource situation, and send the two segments of the first RLC status report to the first base station and the second base station at the same time; the second base station forwards, to the first base station, a segment of the first RLC status report received by the second base station.

Optionally, as another embodiment, in the RLC AM, the UE generates a first RLC status report according to reception situations of the first part of downlink RLC PDUs and the second part of downlink RLC PDUs, and sends the first RLC status report to the first base station. The UE may receive RLC PDUs in a first downlink retransmission subset from the first base station, and receive RLC PDUs in a second downlink retransmission subset from the second base station, where the first downlink retransmission subset and the second downlink retransmission subset are obtained by the first base station by dividing a downlink RLC PDU retransmission set, the downlink RLC PDU retransmission set may be determined by the first base station according to the first RLC status report, and the downlink RLC PDU retransmission set may include to-be-retransmitted RLC PDUs in the first part of downlink RLC PDUs and/or to-be-retransmitted RLC PDUs in the second part of downlink RLC PDUs received from the second base station.

Optionally, as another embodiment, in the RLC AM, the UE may receive a second RLC status report from the first base station. The UE may determine an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs. The UE sends RLC PDUs in the uplink retransmission set to the first base station, or sends RLC PDUs in the uplink retransmission set to the second base station, or sends RLC PDUs in a first uplink retransmission subset to the first base station and sends RLC PDUs in a second uplink retransmission subset to the second base station, where the first uplink retransmission subset and the second uplink retransmission subset are obtained by the UE by dividing the uplink retransmission set.

In the RLC AM, the UE may determine, according to the second RLC status report, to-be-retransmitted RLC PDUs, that is, the uplink retransmission set. The UE may decide, according to an uplink grant, how to retransmit the to-be-retransmitted RLC PDUs. The UE may retransmit, to the first base station, all the to-be-retransmitted RLC PDUs, and may also retransmit, to the second base station, all the to-be-retransmitted RLC PDUs. Alternatively, the UE may divide the to-be-retransmitted RLC PDUs into two parts, that is, the first uplink retransmission subset and the second uplink retransmission subset, and retransmit RLC PDUs in the two subsets to the first base station and the second base station respectively.

In the RLC AM, according to the second RLC status report, when the second RLC status report indicates an RLC PDU which, as acknowledged by the first base station, is received successfully, the UE may update an RLC AM send window and a corresponding status variable, so as to continue to send a new RLC PDU.

Optionally, as another embodiment, the UE receives the first part of downlink RLC PDUs from a first cell of the first base station, and receives the second part of downlink RLC PDUs from a second cell of the second base station, where the first cell and the second cell are located on different carriers.

After CA is performed on a carrier of the first base station and a carrier of the second base station, the UE may transmit data through the first cell on the carrier of the first base station and the second cell on the carrier of the second base station.

Optionally, as another embodiment, the UE may receive an RRC connection reconfiguration message from the first base station, where the RRC connection reconfiguration message carries resource information of the second cell, and the resource information of the second cell is determined by the second base station.

It should be understood that, the UE may also receive an RRC connection reconfiguration message from the second base station, where the RRC connection reconfiguration message carries resource information of the second cell, and the resource information of the second cell is determined by the second base station.

Optionally, as another embodiment, the UE may receive an RRC connection reconfiguration message from the second base station, where the RRC connection reconfiguration message carries resource information of the first cell, and the resource information of the first cell is determined by the first base station.

It should be understood that, the UE may also receive an RRC connection reconfiguration message from the first base station, where the RRC connection reconfiguration message carries resource information of the first cell, and the resource information of the first cell is determined by the first base station.

The following describes the embodiment of the present invention in detail with reference to specific examples; it should be noted that, these examples are merely provided to help a person skilled in the art understand the embodiment of the present invention better, but are not intended to limit the scope of the embodiment of the present invention.

Figure 5:
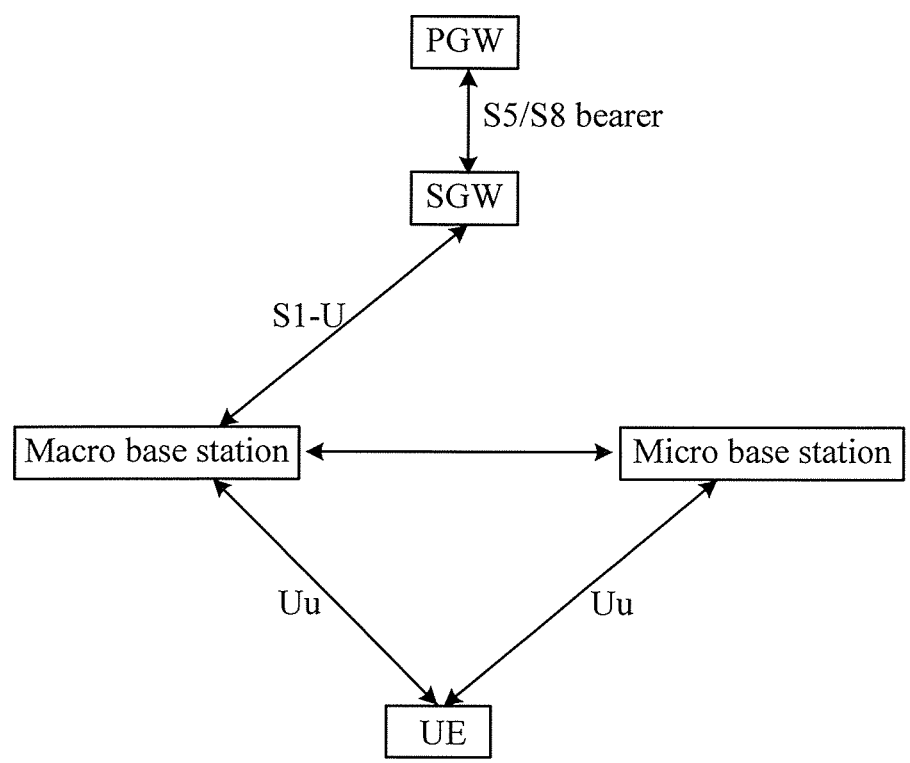
FIG. 5 is a schematic diagram of a data transmission procedure according to an embodiment of the present invention.

FIG. 5 is a schematic diagram of a data transmission procedure according to an embodiment of the present invention.

In FIG. 5, a first base station being a macro base station and a second base station being a micro base station are used as an example for descriptions. For example, the first base station may be the macro base station 110a in FIG. 1a or the macro base station 110b in FIG. 1b, and the second base station may be the micro base station 120a in FIG. 1a or the micro base station 120b in FIG. 1b. The UE may be the UE 130a in FIG. 1a, and may also be the UE 130b in FIG. 1b.

In FIG. 5, the macro base station serves as a user plane anchor point. The macro base station may receive, through an S1-U interface and from an SGW, downlink data delivered by a packet data gateway (Packet Data Gateway, PGW), and split the downlink data, where one part is sent to the UE through a Uu interface, and another part is sent to the UE by the micro base station. The macro base station may also receive uplink data from the UE through the Uu interface, receive, from the micro base station, uplink data sent by the UE to the micro base station, and send the two parts of uplink data to the SGW through the S1-U interface after processing the two parts of uplink data; the two parts of uplink data after the processing are sent by the SGW to the PGW.

Figure 6:
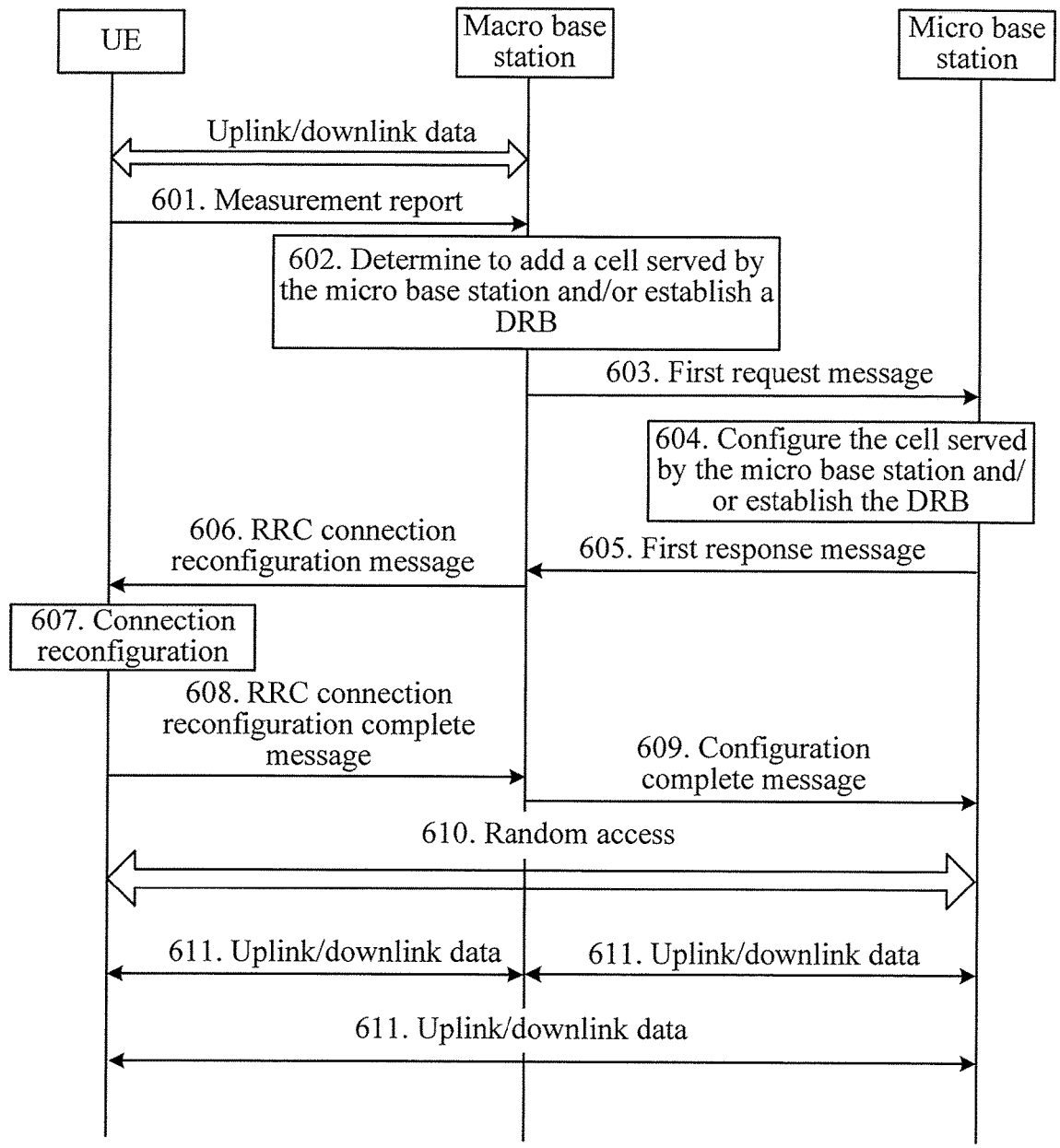
FIG. 6 is a schematic flowchart of a data splitting configuration procedure according to an embodiment of the present invention.

The following describes in detail a data splitting configuration procedure of FIG. 5 with reference to FIG. 6.

FIG. 6 is a schematic flowchart of a data splitting configuration procedure according to an embodiment of the present invention.

It is assumed that a UE has established an RRC connection with a macro base station, and a cell of the macro base station serves the UE currently. The macro base station may complete a data splitting configuration procedure with a micro base station while transmitting data with the UE. The following describes the procedure in detail.

601: A UE sends a measurement report to a macro base station.

For example, the UE may generate a measurement report based on a cell specific reference signal (Cell Specific Reference Signal, CRS) or a channel state information reference signal (Channel State Information Reference Signal, CSI-RS). The measurement report may include a measurement result of RSRP of a cell of the macro base station and a neighboring cell.

602: The macro base station determines, according to the measurement report, to add a cell of a micro base station and/or establish a DRB.

Adding a second cell may refer to aggregating a cell of the micro base station for the UE. Establishing a DRB may refer to that the micro base station establishes a DRB for the UE.

In addition, the macro base station may also determine, according to a measurement result of the macro base station about an SRS, to add a cell of the micro base station, and may also determine, according to other measurement results such as a CQI reported by the UE, to add a cell of the micro base station.

In addition, the macro base station may also determine, according to information of a DRB, such as a QoS parameter, a traffic volume, a throughput, and a peak rate, to establish a DRB.

It should be noted that, there is no definite sequence for executing the procedure in which the macro base station determines to add a cell of the micro base station and the procedure in which the macro base station determines to establish a DRB, and the two procedures may also be performed at the same time. For example, the macro base station may simultaneously determine to add a second cell and/or establish a DRB, and may also first determine to add a cell of the micro base station and then determine to establish a DRB, or first determine to establish a DRB and then determine to add a cell of the micro base station, which is not limited in the embodiment of the present invention.

603: The macro base station sends a first request message to the micro base station.

The first request message may instruct the micro base station to configure the cell of the micro base station for the UE. The first request message may further instruct the micro base station to establish the DRB for the UE.

Corresponding to the foregoing step 602, the macro base station may instruct, in the first request message, the micro base station to configure the cell of the micro base station and establish the DRB, and may also send the first request message to the micro base station twice, to separately instruct the micro base station to configure the cell of the micro base station and establish the DRB.

When the first request message instructs the micro base station to establish a DRB for the UE, the macro base station may add configuration information of the DRB in the first request message. For example, the DRB configuration information may include at least one of the following: an evolved radio access bearer (Evolved Radio Access Bearer, E-RAB) identifier, an E-RAB QoS parameter, a DRB identifier, RLC configuration information, and logical channel configuration information. In addition, the DRB configuration information may also include other related information. The E-RAB quality of service parameter may be a QoS parameter after the macro base station makes a splitting decision. For example, the micro base station may segment a guaranteed bit rate (Guaranteed Bit Rate, GBR); if 60% is distributed to the DRB of the macro base station, and 40% is distributed to the micro base station, a GBR parameter value sent to the micro base station is 40% multiplied by an original GBR parameter value.

604: The micro base station configures the cell of the micro base station and establishes the DRB for the UE according to the first request message.

The micro base station may perform admission control according to the first request message, and configure a resource of the cell of the micro base station, so as to determine resource information of the cell of the micro base station.

If the first request message indicates establishing the DRB for the UE, the micro base station may establish, according to the configuration information of the DRB carried in the first request message, an RLC entity and a logical channel that are corresponding to the DRB, and set a DRB parameter, an RLC parameter, a logical channel parameter, a QoS parameter, and so on. The QoS parameter may be configured according to a splitting proportion carried in the first request message.

It should be noted that, the micro base station may not establish a PDCP entity. Alternatively, the micro base station may establish a PDCP entity, and disable the PDCP entity.

It should be further noted that, the micro base station configuring the cell of the micro base station and the micro base station establishing the DRB are two procedures, and an execution sequence thereof is not definite. However, to implement the subsequent data splitting procedure, it is necessary to complete the both procedures.

605: The micro base station sends a first response message to the macro base station.

The first response message may carry the resource information of the cell of the micro base station.

606: The macro base station sends an RRC connection reconfiguration message to the UE.

The RRC connection reconfiguration message may carry the resource information of the cell of the micro base station.

In a general case, previous DRB configuration may be used as DRB configuration of the UE. If the DRB of the UE needs to be reconfigured, the macro base station may add configuration information of the DRB in the RRC connection reconfiguration message.

607: The UE performs connection reconfiguration according to the RRC connection reconfiguration message.

The UE may configure a related radio resource of the cell of the micro base station according to the resource information of the cell of the micro base station carried in the RRC connection reconfiguration message.

If the RRC connection reconfiguration message further carries the configuration information of the DRB, the UE may further reconfigure the DRB according to the configuration information of the DRB.

608: The UE sends an RRC connection reconfiguration complete message to the macro base station.

After the reconfiguration succeeds, the UE notifies the macro base station that the reconfiguration is completed.

609: The macro base station sends a configuration complete message to the micro base station.

The macro base station notifies, by using the configuration complete message, the micro base station that the UE completes the connection reconfiguration.

610: The UE performs a random access procedure with the micro base station, to complete uplink synchronization with the micro base station.

It should be noted that step 610 may also be executed between step 607 and step 608. If the UE completes the uplink synchronization with the micro base station after step 608, in step 608, the UE may also send the RRC connection reconfiguration complete message to the micro base station, and the micro base station forwards the RRC connection reconfiguration complete message to the macro base station. The UE may notify the macro base station after the random access of the micro base station succeeds, so that the macro base station starts to distribute data to the micro base station.

611: The macro base station transmits data with the UE, and transmits data with the UE through the micro base station.

In a downlink direction, the macro base station may obtain downlink data from an SGW, and generate downlink RLC PDUs according to the downlink data.

The macro base station may send a first part of downlink RLC PDUs in the downlink RLC PDUs to the UE, and send a second part of downlink RLC PDUs in the downlink RLC PDUs to the micro base station. The micro base station may send the second part of downlink RLC PDUs to the UE.

In an uplink direction, the UE may generate uplink RLC PDUs, send a first part of uplink RLC PDUs in the uplink RLC PDUs to the macro base station, and send a second part of uplink RLC PDUs in the uplink RLC PDUs to the micro base station. The micro base station sends the second part of uplink RLC PDUs to the macro base station. The macro base station sends the two parts of uplink RLC PDUs to the SGW after reassembling and performing other processing on the two parts of uplink RLC PDUs.

It should be understood that, sequence numbers of the foregoing procedures do not indicate an execution sequence. The execution sequence of the procedures should be determined according to functions and internal logic thereof, and should not constitute any limitation to the implementation procedure of the embodiment of the present invention.

In the embodiment of the present invention, the macro base station serves as the user plane anchor point, so that the macro base station and the micro base station are capable of jointly transmitting data with the UE, thereby improving a peak rate and a throughput of the UE.

In addition, the UE does not need to be handed over between the macro base station and the micro base station, thereby also avoiding service delay or interruption caused by the handover.

In the foregoing FIG. 5 and FIG. 6, the macro base station serves as the user plane anchor point; in the embodiment of the present invention, the micro base station may also serve as the user plane anchor point. The following provides descriptions with reference to FIG. 7 and FIG. 8.

Figure 7:
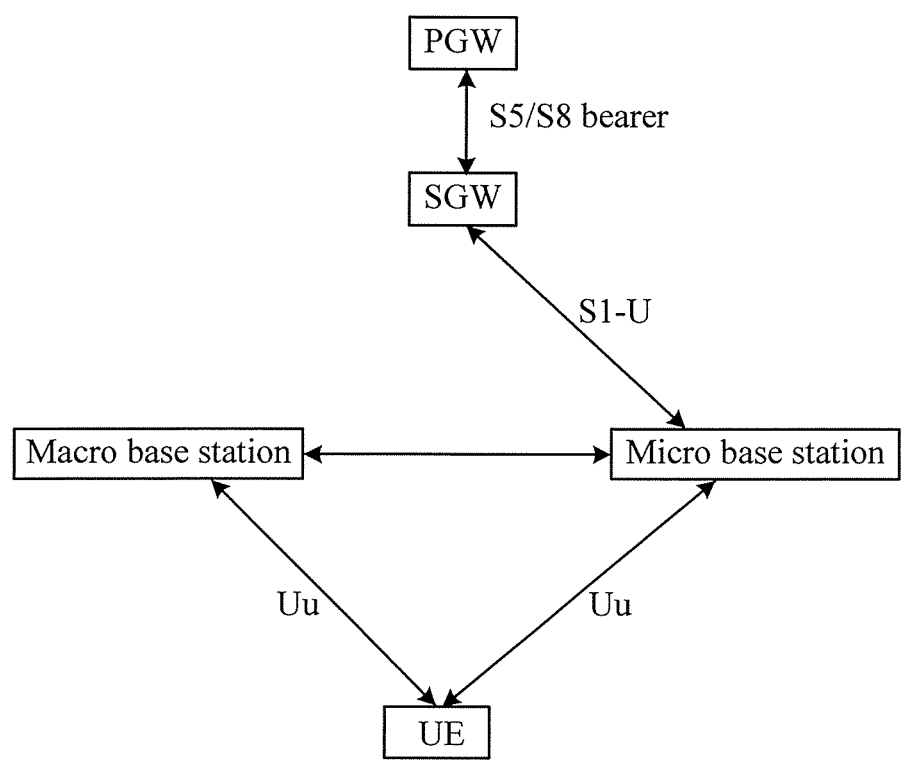
FIG. 7 is a schematic diagram of a data transmission procedure according to an embodiment of the present invention.

FIG. 7 is a schematic diagram of a data transmission procedure according to an embodiment of the present invention.

In FIG. 7, a first base station being a micro base station and a second base station being a macro base station are used as an example for descriptions. For example, the first base station may be the micro base station 120a in FIG. 1a or the micro base station 120b in FIG. 1b, and the second base station may be the macro base station 110a in FIG. 1a or the macro base station 110b in FIG. 1b. The UE may be the UE 130a in FIG. 1a or the UE 130b in FIG. 1b.

In FIG. 7, the micro base station serves as a user plane anchor point. The micro base station may receive, through an S1-U interface and from an SGW, downlink data delivered by a PGW, and split the downlink data, where one part is sent to the UE through a Uu interface, and another part is sent to the UE by the macro base station. The micro base station may also receive uplink data from the UE through the Uu interface, receive, from the macro base station, uplink data sent by the UE to the macro base station, and send the two parts of uplink data to the SGW through the S1-U interface after processing the two parts of uplink data; the two parts of uplink data after the processing are sent by the SGW to the PGW.

Figure 8:
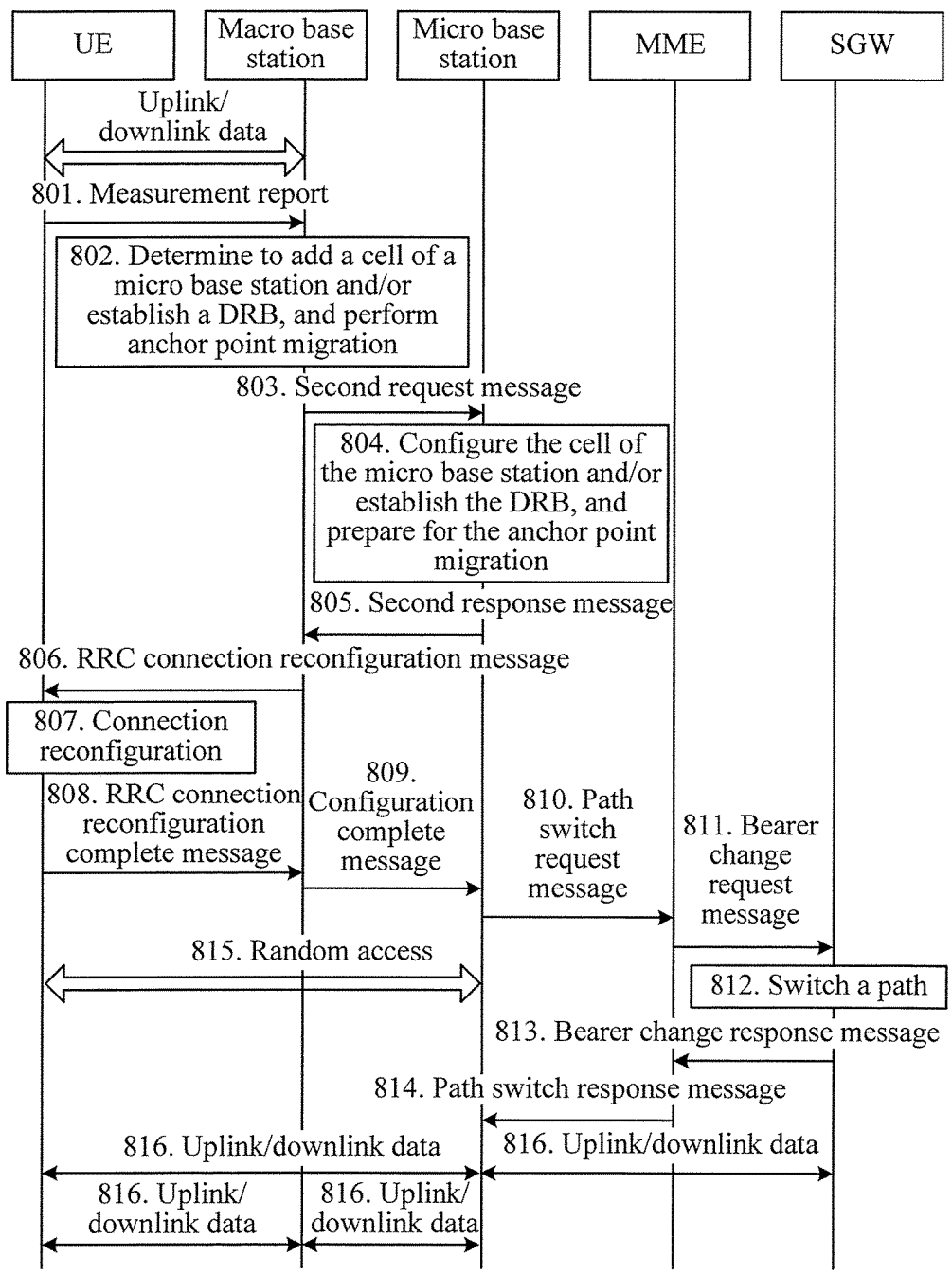
FIG. 8 is a schematic flowchart of a data splitting configuration procedure according to an embodiment of the present invention.

The following describes in detail a data splitting configuration procedure of FIG. 7 with reference to FIG. 8.

FIG. 8 is a schematic flowchart of a data splitting configuration procedure according to an embodiment of the present invention.

It is assumed that a UE has established an RRC connection with a macro base station, and a cell of the macro base station serves the UE currently. The macro base station may complete a data splitting configuration procedure with a micro base station while transmitting data with the UE. The following describes the procedure in detail.

Step 801 is similar to step 601 in FIG. 6, and is not described herein again to avoid repetition.

802: The macro base station determines, according to the measurement report, to add a cell of a micro base station and/or establish a DRB, and determines to perform anchor point migration.

The procedure in which the macro base station determines to add the cell of the micro base station and establish the DRB is similar to step 602 in FIG. 6, and is not described herein again to avoid repetition.

The macro base station may determine, based on related information such as the measurement report and according to a splitting policy or a splitting proportion, the micro base station as an anchor point. For example, if the micro base station takes a larger splitting proportion, for example, 30% of the GBR is distributed to the macro base station and 70% of the GBR is distributed to the micro base station, the macro base station may determine to perform anchor point migration, so that the micro base station serves as a user plane anchor point, that is, path switch is performed, and a corresponding E-RAB is migrated to an S1-U interface between the micro base station and the SGW.

In addition, in a case where multiple DRBs are split, splitting proportions of these DRBs may be kept consistent in the splitting policy as far as possible, for example, in a case where two DRBs are split, it may be specified for the both DRBs in the splitting policy that the micro base station takes a larger splitting proportion and the macro base station takes a smaller splitting proportion.

803: The macro base station sends a second request message to the micro base station.

The second request message may instruct the micro base station to configure the cell of the micro base station for the UE. The second request message may further instruct the micro base station to establish the DRB for the UE.

In addition, the second request message may further instruct the micro base station to serve as the user plane anchor point.

The procedure of step 803 is similar to that of step 603 in FIG. 6, and is not described herein again to avoid repetition.

804: According to the second request message, the micro base station configures the cell of the micro base station, establishes the DRB for the UE, and prepares for the anchor point migration.

The procedure in which the micro base station configures the cell of the micro base station for the UE is similar to that of step 604 in FIG. 6, and is not described herein again to avoid repetition.

If the second request message indicates establishing the DRB for the UE, the micro base station may establish, according to the configuration information of the DRB carried in the second request message, a PDCP entity, an RLC entity, and a logical channel that are corresponding to the DRB, and set a DRB parameter, a PDCP parameter, an RLC parameter, a logical channel parameter, a QoS parameter, and so on. The QoS parameter may be configured according to a splitting proportion carried in the second request message.

Step 804 differs from step 604 in that, the micro base station needs to prepare for the anchor point migration.

805: The micro base station sends a second response message to the macro base station.

The second response message may carry the resource information of the cell of the micro base station. The second response message may further instruct the micro base station to prepare for the anchor point migration.

806: The macro base station sends an RRC connection reconfiguration message to the UE.

The RRC connection reconfiguration message may carry the resource information of the cell of the micro base station.

In a general case, previous DRB configuration may be used as DRB configuration of the UE. If the DRB of the UE needs to be reconfigured, the macro base station may add configuration information of the DRB in the RRC connection reconfiguration message.

807: The UE performs RRC connection reconfiguration according to the RRC connection reconfiguration message.

The UE may configure a related radio resource of the cell of the micro base station according to the resource information of the cell of the micro base station carried in the RRC connection reconfiguration message.

If the RRC connection reconfiguration message further carries the configuration information of the DRB, the UE may further reconfigure the DRB according to the configuration information of the DRB.

808: The UE sends an RRC connection reconfiguration complete message to the macro base station.

After the reconfiguration succeeds, the UE notifies the macro base station that the reconfiguration is completed.

809: The macro base station sends a configuration complete message to the micro base station.

The macro base station notifies, by using the configuration complete message, the micro base station that the UE completes the connection reconfiguration.

810: The micro base station sends a path switch request message to an MME.

The path switch request message may indicate switching a data transmission path to the micro base station.

811: The MME sends a bearer change request message to an SGW.

The bearer change request message may request the SGW to switch the data transmission path.

812: The SGW switches the path according to the bearer change request message.

813: The SGW sends a bearer change response message to the MME.

814: The MME sends a path switch response message to the micro base station.

815: The UE performs a random access procedure with the micro base station, to complete uplink synchronization with the micro base station.

It should be noted that, step 815 may be performed in parallel with the path switch procedure of step 810 to step 814.

Before step 815, the macro base station may continue the data transmission procedure with the UE, to complete transmission of data that has been buffered in radio bearers (Radio Bearer, RB) (including an SRB and a DRB).

816: The micro base station transmits data with the UE, and transmits data with the UE through the macro base station. The micro base station transmits data with the SGW.

In a downlink direction, the micro base station may obtain downlink data from the SGW, and generate downlink RLC PDUs according to the downlink data.

The micro base station may send a first part of downlink RLC PDUs in the downlink RLC PDUs to the UE, and send a second part of downlink RLC PDUs in the downlink RLC PDUs to the macro base station. The macro base station may send the second part of downlink RLC PDUs to the UE.

In an uplink direction, the UE may generate uplink RLC PDUs, send a first part of uplink RLC PDUs in the uplink RLC PDUs to the micro base station, and send a second part of uplink RLC PDUs in the uplink RLC PDUs to the macro base station. The macro base station sends the second part of uplink RLC PDUs to the micro base station. The micro base station sends the two parts of RLC PDUs to the SGW after reassembling and performing subsequent processing on the two parts of RLC PDUs.

It should be understood that, sequence numbers of the foregoing procedures do not indicate an execution sequence. The execution sequence of the procedures should be determined according to functions and internal logic thereof, and should not constitute any limitation to the implementation procedure of the embodiment of the present invention.

In the embodiment of the present invention, the macro base station serves as the user plane anchor point, so that the macro base station and the micro base station are capable of jointly transmitting data with the UE, thereby improving a peak rate and a throughput of the UE.

In addition, the UE does not need to be handed over between the macro base station and the micro base station, thereby also avoiding service delay or interruption caused by the handover.

Figure 9:
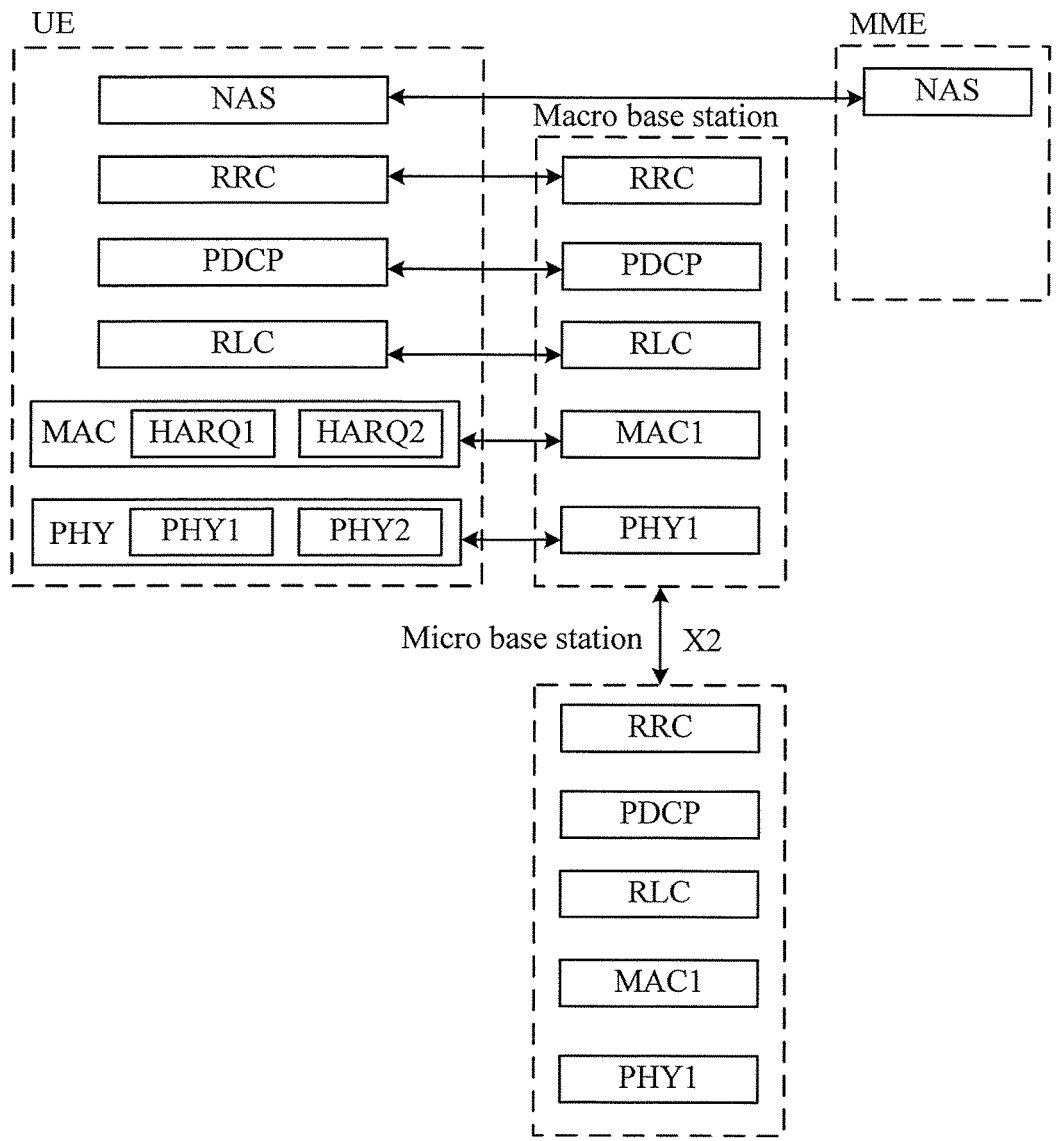
FIG. 9 is a schematic diagram of an example of a control plane protocol stack according to an embodiment of the present invention.

FIG. 9 is a schematic diagram of an example of a control plane protocol stack according to an embodiment of the present invention.

The example of the control plane protocol stack in FIG. 9 is applicable to examples of FIG. 5 to FIG. 8. It is assumed that initially, a UE and a macro base station have established an RRC connection; a control plane function is provided by the macro base station, all control plane messages are transmitted between the macro base station and the UE, and data of a signaling radio bearer (Signaling Radio Bearer, SRB) is not split. Control plane related signaling may be transmitted between the macro base station and a micro base station through an X2 interface or a direct connection between the macro base station and the micro base station. It should be understood that, although the SRB being not split is used as an example for descriptions in FIG. 9, in the embodiment of the present invention, data of the SRB may also be split.

As shown in FIG. 9, connection lines between RRC layers, PDCP layers, RLC layers, MAC layers, and PHY layers of the macro base station and the UE represent logical connections, on a radio interface between the macro base station and the UE, between peer protocol layers, and represent that after data sent at protocol layers of a sending end is processed at peer protocol layers of a receiving end, data having a same format and same content as those of the data at the sending end is formed.

For communication between the macro base station and the UE, a transmission procedure of control plane data may be as follows: on a side of the sending end, after being processed at the protocol layers, namely, the PDCP layer, RLC layer, MAC layer, and PHY layer, an RRC message is sent to the receiving end through the radio interface; control plane data received by the receiving end through the radio interface is first processed at the PHY layer, and is then passed to the MAC layer, the RLC layer, the PDCP layer, and the RRC layer successively for processing. It should be understood that, herein, if the sending end is the macro base station, the receiving end is the UE. If the sending end is the UE, the receiving end is the macro base station.

It is possible that no control plane data is transmitted between the micro base station and the UE.

It should be noted that, in the example of FIG. 9, the control plane function being provided by the macro base station is used as an example for descriptions. However, in the embodiment of the present invention, the control plane function may also be provided by the macro base station and the micro base station jointly, for example, in a case where a UE located in a common coverage area of the macro base station and the micro base station initially has RRC connections with both the macro base station and the micro base station, the control plane function may be provided by the macro base station and the micro base station jointly.

Figure 10:
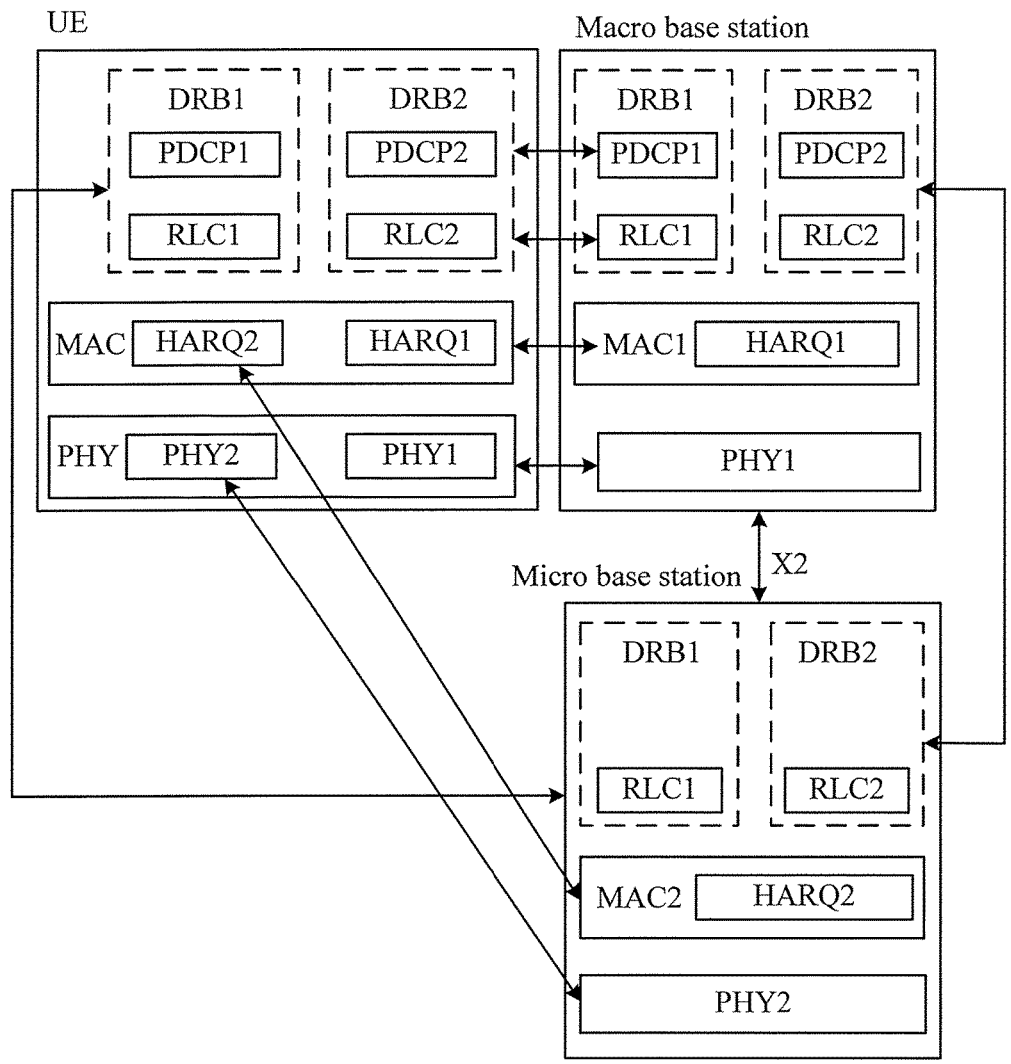
FIG. 10 is a schematic diagram of an example of a user plane protocol stack according to an embodiment of the present invention.

FIG. 10 is a schematic diagram of an example of a user plane protocol stack according to an embodiment of the present invention.

In FIG. 10, it is assumed that a macro base station is a user plane anchor point, and two DRBs of the macro base station need to be split.

1) A user plane protocol stack of the macro base station is described as follows:

On a side of the macro base station, DRBs to be split are DRB1 and DRB2; a PDCP entity PDCP1, an RLC entity RLC1, and a logical channel LCH1 that are corresponding to DRB1 are established; PDCP2, RLC2, and LCH2 that are corresponding to DRB2 are established; the logical channel is located between an RLC layer and a MAC layer, and neither LCH1 nor LCH2 is shown in FIG. 10. It is assumed that in the macro base station, a carrier participating in aggregation is CC1, and a corresponding cell is a primary cell (Primary Cell, PCell), a MAC layer MAC1 and a PHY layer PHY1 are set for the PCell, and an HARQ entity HARQ1 is set at the MAC layer. LCH1 corresponding to DRB1 and LCH2 corresponding to DRB2 are both mapped to a downlink shared transport channel (Downlink Shared Channel, DL-SCH) DL-SCH1 or an uplink shared transport channel (Uplink Shared Channel, UL-SCH) UL-SCH1 by using the MAC layer; the transport channel is located between the MAC layer and the PHY layer, and neither DL-SCH1 nor UL-SCH1 is shown in FIG. 10.

Connection lines between PDCP layers, RLC layers, MAC layers, and PHY layers of the macro base station and the UE represent logical connections, on a radio interface between the macro base station and the UE, between peer protocol layers, and represent that after data sent at protocol layers of a sending end is processed at peer protocol layers of a receiving end, data having a same format and same content as those of the data at the sending end is formed. DRB1 of the macro base station is corresponding to DRB1 of the UE, and correspondingly, PDCP1 and RLC1 of the macro base station are corresponding to PDCP1 and RLC1 of the UE; PDCP2 and RLC2 of the macro base station are corresponding to PDCP2 and RLC2 of the UE.

A connection line, at the RLC layer, between the macro base station and the micro base station represents that data splitting is performed at the RLC layer; RLC1 and RLC2 of the macro base station are corresponding to RLC1 and RLC2 of the micro base station respectively.

For communication between the macro base station and the UE, a transmission procedure of user plane data may be as follows:

For downlink data, an Internet Protocol (Internet Protocol, IP) data packet from an SGW is sent to the UE through the radio interface after being processed at the protocol layers, namely, the PDCP layer, the RLC layer, the MAC layer, and the PHY layer of the macro base station. The UE may first process the data, which is received through the radio interface, at the PHY layer, and then pass the data to the MAC layer, the RLC layer, and the PDCP layer successively for processing.

For uplink data, after processing an IP data packet, which is from an application layer, at the protocol layers, namely, the PDCP layer, the RLC layer, the MAC layer, and the PHY layer, the UE sends the processed IP data packet to the macro base station through the radio interface. The macro base station may first process the data, which is received through the radio interface, at the PHY layer, and then pass the data to the MAC layer, the RLC layer, and the PDCP layer successively for processing.

2) A user plane protocol stack of the micro base station is described as follows:

On a side of the micro base station, correspondingly, DRBs to be split are DRB1 and DRB2, which are used to split data of DRB1 and data of DRB2 of the macro base station respectively, and splitting is performed at the RLC layer. The RLC layer of the micro base station provides a transmission buffer and a retransmission buffer, and can support an RLC PDU resegmentation function. Corresponding RLC entity RLC1 and logical channel LCH1 are set for DRB1; corresponding RLC2 and LCH2 are set for DRB2; the logical channel is located between an RLC layer and a MAC layer, and neither LCH1 nor LCH2 is shown in FIG. 10. In the micro base station, a carrier participating in aggregation is CC2, and a corresponding cell is a secondary cell (Secondary Cell, SCell); a MAC layer MAC2 and a PHY layer PHY2 are set for the SCell, and an HARQ entity HARQ2 is set at the MAC layer. A logical channel of DRB1 and a logical channel of DRB2 are both mapped to a transport channel DL-SCH2 or UL-SCH2 by using the MAC layer; the transport channel is located between the MAC layer and the PHY layer, and neither DL-SCH2 nor UL-SCH2 is shown in FIG. 10.

Connection lines between RLC layers, MAC layers, and PHY layers of the micro base station and the UE represent logical connections, on a radio interface between the micro base station and the UE, between peer protocol layers, and represent that after data sent at protocol layers of a sending end is processed at peer protocol layers of a receiving end, data having a same format and same content as those of the data at the sending end is formed. DRB1 of the micro base station is corresponding to DRB1 of the UE; correspondingly, RLC1 of the micro base station is corresponding to RLC1 of the UE; and RLC2 of the micro base station is corresponding to RLC2 of the UE.

A connection line, at the RLC layer, between the macro base station and the micro base station represents that data splitting is performed at the RLC layer; RLC1 and RLC2 of the macro base station are corresponding to RLC1 and RLC2 of the micro base station respectively.

For communication between the micro base station and the UE, a transmission procedure of user plane data may be as follows:

For downlink data, the micro base station may store, in the transmission buffer of the corresponding RLC entity, an RLC PDU from the macro base station, to wait for scheduling, and send the RLC PDU to the UE through the radio interface after processing the RLC PDU at the protocol layers, namely, the RLC layer, the MAC layer, and the PHY layer. If the RLC PDU cannot be sent completely due to a limitation of a radio resource when the RLC PDU is sent for the first time, the RLC PDU may be segmented; it should be noted that, the segmentation in this case is performed according to a resegmentation manner for RLC PDUs in a conventional protocol, rather than a segmentation manner for RLC SDUs in the conventional protocol. The UE may first process the data, which is received through the radio interface, at the PHY layer, and then pass the data to the MAC layer, the RLC layer, and the PDCP layer for processing.

For uplink data, after processing an IP data packet, which is from an application layer, at the protocol layers, namely, the PDCP layer, the RLC layer, the MAC layer, and the PHY layer, the UE may send the IP data packet to the micro base station through the radio interface. The data received by the micro base station through the radio interface is first processed at the PHY layer, and then passed to the MAC and the RLC successively; an RLC PDU is formed at the RLC layer and sent, through an X2 interface, to the RLC entity corresponding to the macro base station.

3) A user plane protocol stack of the UE is described as follows:

On a side of the UE, DRBs are DRB1 and DRB2; a PDCP entity PDCP1, an RLC entity RLC1, and a logical channel LCH1 that are corresponding to DRB1 are established; PDCP2, RLC2, and LCH2 that are corresponding to DRB2 are established; the logical channel is located between an RLC layer and a MAC layer, and neither LCH1 nor LCH2 is shown in FIG. 10. The UE may be configured with a MAC layer, which includes a multiplexing/demultiplexing entity (multiplexing/demultiplexing), and this entity is not shown in FIG. 10. After the multiplexing/demultiplexing entity, two HARQ entities HARQ1 and HARQ2 are configured, which are respectively corresponding to a PCell of a macro base station and an SCell of a micro base station that are aggregated by the UE. The PCell is configured with a PHY layer PHY1, and the SCell is configured with a PHY layer PHY2, where PHY1 and PHY2 are corresponding to HARQ1 and HARQ2 of the MAC layer respectively.

A logical channel of DRB1 and a logical channel of DRB2 are both mapped to a transport channel DL-SCH1 or UL-SCH1, or DL-SCH2 or UL-SCH2 by using the MAC layer; the transport channel is located between the MAC layer and the PHY layer, and none of DL-SCH1, UL-SCH1, DL-SCH2, and UL-SCH2 is shown in FIG. 10.

A method for communication among the UE, the macro base station, and the micro base station is similar to the foregoing descriptions about the side of the macro base station and the side of the micro base station, and is not described herein again to avoid repetition.

In the control plane protocol stack of FIG. 9 and the user plane protocol stack of FIG. 10, layer 2 (Layer2) may include a PDCP layer, an RLC layer, and a MAC layer.

Figure 11:
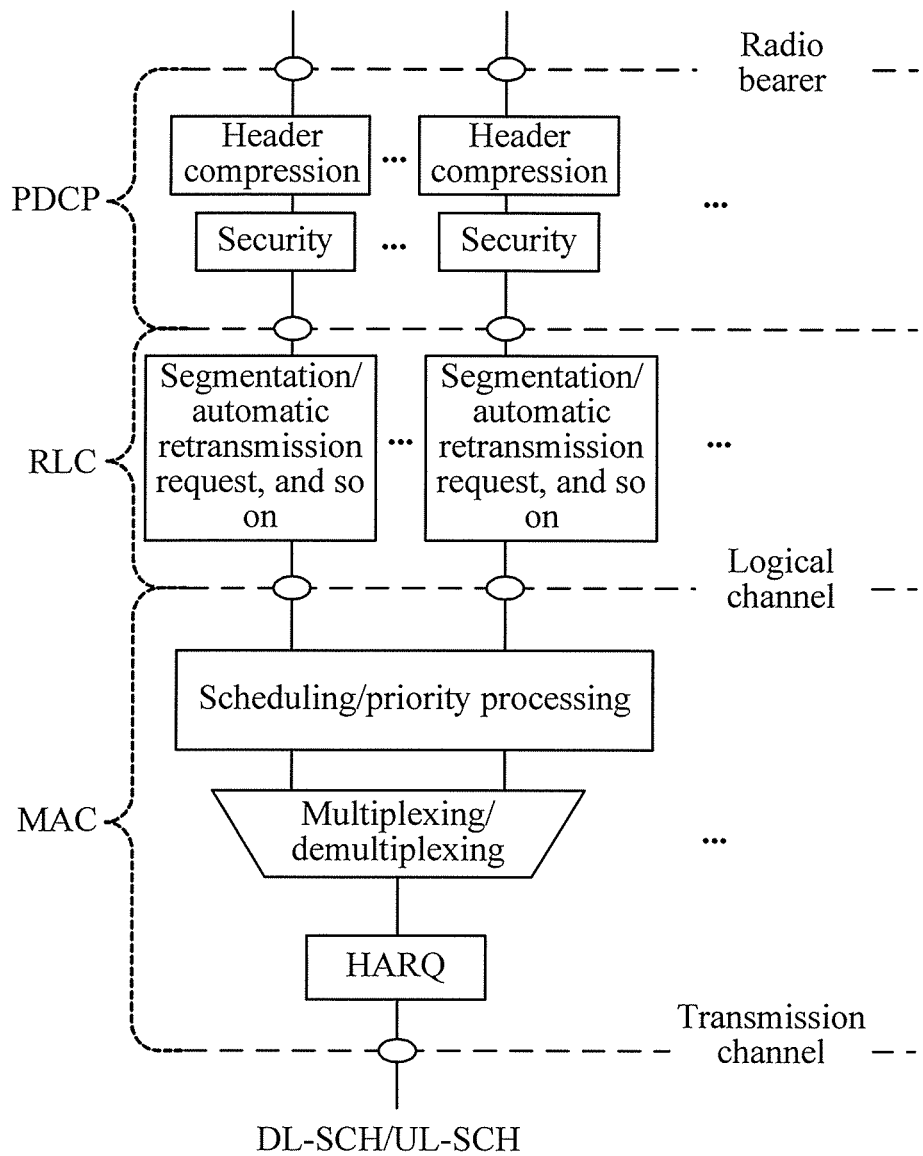
FIG. 11 is a schematic structural diagram of layer 2 in a protocol stack of a macro base station according to an embodiment of the present invention.

FIG. 11 is a schematic structural diagram of layer 2 in a protocol stack of a macro base station according to an embodiment of the present invention.

As shown in FIG. 11, main functions of the PDCP layer may include header compression (Robust Header Compression, ROHC), security (security), and so on, and the security function may include integrity protection (integrity protection) and cyphering (cyphering).

Main functions of the RLC layer may include segmentation, resegmentation, automatic retransmission request (Automatic Retransmission Request, ARQ), and so on.

Main functions of the MAC layer may include scheduling/priority processing, multiplexing/demultiplexing, HARQ, and so on.

A service access point (Service Access Point, SAP) between the PDCP layer and an upper application layer, and an SAP between the PDCP layer and the RLC layer provide an RB. An SAP between the RLC layer and the MAC layer provides an LCH. An SAP between the MAC layer and the physical layer provides a transport channel (Transport Channel), and the transport channel may include a DL-SCH and a UL-SCH.

The macro base station may provide a PCell for the UE, and one HARQ entity may be set for the MAC layer of the macro base station.

Figure 12:
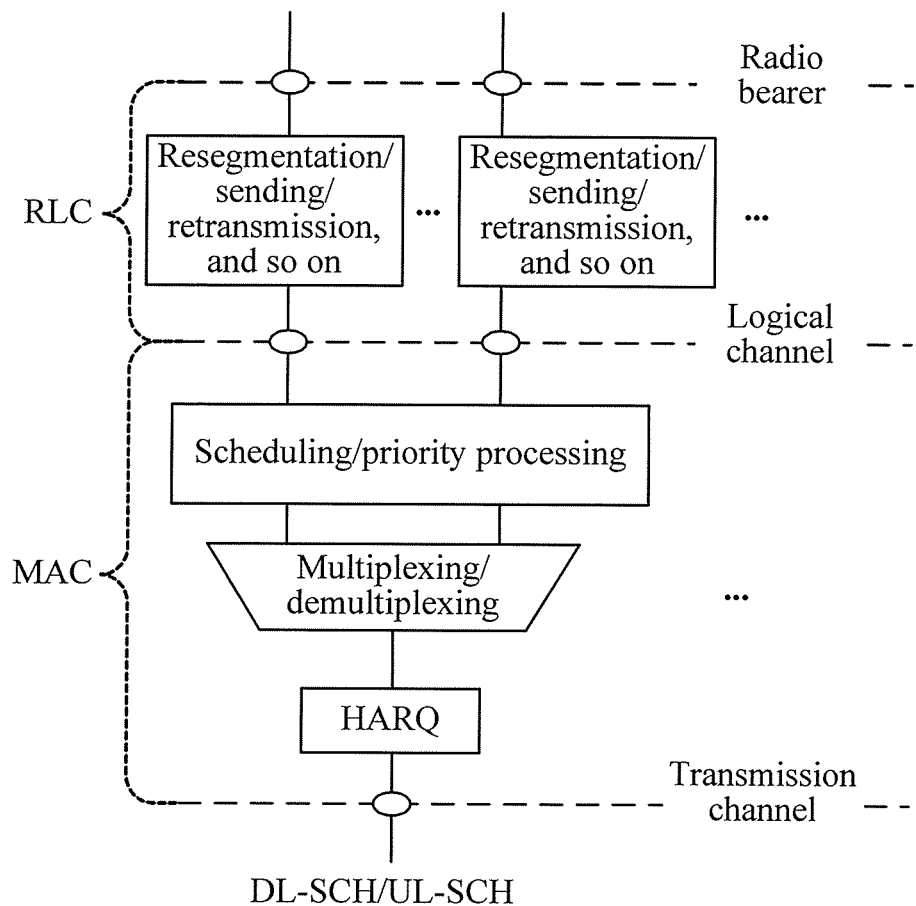
FIG. 12 is a schematic structural diagram of layer 2 in a protocol stack of a micro base station according to an embodiment of the present invention.

FIG. 12 is a schematic structural diagram of layer 2 in a protocol stack of a micro base station according to an embodiment of the present invention.

In FIG. 12, that a DRB is split at an RLC layer is used as an example for descriptions. Neither PDCP entity nor corresponding function is set for the micro base station. The RLC layer of the micro base station may be equivalent to an extension of an RLC layer of a macro base station, provides a part of RLC layer functions, and does not need to provide all RLC functions.

The micro base station receives RLC PDUs, which are sent by the RLC layer of the macro base station through an X2 interface or a direct connection, and stores the RLC PDUs in a transmission buffer at the RLC layer of the micro base station. The micro base station may further receive an RLC status report, which is sent by the RLC layer of the macro base station through the X2 interface or the direct connection, and retransmit, to the UE and according to the RLC status report, to-be-retransmitted RLC PDUs. The micro base station may receive RLC PDUs sent by the UE, store the RLC PDUs in a reception buffer at the RLC layer of the micro base station, and forward the RLC PDUs to the macro base station.

Functions of the MAC layer are similar to the functions of the MAC layer of the macro base station in FIG. 11, and are not described herein again to avoid repetition.

The micro base station may provide an SCell for the UE, and one HARQ entity is set for the MAC layer of the micro base station.

Figure 13:
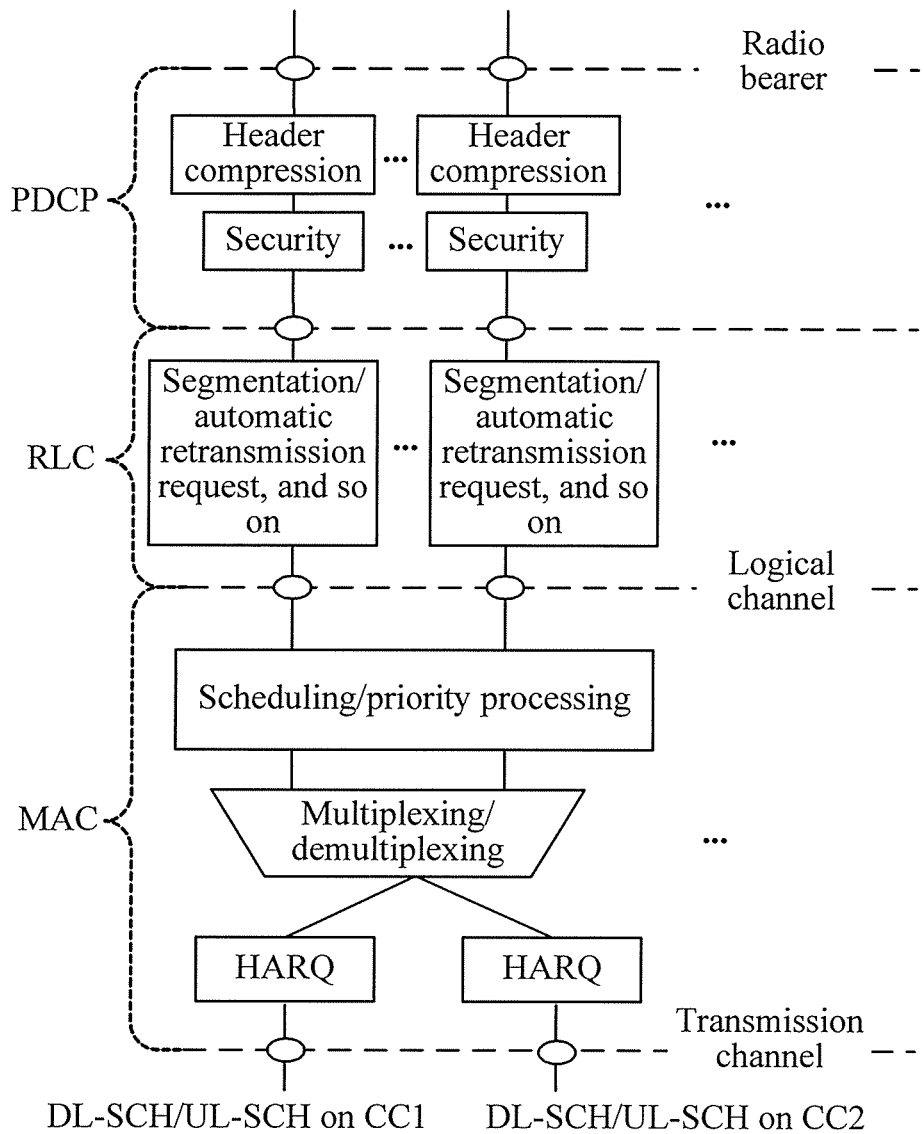
FIG. 13 is a schematic structural diagram of layer 2 in a protocol stack of a UE according to an embodiment of the present invention.

FIG. 13 is a schematic structural diagram of layer 2 in a protocol stack of a UE according to an embodiment of the present invention.

In FIG. 13, functions of a PDCP layer, an RLC layer, and a MAC layer of a UE are similar to the functions of the corresponding protocol layers of the macro base station in FIG. 11, and are not described herein again to avoid repetition.

The MAC layer of the UE may be configured with two HARQ entities, which are corresponding to CC1 provided by a macro base station and CC2 provided by a micro base station respectively. Correspondingly, the HARQ entity on CC1 may be mapped to a DL-SCH and a UL-SCH on CC1, and the HARQ entity on CC2 may be mapped to a DL-SCH and a UL-SCH on CC2. Logical channels LCH1 and LCH2 of the UE may be mapped to the DL-SCH and the UL-SCH on CC1, or the DL-SCH and the UL-SCH on CC2.

It should be noted that, if the macro base station and/or micro base station provides more CCs each, for example, if the macro base station and the micro base station provide two CCs each, two HARQ entities may be set at the MAC layer in a layer 2 structure of the macro base station, and are respectively corresponding to the two CCs provided by the macro base station, where structures of the PDCP layer and the RLC layer are the same as the structures of the PDCP layer and the RLC layer in FIG. 11. Two HARQ entities may be set at the MAC layer in a layer 2 structure of the micro base station, and are respectively corresponding to the two CCs provided by the micro base station, where a structure of the RLC layer is the same as the structure of the RLC layer in FIG. 12.

Four HARQ entities may be set at the MAC layer in a layer 2 structure of the UE, and are respectively corresponding to the two CCs provided by the macro base station and the two CCs provided by the micro base station.

Figure 14:
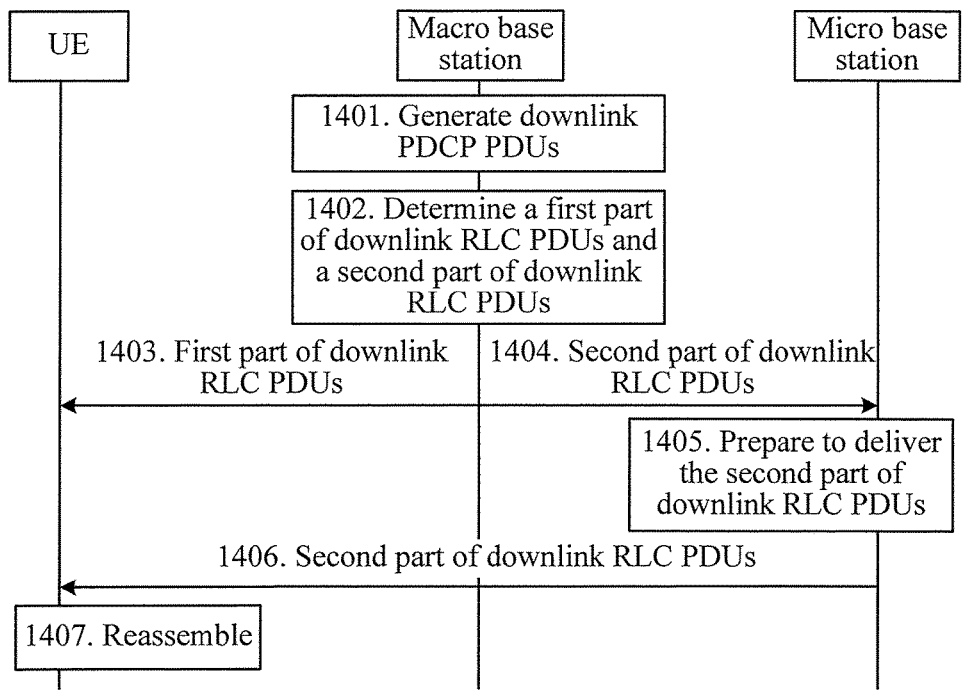
FIG. 14 is a schematic flowchart of a procedure of a data transmission method according to an embodiment of the present invention.

With reference to the user plane protocol stack in FIG. 10, the following describes in detail a data transmission procedure in a downlink direction according to the embodiment of the present invention. FIG. 14 is a schematic flowchart of a procedure of a data transmission method according to an embodiment of the present invention. In FIG. 14, a data transmission procedure in a downlink direction in step 611 of FIG. 6 will be described in detail.

1401: A macro base station generates downlink PDCP PDUs, and passes the downlink PDCP PDUs to an RLC layer.

The macro base station uses downlink IP data packets from an SGW as PDCP SDUs, generates PDCP PDUs after processing, such as header compression, cyphering, and adding a PDCP sequence number (Sequence Number, SN), at a PDCP layer, and passes the PDCP PDUs to an RLC layer to serve as RLC SDUs. The macro base station passes PDCP PDUs in PDCP1 to RLC1, and passes PDCP PDUs in PDCP2 to RLC2.

1402: The macro base station determines a first part of downlink RLC PDUs that the macro base station is responsible for delivering and a second part of downlink RLC PDUs that a micro base station is responsible for delivering.

The macro base station may determine, according to a DRB splitting policy and a QoS parameter configuration that are determined or negotiated in advance, a data volume to be split, that is, which downlink RLC SDUs are distributed to the macro base station and which downlink RLC SDUs are distributed to the micro base station.

For downlink RLC SDUs that the macro base station is responsible for, a MAC layer of the macro base station may determine, according to a QoS requirement and a radio resource situation of the macro base station, a data volume that can be scheduled at a certain transmission time interval (Transmission Time Interval, TTI), and indicate, to an RLC layer, a size of a downlink RLC PDU to be generated; the MAC layer may indicate, to the RLC layer, a total size of one or more downlink RLC PDUs to be generated; and the RLC layer may generate the first part of downlink RLC PDUs after performing processing, such as segmentation, concatenation, and adding header information such as an RLC SN, on the downlink RLC SDU according to the size of the downlink RLC PDU indicated by the MAC layer. RLC1 and RLC2 in the macro base station may separately generate different downlink RLC PDUs. At a certain TTI, RLC1 and RLC2 may each generate one or more different downlink RLC PDUs, and it is also possible that only RLC1 or RLC2 generates one or more different downlink RLC PDUs.

For downlink RLC SDUs to be distributed to the micro base station, the MAC layer of the macro base station may determine, according to a splitting policy and the QoS requirement, a data volume that can be distributed to the micro base station at a TTI, and thereby indicate, to the RLC layer, a size of a downlink RLC PDU to be generated; the MAC layer may indicate, to the RLC layer, a total size of one or more downlink RLC PDUs to be generated; the RLC layer may generate the second part of downlink RLC PDUs after performing processing, such as segmentation, concatenation, and adding header information such as an RLC SN, on the downlink RLC SDU according to the size of the downlink RLC PDU indicated by the MAC layer. At a certain TTI, RLC1 and RLC2 may each generate one or more different RLC PDUs to be distributed to the micro base station, and it is also possible that only RLC1 or RLC2 generates one or more different downlink RLC PDUs to be distributed to the micro base station.

1403: The macro base station sends the first part of downlink RLC PDUs to the UE.

The RLC layer of the macro base station may pass the generated first part of downlink RLC PDUs to the MAC layer of the macro base station; the MAC layer of the macro base station uses the first part of downlink RLC PDUs as a MAC SDU, and generates a MAC PDU, which is also referred to as a transport block (Transport Block, TB), after multiplexing (multiplexing) the MAC SDU with a MAC SDU of a present logical channel and/or another logical channel; and the first part of downlink RLC PDUs in RLC1 and the first part of downlink RLC PDUs in RLC2 may be multiplexed in a same TB. After being passed to a PHY layer of the macro base station, the TB is sent to the UE by the PHY layer on a physical downlink shared channel (Physical downlink shared channel, PDSCH) on a PCell.

1404: The macro base station sends the second part of downlink RLC PDUs to the micro base station.

The macro base station may send the second part of downlink RLC PDUs to the micro base station through an X2 interface or a direct connection between the macro base station and the micro base station.

1405: The micro base station prepares to deliver the second part of downlink RLC PDUs.

After receiving the second part of downlink RLC PDUs from RLC1 of the macro base station, the micro base station may store the second part of downlink RLC PDUs in a transmission buffer at RLC1 of the micro base station. After receiving the second part of downlink RLC PDUs from RLC2 of the macro base station, the micro base station may store the second part of downlink RLC PDUs in a transmission buffer at RLC2 of the micro base station.

A MAC layer of the micro base station determines, according to the splitting policy and the QoS requirement, a data volume that can be scheduled at a certain TTI, and indicates, to the RLC layer, a size of a downlink RLC PDU to be generated.

The MAC layer may indicate, to the RLC layer, a total size of one or more downlink RLC PDUs. The MAC layer may indicate, to the RLC layer, an original downlink RLC PDU size, which means that one or more original downlink RLC PDUs stored in the transmission buffer at the RLC are directly passed, without any processing, to the MAC layer and used as a MAC SDU. Alternatively, the MAC layer may indicate, to the RLC layer, a total downlink RLC PDU size less than the original downlink RLC PDU size, which means that the original downlink RLC PDU is resegmented into downlink RLC PDU segments (Segment) to be passed to the MAC layer, and no additional RLC SN is added at the RLC layer.

The RLC layer of the micro base station does not need to support an RLC PDU concatenation function. It should be noted that, at a certain TTI, RLC1 and RLC2 may each pass one or more different original downlink RLC PDUs or a downlink RLC PDU segment to the MAC layer, where only the last downlink RLC PDU may be a downlink RLC PDU segment; or, it is possible that only RLC1 or RLC2 passes a downlink RLC PDU to the MAC layer.

The micro base station may improve a priority of a UE in an inter-base station CA scenario, to ensure radio resources required for splitting data, thereby allocating sufficient downlink resources to send the original second part of downlink RLC PDUs distributed to the micro base station. Alternatively, if a radio resource allocated to the UE cannot accommodate the original second part of downlink RLC PDUs due to a limitation of a radio interface resource, at the RLC layer of the micro base station, the original second part of downlink RLC PDUs need to be resegmented.

1406: The micro base station sends the second part of downlink RLC PDUs to the UE.

The RLC layer of the micro base station may pass the original second part of downlink RLC PDUs or a downlink RLC PDU segment, which is obtained after the second part of downlink RLC PDUs are resegmented, to the MAC layer of the micro base station to be used as a MAC SDU; the MAC layer of the micro base station generates a MAC PDU, or referred to as a TB, after multiplexing the MAC SDU with a MAC SDU of a present logical channel and/or another logical channel, where the downlink RLC PDU in RLC1 and the downlink RLC PDU in RLC2 may be multiplexed in a same TB. After being passed to a PHY layer of the micro base station, the TB is sent to the UE by the PHY layer on a PDSCH on an SCell.

The micro base station may send the downlink RLC PDUs in ascending order of RLC SNs. In an RLC AM, the micro base station does not need to maintain an RLC AM send window.

1407: The UE receives the first part of downlink RLC PDUs and the second part of downlink RLC PDUs, and reassembles the first part of downlink RLC PDUs and the second part of downlink RLC PDUs, to form downlink RLC SDUs.

After receiving physical layer data on the PDSCH of the PCell and the PDSCH of the SCell, the UE separately passes corresponding TBs to corresponding HARQ1 and HARQ2 at a MAC layer after processing at PHY1 and PHY2 is successful; after separately demultiplexing the TBs, the MAC layer passes the MAC SDUs, namely, RLC PDUs, to corresponding RLC entities RLC1 and RLC2. The RLC layer of the UE may not be distinguished according to the PCell and the SCell, but only distinguished as RLC1 and RLC2 according to a DRB; the HARQ entity of the MAC layer and the PHY layer may be distinguished according to different serving cells, and are transparent for the RLC layer of the UE.

After the RLC layer of the UE receives the RLC PDUs passed by the MAC layer, RLC1 and RLC2 may execute a corresponding RLC PDU receiving procedure according to whether an RLC mode is an RLC UM or an RLC AM (each RLC entity is in one of the two RLC modes), form successfully received RLC PDUs into RLC SDUs in ascending order of the RLC SNs, and pass the RLC SDUs to the PDCP layer.

It should be understood that, sequence numbers of the foregoing procedures do not indicate an execution sequence. The execution sequence of the procedures should be determined according to functions and internal logic thereof, and should not constitute any limitation to the implementation procedure of the embodiment of the present invention. For example, step 1403 may be performed in parallel with step 1404 to step 1406, or step 1404 may be performed before step 1403 is performed.

During a transmission procedure of the first part of downlink RLC PDUs and the second part of downlink RLC PDUs, due to a communication condition, retransmission is possibly required. The following describes a data retransmission procedure in detail with reference to FIG. 15 and FIG. 16.

Figure 15:
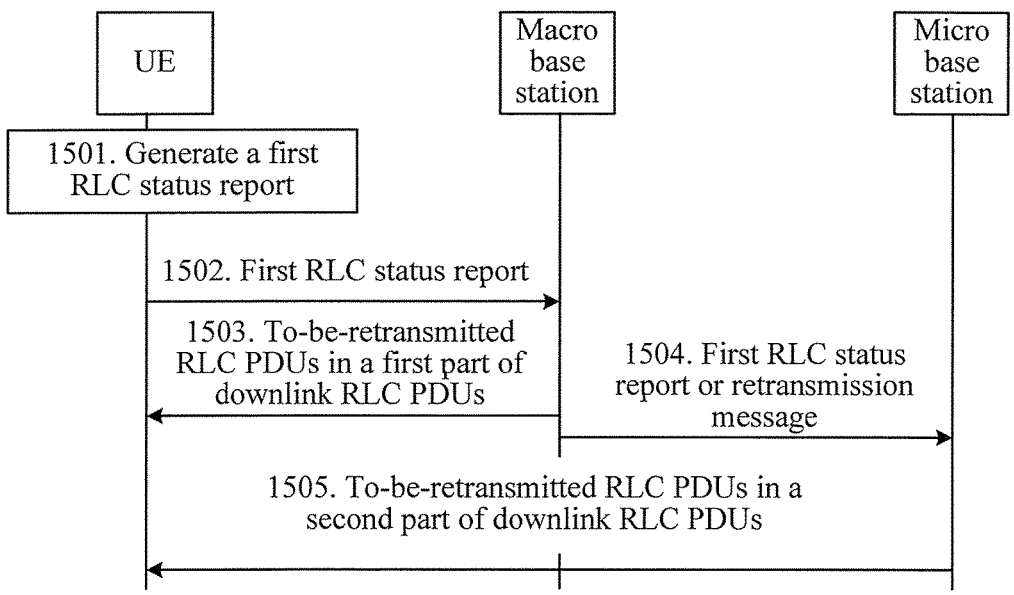
FIG. 15 is a schematic flowchart of a downlink data retransmission procedure according to an embodiment of the present invention.

FIG. 15 is a schematic flowchart of a downlink data retransmission procedure according to an embodiment of the present invention.

In FIG. 15, a retransmission procedure of downlink RLC PDUs in the RLC AM in FIG. 14 will be described in detail.

1501: A UE receives a first part of downlink RLC PDUs and a second part of downlink RLC PDUs, and generates a first RLC status report according to reception situations of the first part of downlink RLC PDUs and the second part of downlink RLC PDUs.

It should be noted that, the UE may generate a first RLC status report corresponding to RLC1 according to reception situations of the first part of downlink RLC PDUs and the second part of downlink RLC PDUs of RLC1, and may generate a first RLC status report corresponding to RLC2 according to reception situations of the first part of downlink RLC PDUs and the second part of downlink RLC PDUs of RLC2.

1502: The UE sends the first RLC status report to a macro base station.

The UE may send the first RLC status report corresponding to RLC1 and the first RLC status report corresponding to RLC2 to the macro base station separately.

1503: When the first RLC status report indicates to-be-retransmitted RLC PDUs in a first part of downlink RLC PDUs, the macro base station retransmits the to-be-retransmitted RLC PDUs in the first part of downlink RLC PDUs to the UE. When the first RLC status report indicates an RLC PDU which, as acknowledged by the UE, is received successfully, the macro base station updates an RLC AM send window and a corresponding status variable, so as to continue to send a new RLC PDU.

With reference to FIG. 10 and FIG. 14, RLC1 and RLC2 of the macro base station may separately determine, according to the corresponding first RLC status reports, which RLC PDUs in the first part of downlink RLC PDUs need to be retransmitted (retransmission), and which RLC PDUs in the second part of downlink RLC PDUs need to be retransmitted by a micro base station.

RLC1 and RLC2 of the macro base station may separately retransmit, to the UE, the to-be-retransmitted RLC PDUs in the first parts of downlink RLC PDUs corresponding to RLC1 and RLC2.

1504: When the first RLC status report indicates to-be-retransmitted RLC PDUs in the second part of downlink RLC PDUs, the macro base station sends the first RLC status report or a retransmission message to a micro base station.

The macro base station may send the first RLC status report to the micro base station through an X2 interface or a direct connection.

The macro base station may also generate a retransmission message according to the first RLC status report, where the retransmission message may indicate the to-be-retransmitted RLC PDUs in the second part of downlink RLC PDUs.

1505: The micro base station retransmits, according to the first RLC status report or the retransmission message, the to-be-retransmitted RLC PDUs in the second part of downlink RLC PDUs to the UE.

With reference to FIG. 10 and FIG. 14, RLC1 and RLC2 of the micro base station may separately determine, according to the corresponding first RLC status reports, which RLC PDUs in the second parts of downlink RLC PDUs corresponding to RLC1 and RLC2 need to be retransmitted. RLC1 and RLC2 of the micro base station may separately retransmit, to the UE, the to-be-retransmitted RLC PDUs in the second parts of downlink RLC PDUs corresponding to RLC1 and RLC2.

For the to-be-retransmitted RLC PDUs in the second part of downlink RLC PDUs, if the number of retransmission times of the micro base station reaches a predetermined number of times but does not reach a maximum number of retransmission times, the micro base station may notify the macro base station of performing retransmission. The micro base station may send, to the macro base station, the second part of downlink RLC PDUs to be retransmitted, or the macro base station saves, in a retransmission buffer, a backup for each RLC PDU in the second part of downlink RLC PDUs distributed to the micro base station, and the micro base station directly notifies the macro base station of SNs of the to-be-retransmitted RLC PDUs in the second part of downlink RLC PDUs.

Alternatively, when the macro base station receives the first RLC status report of the UE, the macro base station may perform retransmission in a case where it is determined that the micro base station needs to perform retransmission and the number of retransmission times at the micro base station reaches the predetermined number of times but does not reach the maximum number of retransmissions. In this case, the macro base station may instruct the micro base station to transmit the related to-be-retransmitted RLC PDUs back to the macro base station, or the macro base station saves, in the retransmission buffer, a backup for each RLC PDU in the second part of downlink RLC PDUs distributed to the micro base station; in a case where the macro base station decides to perform retransmission by itself, the macro base station modifies, in the first RLC status report sent to the micro base station, a status of a corresponding RLC PDU to be retransmitted to an acknowledge status (Acknowledge, ACK).

It should be understood that, sequence numbers of the foregoing procedures do not indicate an execution sequence. The execution sequence of the procedures should be determined according to functions and internal logic thereof, and should not constitute any limitation to the implementation procedure of the embodiment of the present invention. For example, step 1503 may be performed in parallel with step 1504 to step 1505, or step 1504 and step 1505 may be performed before step 1503 is performed.

In FIG. 15, the UE may send the first RLC status report to the macro base station. In addition, the UE may also send the first RLC status report to the micro base station. The following provides descriptions with reference to FIG. 16.

Figure 16:
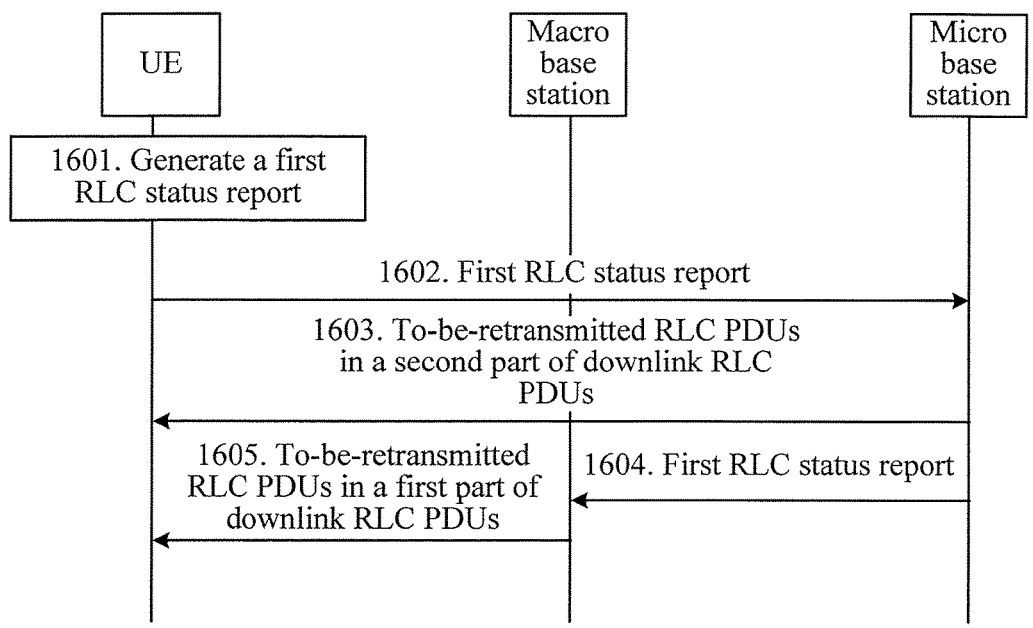
FIG. 16 is a schematic flowchart of a downlink data retransmission procedure according to an embodiment of the present invention.

FIG. 16 is a schematic flowchart of a downlink data retransmission procedure according to an embodiment of the present invention.

In FIG. 16, a retransmission procedure of downlink RLC PDUs in the RLC AM in FIG. 14 will be described in detail.

1601: A UE generates a first RLC status report according to reception situations of a first part of downlink RLC PDUs and a second part of downlink RLC PDUs.

It should be noted that, the UE may generate a first RLC status report corresponding to RLC1 according to reception situations of the first part of downlink RLC PDUs and the second part of downlink RLC PDUs of RLC1, and may generate a first RLC status report corresponding to RLC2 according to reception situations of the first part of downlink RLC PDUs and the second part of downlink RLC PDUs of RLC2.

1602: The UE sends the first RLC status report to a micro base station.

If an SCell has an uplink resource, the UE may send the first RLC status report to the micro base station.

1603: When the first RLC status report indicates to-be-retransmitted RLC PDUs in the second part of downlink RLC PDUs, the micro base station retransmits the to-be-retransmitted RLC PDUs in the second part of downlink RLC PDUs to the UE.

With reference to FIG. 10 and FIG. 14, RLC1 and RLC2 of the micro base station may separately determine, according to the corresponding first RLC status reports, which RLC PDUs in the second parts of downlink RLC PDUs corresponding to RLC1 and RLC2 need to be retransmitted. RLC1 and RLC2 of the micro base station may separately retransmit, to the UE, the to-be-retransmitted RLC PDUs in the second parts of downlink RLC PDUs corresponding to RLC1 and RLC2.

1604: The micro base station sends the first RLC status report to a macro base station.

1605: The macro base station retransmits, according to the first RLC status report, to-be-retransmitted RLC PDUs in the first part of downlink RLC PDUs to the UE.

When the first RLC status report indicates to-be-retransmitted RLC PDUs in a first part of downlink RLC PDUs, the macro base station retransmits the to-be-retransmitted RLC PDUs in the first part of downlink RLC PDUs to the UE.

When the first RLC status report indicates an RLC PDU which, as acknowledged by the UE, is received successfully, the macro base station may be made to update an RLC AM send window and a corresponding status variable, so as to continue to send a new RLC PDU.

With reference to FIG. 10 and FIG. 14, RLC1 and RLC2 of the macro base station may separately determine, according to the corresponding first RLC status reports, which RLC PDUs in the first parts of downlink RLC PDUs corresponding to RLC1 and RLC2 need to be retransmitted. RLC1 and RLC2 of the macro base station may separately retransmit, to the UE, the to-be-retransmitted RLC PDUs in the first parts of downlink RLC PDUs corresponding to RLC1 and RLC2. For the to-be-retransmitted RLC PDUs in the second part of downlink RLC PDUs, if the number of retransmission times of the micro base station reaches a predetermined number of times but does not reach a maximum number of retransmission times, processing may be performed according to the method described in FIG. 15. To avoid repetition, descriptions are not provided herein again.

With reference to FIG. 15 and FIG. 16, it should be understood that, the UE may separately send the first RLC status report corresponding to RLC1 to the macro base station, and send the first RLC status report corresponding to RLC2 to the micro base station; alternatively, the UE may separately send the first RLC status report corresponding to RLC1 to the micro base station, and send the first RLC status report corresponding to RLC2 to the macro base station.

It should be understood that, sequence numbers of the foregoing procedures do not indicate an execution sequence. The execution sequence of the procedures should be determined according to functions and internal logic thereof, and should not constitute any limitation to the implementation procedure of the embodiment of the present invention. For example, step 1603 may be performed in parallel with step 1604 to step 1605, or step 1604 and step 1605 may be performed before step 1603 is performed.

Figure 17:
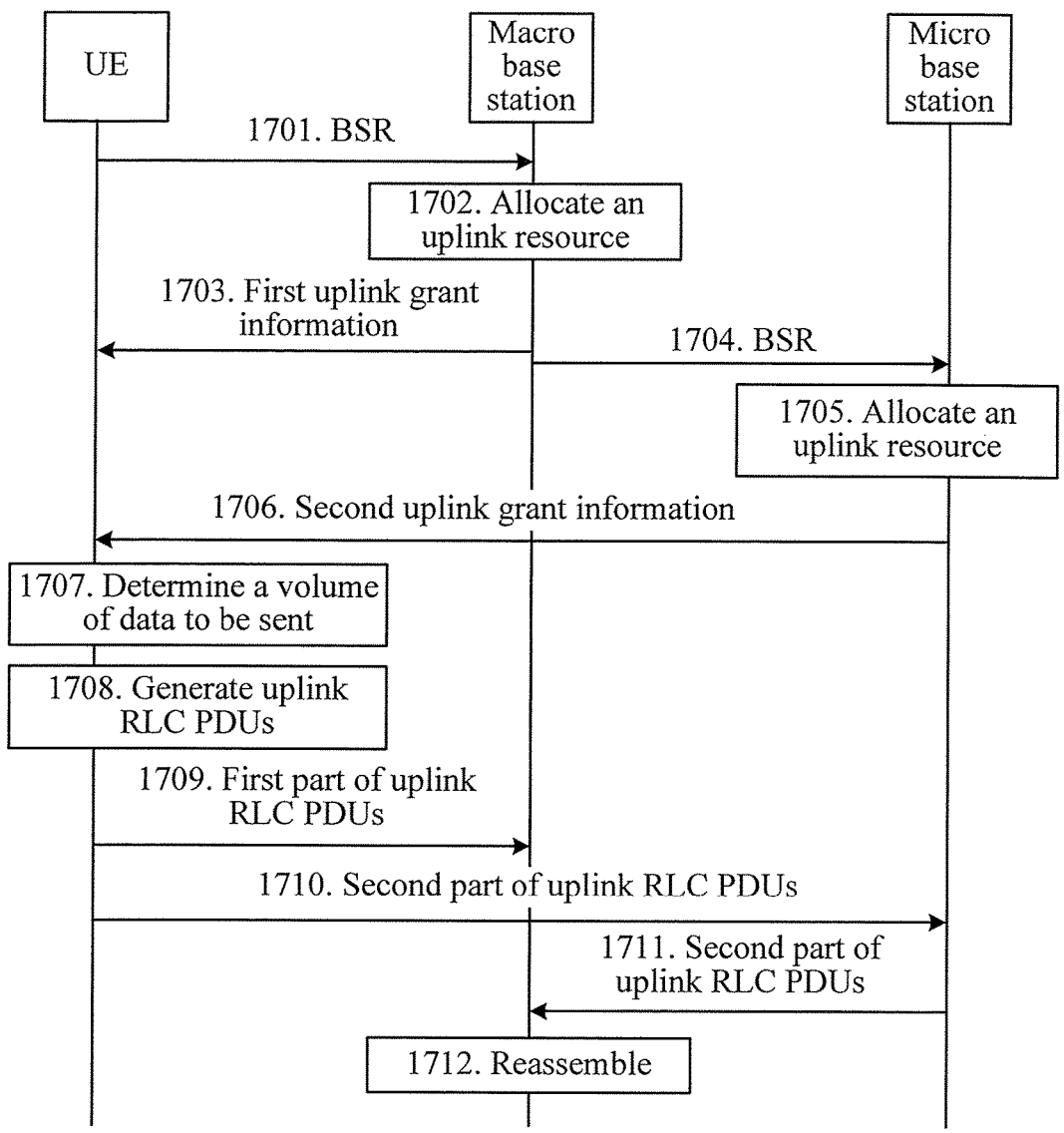
FIG. 17 is a schematic flowchart of a procedure of a data transmission method according to an embodiment of the present invention.

The following describes a data transmission procedure in an uplink direction according to the embodiment of the present invention in detail with reference to the user plane protocol stack in FIG. 10. FIG. 17 is a schematic flowchart of a procedure of a data transmission method according to an embodiment of the present invention. In FIG. 17, a data transmission procedure in an uplink direction in step 611 of FIG. 6 will be described in detail.

1701: A UE sends a buffer status report (Buffer Status Report, BSR) to a macro base station.

When the macro base station has an available uplink resource, the UE may send a BSR to the macro base station.

It should be noted that, in step 1701, the UE may also send the BSR to a micro base station when the micro base station has an available uplink resource.

At a certain TTI, the UE may send one BSR of a regular BSR (regular BSR) or periodic BSR (periodic BSR) type at most. If at a certain TTI, the macro base station and the micro base station both allocate an uplink grant to the UE, the UE can only send one regular BSR or periodic BSR to the macro base station or micro base station, but is not allowed to send the regular BSR or periodic BSR to the macro base station and the micro base station at the same time.

The BSR reflects an available data volume of all logical channels in each logical channel group (Logical Channel Group, LCG) of the UE after a MAC PDU is generated at a certain TTI, and usually a maximum of four logical channel groups exist. There are two manners for determining a buffer size level (buffer size level) of each LCG in a BSR, including a BSR and an extended BSR, where the BSR or the extended BSR may be configured by means of RRC.

BSR formats may be classified into a long BSR (long BSR), a short BSR (short BSR), or a truncated BSR (truncated BSR). A long BSR may include a buffer data volume of four LCGs; a buffer size (buffer size) corresponding to each logical channel group includes an available total data volume of all logical channels in the logical channel group, including volumes of data to be sent at an RLC layer and a PDCP layer.

Types of the BSR or extended BSR may be classified into a regular BSR, a periodic BSR, and a padding BSR (padding BSR). For example, when uplink data arrives at a logical channel with a high priority, a regular BSR is triggered. When a timer of a periodic BSR times out, the periodic BSR is triggered. When an uplink resource allocated to the UE still has a padding bit (padding bit) after accommodating a MAC SDU, the padding bit may carry a padding BSR. A priority of the regular BSR and a priority of the periodic BSR are higher than that of the padding BSR.

1702: The macro base station allocates an uplink resource to the UE according to the BSR.

The macro base station may decide, according to a DRB splitting policy and a QoS parameter configuration that are determined or negotiated in advance, a data volume to be split. The uplink resource is allocated to the UE according to a data volume distributed to the present base station, a radio condition, or a QoS parameter, and so on.

1703: The macro base station sends first uplink grant (UL grant) information to the UE, where the first uplink grant information indicates the uplink resource allocated to the UE by the macro base station.

After allocating the uplink resource to the UE, the macro base station sends the first uplink grant information to the UE on a physical downlink control channel (Physical downlink control channel, PDCCH).

1704: The macro base station sends a BSR to a micro base station.

The macro base station may forward the BSR to the micro base station through an X2 interface or a direct connection.

In addition, the macro base station may also modify a buffer data volume of a corresponding logical channel group in the BSR according to the data volume needing to be distributed to the micro base station, and send the modified BSR to the micro base station. The macro base station may indicate, in a message at the X2 interface, whether the sent BSR is the original BSR or the modified BSR, or negotiate in advance whether to send the original BSR or the modified BSR.

1705: The micro base station allocates an uplink resource to the UE according to the BSR.

If the BSR received by the micro base station is the original BSR, the volume of data that should be distributed to the micro base station may be determined according to the DRB splitting policy and the QoS parameter configuration that are determined or negotiated in advance, and a buffer data volume of a corresponding logical channel group in the original BSR may be modified.

If the BSR received by the micro base station is the modified BSR, a buffer data volume in a corresponding logical channel group in the modified BSR may be used directly, and the uplink resource may be allocated to the UE according to the buffer data volume, a radio condition, a QoS parameter, and so on.

1706: The micro base station sends second uplink grant information to the UE, where the second uplink grant information indicates the uplink resource allocated to the UE by the micro base station.

The micro base station may send the second uplink grant information to the UE on a PDCCH.

1707: The UE determines, according to the first uplink grant information and the second uplink grant information, a volume of data to be sent of each logical channel.

The UE may determine, on the basis of a logical channel priority processing procedure and according to the first uplink grant information and the second uplink grant information, the volume of data to be sent, on an uplink grant of a PCell and/or an SCell, of each logical channel A MAC indicates an uplink RLC PDU size to RLC1 and/or RLC2. The MAC layer may indicate, to an RLC layer, a total size of one or more uplink RLC PDUs to be generated.

1708: The UE generates uplink RLC PDUs.

After performing processing such as segmentation, concatenation, and adding header information such as an RLC SN, on an uplink RLC SDU according to the uplink RLC PDU size indicated by the MAC layer, the MAC layer of the UE may generate uplink RLC PDUs. RLC1 and RLC2 separately generate different uplink RLC PDUs. At a certain TTI, RLC1 and RLC2 may each generate one or more different uplink RLC PDUs, and it is also possible that only RLC1 or RLC2 generates uplink RLC PDUs.

1709: The UE sends, on the PCell, a first part of uplink RLC PDUs in the uplink RLC PDUs to the macro base station.

RLC1 and RLC2 of the UE may pass the uplink RLC PDUs, which are generated according to the indication of the MAC, to the MAC, and the uplink RLC PDUs are used as an uplink MAC SDU.

The MAC generates an uplink MAC PDU, or referred to as a TB, after multiplexing the uplink MAC SDU with an uplink MAC SDU of a present logical channel and/or another logical channel. RLC PDUs in RLC1 and RLC2 may be multiplexed in the same TB. A TB generated by the MAC for HARQ1 is passed to PHY1, and PHY1 sends, on a physical uplink shared channel (Physical uplink shared channel, PUSCH) of the PCell, the TB to the macro base station.

1710: The UE sends, on the SCell, a second part of uplink RLC PDUs in the uplink RLC PDUs to the micro base station.

A TB generated by the MAC of the UE for HARQ2 is passed to PHY2, and the PHY2 sends, on a PUSCH of the SCell, the TB to the micro base station.

1711: The micro base station sends the second part of uplink RLC PDUs to the macro base station.

After processing data, which is received on the PUSCH of the SCell, at PHY2 and MAC2, the micro base station passes the MAC SDUs, namely, RLC PDUs, to RLC1 and RLC2, and stores the RLC PDUs in reception buffers corresponding to RLC1 and RLC2. In an RLC AM, the micro base station does not need to maintain an RLC AM receive window or execute a reordering (re-ordering) function.

The micro base station may send the second part of uplink RLC PDUs to the macro base station by using an X2 or a direct connection.

The macro base station receives the RLC PDUs from the micro base station and stores the RLC PDUs in reception buffers corresponding to RLC1 and RLC2.

1712: The macro base station receives the first part of uplink RLC PDUs and the second part of uplink RLC PDUs, and reassembles the first part of uplink RLC PDUs and the second part of uplink RLC PDUs.

After processing data, which is received from the UE on the PUSCH of the PCell, at PHY1 and MAC1, the macro base station passes the MAC SDUs, namely, the first part of uplink RLC PDUs, to RLC1 and RLC2, and stores the first part of uplink RLC PDUs in reception buffers corresponding to RLC1 and RLC2.

The macro base station may also store the second part of uplink RLC PDUs, which are received from the micro base station, in the reception buffers corresponding to RLC1 and RLC2.

The macro base station may reassemble the first part of uplink RLC PDUs and the second part of uplink RLC PDUs according to comprehensive reception situations in the reception buffers corresponding to RLC1 and RLC2, and deliver the first part of uplink RLC PDUs and the second part of uplink RLC PDUs to a PDCP layer in ascending order of RLC SNs. RLC1 and RLC2 may perform a corresponding RLC PDU receiving procedure according to whether the RLC mode is an RLC UM or an RLC AM (each RLC entity is in one of the two RLC modes), and pass uplink RLC PDUs that are received successfully to the PDCP layer in ascending order of the RLC SNs.

It should be noted that, in the foregoing procedure, if the UE sends a BSR to the micro base station, the micro base station may forward the received BSR to the macro base station.

Further, because each of the macro base station and the micro base station can receive BSRs sent by the UE and BSRs sent by the other base station, considering a delay of the X2 interface, if the macro base station or the micro base station receives, successively within a short period of time or simultaneously, multiple BSRs sent in different directions, it may be difficult for the macro base station and the micro base station to determine which BSR is the latest one. To solve this problem, time information may be added in BSRs sent by the UE, for example, the time information may be time stamp (time stamp) information or system frame number (System Frame Number, SFN) and subframe number (subframe) information of the PCell or SCell.

In addition, a method for the UE to send BSRs may also be: at a certain TTI, when uplink resources are allocated to both the PCell provided by the macro base station and the SCell provided by the micro base station, sending, by the UE, regular BSRs or periodic BSRs on the PCell and the SCell at the same time, indicating, in the BSR, a flag about whether forwarding is required, and setting the flag to "forwarding not required". It is required that the BSRs sent on the PCell and SCell at the same time have a same buffer size level value for a same LCG. In a case where the macro base station and the micro base station each provide multiple CCs and when uplink resources are allocated to the multiple CCs of the macro base station and the micro base station at a certain TTI, the UE is only allowed to send one regular BSR or periodic BSR on the uplink resources of all the CCs of the macro base station, and is only allowed to send one regular BSR or periodic BSR on the uplink resources of all the CCs of the micro base station.

During a transmission procedure of the first part of uplink RLC PDUs and the second part of uplink RLC PDUs, due to a communication condition, retransmission is possibly required. The following describes a data retransmission procedure in detail with reference to FIG. 18 and FIG. 19.

Figure 18:
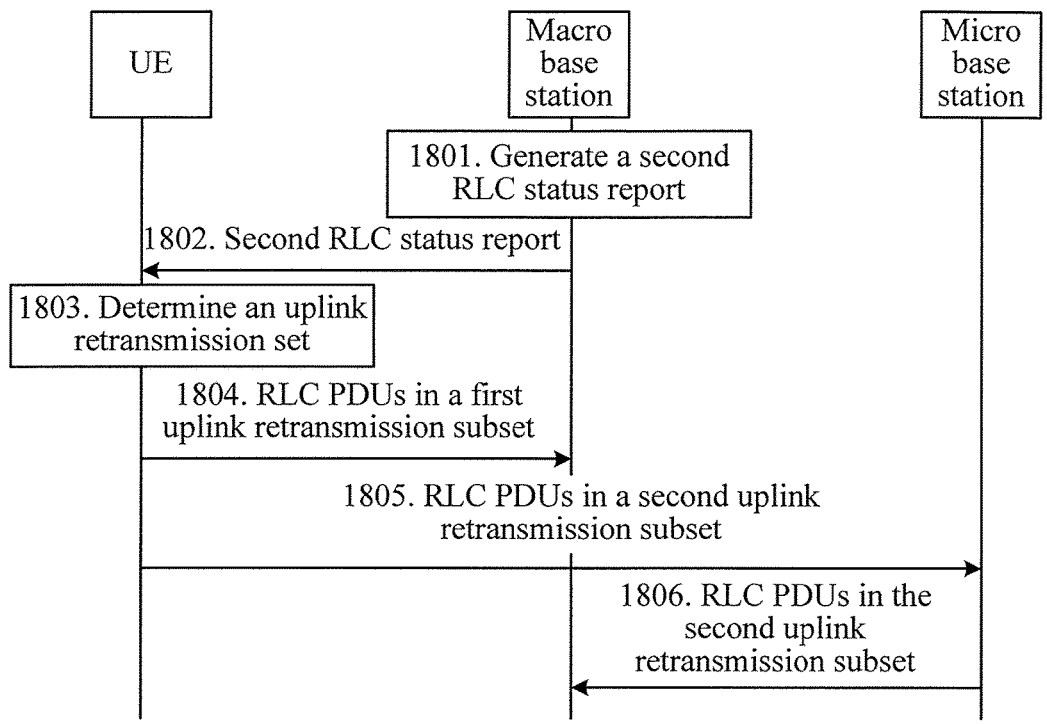
FIG. 18 is a schematic flowchart of an uplink data retransmission procedure according to an embodiment of the present invention.

FIG. 18 is a schematic flowchart of an uplink data retransmission procedure according to an embodiment of the present invention. In FIG. 18, a retransmission procedure of uplink RLC PDUs in the RLC AM in FIG. 17 will be described in detail.

1801: A macro base station receives a first part of uplink RLC PDUs and a second part of uplink RLC PDUs, and generates a second RLC status report according to reception situations of the first part of uplink RLC PDUs and the second part of uplink RLC PDUs.

1802: The macro base station sends the second RLC status report to a UE.

1803: The UE determines an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs.

According to the second RLC status report, when the second RLC status report indicates an RLC PDU which, as acknowledged by the macro base station, is received successfully, the UE may update an RLC AM send window and a corresponding status variable, so as to continue to send a new RLC PDU.

The UE may divide the uplink retransmission set into a first uplink retransmission subset and a second uplink retransmission subset according to first uplink grant information of a PCell and/or second uplink grant information of an SCell, and determine to retransmit the first uplink retransmission subset to the macro base station and retransmit the second uplink retransmission subset to a micro base station.

1804: The UE retransmits RLC PDUs in the first uplink retransmission subset to the macro base station.

1805: The UE retransmits RLC PDUs in the second uplink retransmission subset to the micro base station.

Figure 19:
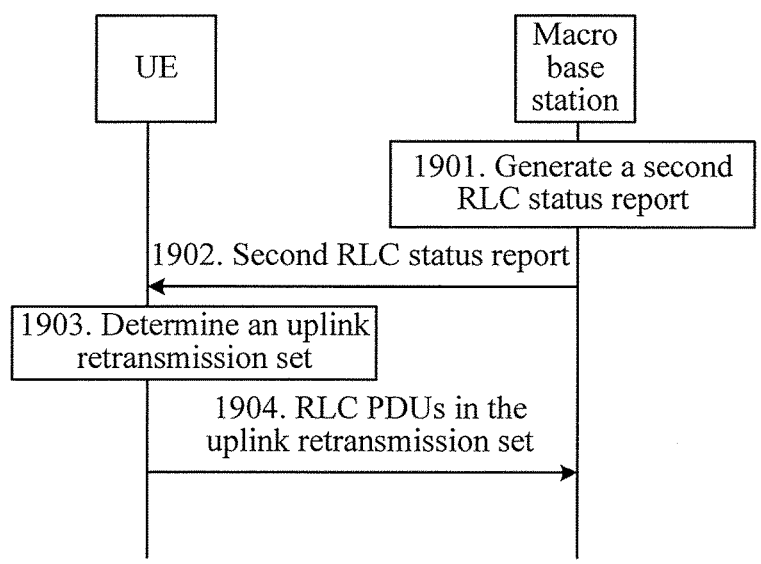
FIG. 19 is a schematic flowchart of an uplink data retransmission procedure according to an embodiment of the present invention.

FIG. 19 is a schematic flowchart of an uplink data retransmission procedure according to an embodiment of the present invention. In FIG. 19, a retransmission procedure of uplink RLC PDUs in the RLC AM in FIG. 17 will be described in detail.

Step 1901 to step 1903 in FIG. 19 are similar to step 1801 to step 1803 in FIG. 18, and are not described herein again to avoid repetition.

1904: The UE sends RLC PDUs in the uplink retransmission set to the macro base station.

The UE may determine, according to first uplink grant information of a PCell and/or second uplink grant information of an SCell, to retransmit, to the macro base station, all to-be-retransmitted uplink RLC PDUs.

Figure 20:
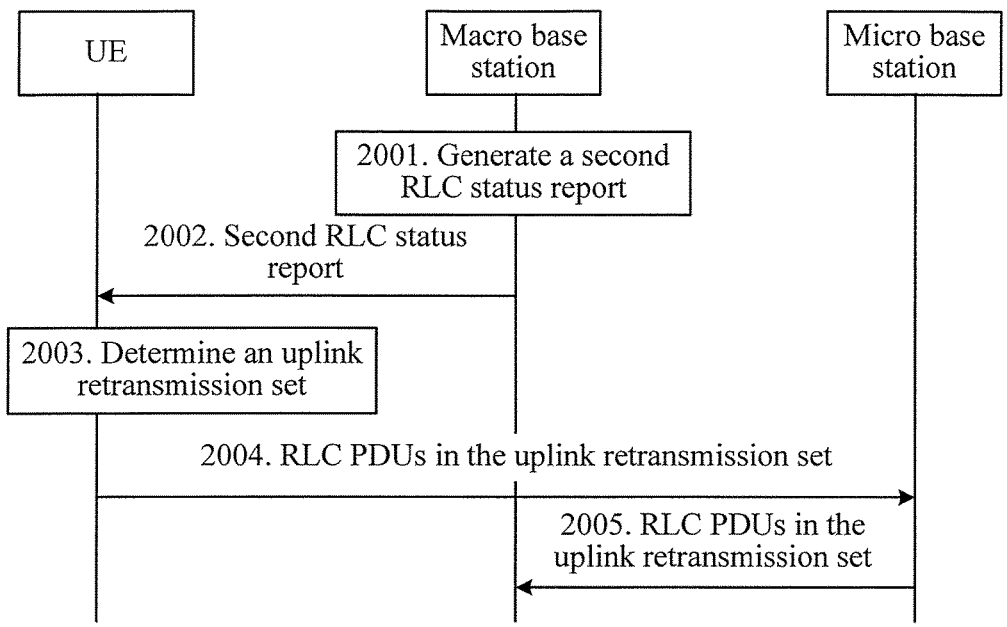
FIG. 20 is a schematic flowchart of an uplink data retransmission procedure according to an embodiment of the present invention.

FIG. 20 is a schematic flowchart of an uplink data retransmission procedure according to an embodiment of the present invention. In FIG. 20, a retransmission procedure of uplink RLC PDUs in the RLC AM in FIG. 17 will be described in detail.

Step 2001 to step 2003 in FIG. 20 are similar to step 1801 to step 1803 in FIG. 18, and are not described herein again to avoid repetition.

2004: The UE sends RLC PDUs in the uplink retransmission set to a micro base station.

The UE may determine, according to first uplink grant information of a PCell and/or second uplink grant information of an SCell, to retransmit, to the micro base station, all the to-be-retransmitted uplink RLC PDUs.

2005: The micro base station sends the RLC PDUs in the uplink retransmission set to the macro base station.

The micro base station may send, to the macro base station and through an X2 interface or a direct connection, the to-be-retransmitted uplink RLC PDUs.

Figure 21:
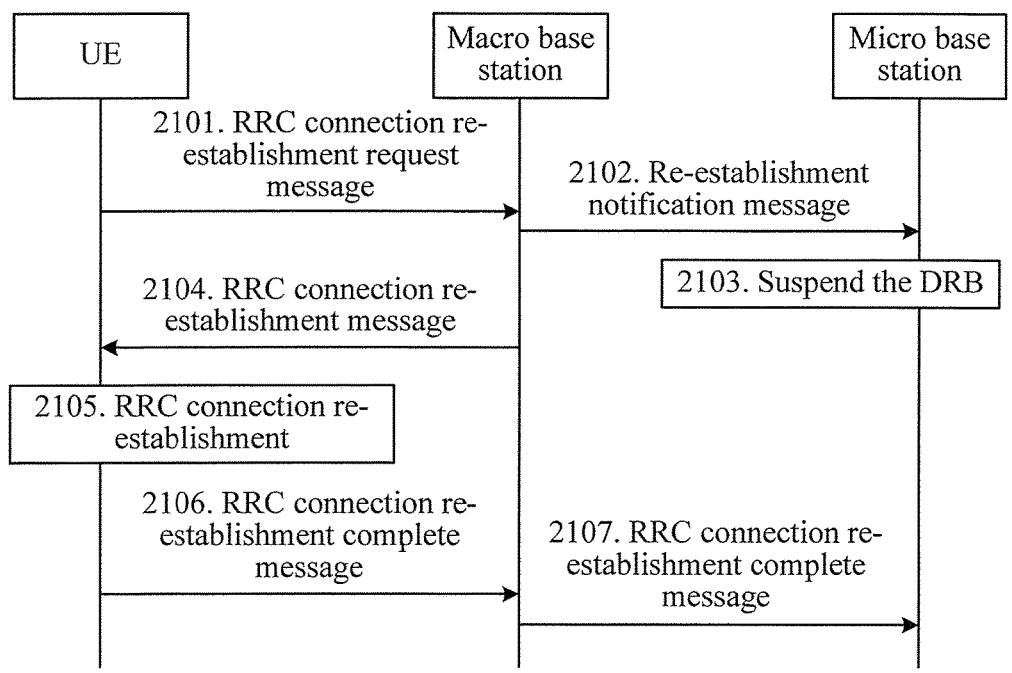
FIG. 21 is a schematic flowchart of an RRC connection re-establishment procedure according to an embodiment of the present invention.

FIG. 21 is a schematic flowchart of an RRC connection re-establishment procedure according to an embodiment of the present invention.

In FIG. 21, a first base station may be one of a macro base station and a micro base station, and a second base station may be the other base station.

2101: A UE sends an RRC connection re-establishment request message to a macro base station.

In a case where RLC PDU retransmission is performed for a maximum number of times, or a PCell RLM determines that a radio link failure (Radio Link Failure, RLF) occurs, or a random access procedure on a PCell fails, or RRC connection reconfiguration fails, or an integrity check fails, or a handover fails, and so on, the UE may perform cell selection, and still select the PCell when a radio condition of the PCell is good. In this case, the UE sends the RRC connection re-establishment request message to the macro base station, and initializes an RRC connection re-establishment procedure, including suspending (suspend) all RBs except SRB0, resetting a MAC, using a default physical channel configuration, using a default MAC layer main configuration (MAC main configuration), and so on. Different from the prior art, during the RRC connection re-establishment, an SCell provided by the micro base station may not be released.

2102: The macro base station sends a re-establishment notification message to the micro base station.

The re-establishment notification message may include a DRB related parameter, and may instruct the micro base station to suspend a DRB that is split.

2103: The micro base station suspends, according to the re-establishment notification message, the DRB that is split, and reconfigures the DRB related parameter.

2104: The macro base station sends an RRC connection re-establishment (RRCConnectionReestablishment) message to the UE.

2105: According to the RRC connection re-establishment message, the UE re-establishes a PDCP entity and an RLC entity of SRB1, performs a radio resource configuration procedure, restores SRB1, and so on.

2106: The UE sends an RRC connection re-establishment complete (RRCConnectionReestablishmentComplete) message to the macro base station.

2107: The macro base station sends an RRC connection re-establishment complete message to the micro base station.

It should be understood that, sequence numbers of the foregoing procedures do not indicate an execution sequence. The execution sequence of the procedures should be determined according to functions and internal logic thereof, and should not constitute any limitation to the implementation procedure of the embodiment of the present invention. For example, step 2102 may be performed in parallel with step 2103 to step 2104, or step 2103 and step 2104 may be performed before step 2102 is performed.

Figure 22:
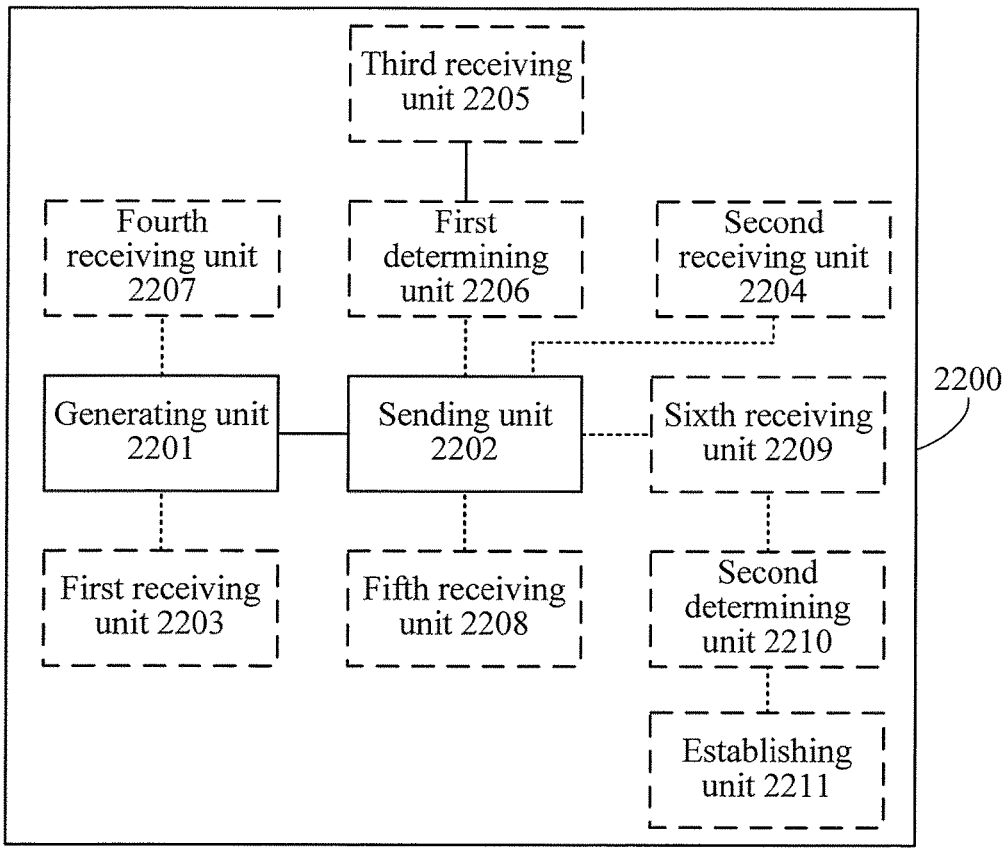
FIG. 22 is a schematic block diagram of a base station according to an embodiment of the present invention.

FIG. 22 is a schematic block diagram of a base station according to an embodiment of the present invention. A base station 2200 in FIG. 22 is the foregoing first base station. The base station 2200 includes a generating unit 2201 and a sending unit 2202.

The generating unit 2201 generates RLC PDUs. The sending unit 2202 sends a first part of downlink RLC PDUs in downlink RLC PDUs to a UE, and sends a second part of downlink RLC PDUs in the downlink RLC PDUs to a second base station, so that the second base station sends the second part of downlink RLC PDUs to the UE.

In the embodiment of the present invention, the first part of downlink RLC PDUs in the downlink RLC PDUs are sent to the UE, the second part of downlink RLC PDUs in the downlink RLC PDUs are sent to the second base station, and the second base station sends the second part of downlink RLC PDUs to the UE, so that the two base stations are capable of jointly sending data to the UE, thereby improving a peak rate and a throughput of the UE.

For other operations and functions of the base station 2200, reference may be made to the procedures involving the first base station in the foregoing method embodiments of FIG. 2a to FIG. 21, and to avoid repetition, descriptions are not provided herein again.

Optionally, as another embodiment, the base station 2200 may further include a first receiving unit 2203.

The first receiving unit 2203 may receive, from the UE, a first part of uplink RLC PDUs in uplink RLC PDUs generated by the UE, and receive, from the second base station, a second part of uplink RLC PDUs in the uplink RLC PDUs, where the second part of uplink RLC PDUs are received by the second base station from the UE.

Optionally, as another embodiment, the base station 2200 may further include a second receiving unit 2204. The second receiving unit 2204 may receive a first RLC status report from the UE. When the first RLC status report indicates to-be-retransmitted RLC PDUs in a first part of downlink RLC PDUs, the sending unit 2202 may retransmit the to-be-retransmitted RLC PDUs in the first part of downlink RLC PDUs to the UE.

The sending unit 2202 may further forward the first RLC status report to the second base station, where the first RLC status report indicates to-be-retransmitted RLC PDUs in the second part of downlink RLC PDUs, or send a retransmission message to the second base station, where the retransmission message is generated by the first base station according to the first RLC status report, and the retransmission message indicates the to-be-retransmitted RLC PDUs in the second part of downlink RLC PDUs.

Optionally, as another embodiment, the base station 2200 may further include a third receiving unit 2205 and a first determining unit 2206.

The third receiving unit 2205 may receive a first RLC status report from the second base station, where the first RLC status report is received by the second base station from the UE.

The first determining unit 2206 may determine, according to the first RLC status report, to-be-retransmitted RLC PDUs in the first part of downlink RLC PDUs.

The sending unit 2202 may further retransmit the to-be-retransmitted RLC PDUs in the first part of downlink RLC PDUs to the UE.

Optionally, as another embodiment, the base station 2200 may further include a fourth receiving unit 2207.

The generating unit 2201 may further generate a second RLC status report according to reception situations of the first part of uplink RLC PDUs and the second part of uplink RLC PDUs. The sending unit 2202 may further send the second RLC status report to the UE.

The fourth receiving unit 2207 may receive RLC PDUs in an uplink retransmission set determined by the UE according to the second RLC status report, where the uplink retransmission set includes to-be-retransmitted RLC PDUs in the first part of uplink RLC PDUs and/or to-be-retransmitted RLC PDUs in the second part of uplink RLC PDUs.

Optionally, as another embodiment, the fourth receiving unit 2207 may receive the RLC PDUs in the uplink retransmission set from the UE; or receive RLC PDUs in a first uplink retransmission subset from the UE, and receive RLC PDUs in a second uplink retransmission subset from the second base station, where the RLC PDUs in the second uplink retransmission subset are received by the second base station from the UE, and the first uplink retransmission subset and the second uplink retransmission subset are obtained by the UE by dividing the uplink retransmission set; or receive the RLC PDUs in the uplink retransmission set from the second base station, where the RLC PDUs in the uplink retransmission set are received by the second base station from the UE.

Optionally, as another embodiment, the sending unit 2202 may send, on a first cell of the base station 2200, the first part of downlink RLC PDUs to the UE, and send the second part of downlink RLC PDUs to the second base station, so that the second base station sends, on a second cell of the second base station, the second part of downlink RLC PDUs to the UE, where coverages of the first cell and the second cell overlap.

Optionally, as another embodiment, the base station 2200 may further include a fifth receiving unit 2208.

The sending unit 2202 may further send a first request message to the second base station, where the first request message is used to instruct the second base station to configure the second cell for the UE.

The fifth receiving unit 2208 may receive a first response message from the second base station, where the first response message carries resource information of the second cell, and the resource information of the second cell is determined by the second base station according to the first request message.

The sending unit 2202 may further send a radio resource control RRC connection reconfiguration message to the UE, where the RRC connection reconfiguration message carries the resource information of the second cell.

Optionally, as another embodiment, the first request message may be further used to instruct the second base station to establish a DRB for the UE.

Optionally, as another embodiment, the base station 2200 may further include a sixth receiving unit 2209 and a second determining unit 2210.

The sixth receiving unit 2209 may receive a second request message from the second base station, where the second request message is used to instruct the base station 2200 to configure the first cell for the UE.

The second determining unit 2210 may determine resource information of the first cell according to the second request message.

The sending unit 2201 may further send a second response message to the second base station, where the second response message carries the resource information of the first cell, so that the second base station notifies the UE of the resource information of the first cell.

Optionally, as another embodiment, the base station 2200 may further include an establishing unit 2211.

The second request message may be further used to instruct the base station to establish a DRB for the UE, and the establishing unit 2211 may establish, according to the second request message, a PDCP entity, an RLC entity, and a logical channel that are corresponding to the DRB.

Optionally, as another embodiment, the second request message may be further used to instruct the base station 2200 to be responsible for data splitting.

The sending unit 2202 may further send a path switch request message to an MME according to the second request message, so that the MME requests, according to the path switch request message, a serving gateway to switch a data transmission path to a path from the serving gateway to the base station 2200.

Optionally, the foregoing first receiving unit to sixth receiving unit may be a same receiving unit or identical receiving units. For example, operations of the first receiving unit to the sixth receiving unit may be completed by a receiver.

Figure 23:
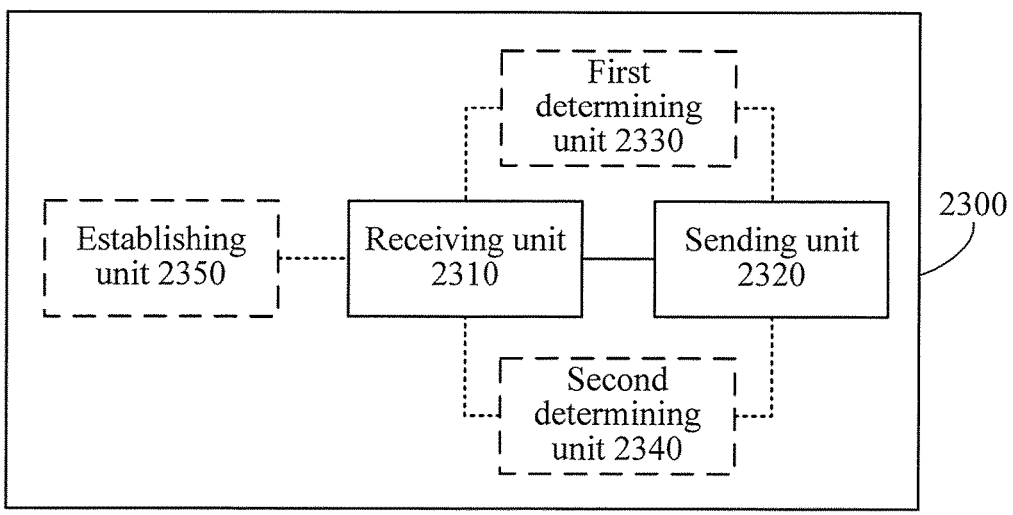
FIG. 23 is a schematic block diagram of a base station according to an embodiment of the present invention.

FIG. 23 is a schematic block diagram of a base station according to an embodiment of the present invention. A base station 2300 is the foregoing second base station. The base station 2300 includes a receiving unit 2310 and a sending unit 2320.

The receiving unit 2310 receives, from a first base station, a second part of downlink RLC PDUs in downlink RLC PDUs generated by the first base station. The sending unit 2320 sends the second part of downlink RLC PDUs to a UE.

In the embodiment of the present invention, the second part of downlink RLC PDUs in the downlink RLCPDUs generated by the first base station are sent to the UE, thereby improving a peak rate and a throughput of the UE.

For other functions and operations of the base station 2300, reference may be made to the procedures involving the second base station in the foregoing method embodiments of FIG. 2a to FIG. 21, and to avoid repetition, descriptions are not provided herein again.

Optionally, as another embodiment, the receiving unit 2310 may further receive, from the UE, a second part of uplink RLC PDUs in uplink RLC PDUs generated by the UE. The sending unit 2320 may further send the second part of uplink RLC PDUs to the first base station.

Optionally, as another embodiment, the base station 2300 may further include a first determining unit 2330.

The receiving unit 2310 may receive a first RLC status report from the first base station; the first determining unit 2330 may determine, according to the first RLC status report, to-be-retransmitted RLC PDUs in the second part of downlink RLC PDUs; and the sending unit 2320 may further retransmit the to-be-retransmitted RLC PDUs in the second part of downlink RLC PDUs to the UE.

Alternatively, the receiving unit 2310 may further receive a retransmission message from the first base station, and the sending unit 2320 may further retransmit, according to the retransmission message, to-be-retransmitted RLC PDUs in the second part of downlink RLC PDUs to the UE, where the first retransmission message indicates the to-be-retransmitted RLC PDUs in the second part of downlink RLC PDUs.

Optionally, as another embodiment, the receiving unit 2310 may further receive a first RLC status report from the UE. The sending unit 2320 may further forward the first RLC status report to the first base station, so that when the first RLC status report indicates to-be-retransmitted RLC PDUs in a first part of downlink RLC PDUs, the first base station may retransmit the to-be-retransmitted RLC PDUs in the first part of downlink RLC PDUs to the UE. When the first RLC status report indicates to-be-retransmitted RLC PDUs in the second part of downlink RLC PDUs, the sending unit 2320 may further retransmit the to-be-retransmitted RLC PDUs in the second part of downlink RLC PDUs to the UE.

Optionally, as another embodiment, the receiving unit 2310 may further receive RLC PDUs in an uplink retransmission set from the UE, and the sending unit 2320 may further send the RLC PDUs in the uplink retransmission set to the first base station, where the uplink retransmission set includes to-be-retransmitted RLC PDUs in a first part of uplink RLC PDUs and/or to-be-retransmitted RLC PDUs in a second part of uplink RLC PDUs.

Alternatively, the receiving unit 2310 may further receive RLC PDUs in a second uplink retransmission subset from the UE, and the sending unit 2320 may further send the RLC PDUs in the second uplink retransmission subset to the first base station, where the second uplink retransmission subset is obtained by the UE by dividing the uplink retransmission set.

Optionally, as another embodiment, the sending unit 2320 may send, on a second cell of the base station 2300, the second part of downlink RLC PDUs to the UE.

Optionally, as another embodiment, the base station 2300 may further include a second determining unit 2340. The receiving unit 2310 may further receive a first request message from the first base station, where the first request message is used to instruct the base station to configure the second cell for the UE.

The second determining unit 2340 may determine resource information of the second cell according to the first request message.

The sending unit 2320 may further send a first response message to the first base station, where the first response message carries the resource information of the second cell, so that the first base station notifies the UE of the resource information of the second cell.

Optionally, as another embodiment, the base station 2300 may further include an establishing unit 2350.

The first request message may be further used to instruct the base station 2300 to establish a DRB for the UE. The establishing unit 2350 may establish, according to the first request message, an RLC entity and a logical channel that are corresponding to the DRB.

Optionally, as another embodiment, the sending unit 2320 may further send a second request message to the first base station, where the second request message is used to instruct the first base station to configure a first cell of the first base station for the UE. The receiving unit 2310 may further receive a second response message from the first base station, where the second response message carries resource information of the first cell, and the resource information of the first cell is determined by the first base station according to the second request message. The sending unit 2320 may further send a radio resource control RRC connection reconfiguration message to the UE, where the RRC connection reconfiguration message carries the resource information of the first cell.

Optionally, as another embodiment, the second request message is further used to instruct the first base station to establish a DRB for the UE.

Figure 24:
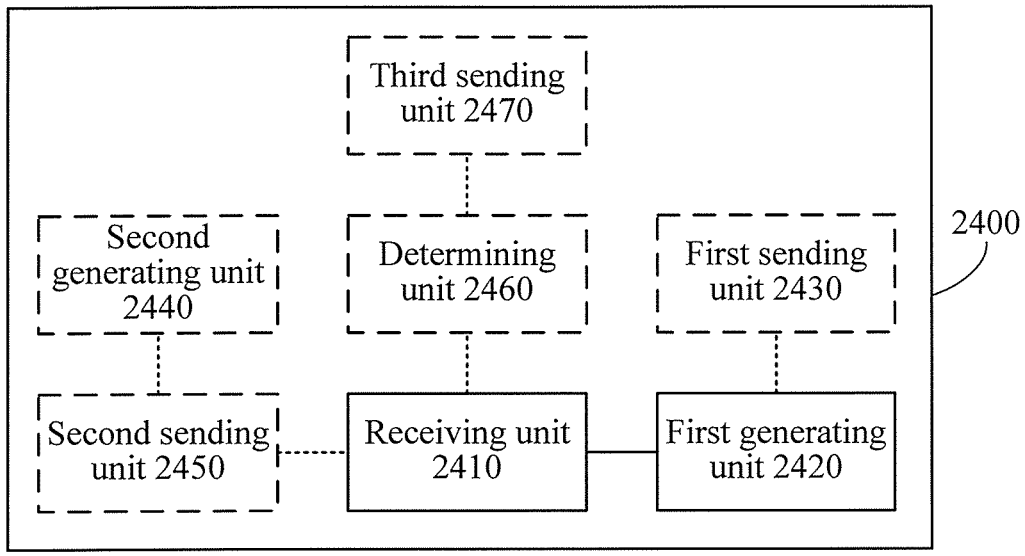
FIG. 24 is a schematic block diagram of a UE according to an embodiment of the present invention.

FIG. 24 is a schematic block diagram of a UE according to an embodiment of the present invention. A UE 2400 includes a receiving unit 2410 and a first generating unit 2420.

The receiving unit 2410 receives, from a first base station, a first part of downlink RLC PDUs in downlink RLC PDUs generated by the first base station, and receives, from a second base station, a second part of downlink RLC PDUs in the downlink RLC PDUs, where the second part of downlink RLC PDUs are received by the second base station from the first base station. The first generating unit 2420 reassembles the first part of downlink RLC PDUs and the second part of downlink RLC PDUs to form downlink RLC SDUs.

In the embodiment of the present invention, the UE receives, from the first base station, the first part of downlink RLC PDUs in the downlink RLC PDUs, and receives, from the second base station, the second part of downlink RLC PDUs that are obtained by the second base station from the first base station, so that the UE is capable of transmitting data with the two base stations jointly, thereby improving a peak rate and a throughput of the UE.

For other functions and operations of the UE 2400, reference may be made to the procedures involving the UE in the foregoing method embodiments of FIG. 2a to FIG. 21, and to avoid repetition, descriptions are not provided herein again.

Optionally, as another embodiment, the UE 2400 may further include a first sending unit 2430. The first generating unit 2420 may generate uplink RLC PDUs. The first sending unit 2440 may send a first part of uplink RLC PDUs in the uplink RLC PDUs to the first base station, and send a second part of uplink RLC PDUs in the uplink RLC PDUs to the second base station.

Optionally, as another embodiment, the UE 2400 may further include a second generating unit 2440 and a second sending unit 2450.

The second generating unit 2440 may generate a first RLC status report according to reception situations of the first part of downlink RLC PDUs and the second part of downlink RLC PDUs, where the first RLC status report indicates to-be-retransmitted RLC PDUs in the first part of downlink RLC PDUs and/or to-be-retransmitted RLC PDUs in the second part of downlink RLC PDUs.

The second sending unit 2450 may send the first RLC status report to the first base station or the second base station.

The receiving unit 2410 may further receive the to-be-retransmitted RLC PDUs in the first part of downlink RLC PDUs from the first base station and/or receive the to-be-retransmitted RLC PDUs in the second part of downlink RLC PDUs from the second base station.

Optionally, as another embodiment, the UE 2400 may further include a determining unit 2460 and a third sending unit 2470.

The receiving unit 2410 may further receive a second RLC status report from the first base station.

The determining unit 2460 may determine an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs.

The third sending unit 2470 may send RLC PDUs in the uplink retransmission set to the first base station, or send RLC PDUs in the uplink retransmission set to the second base station, or send RLC PDUs in a first uplink retransmission subset to the first base station and send RLC PDUs in a second uplink retransmission subset to the second base station, where the first uplink retransmission subset and the second uplink retransmission subset are obtained by the UE by dividing the uplink retransmission set.

Optionally, as another embodiment, receiving unit 2410 may receive the first part of downlink RLC PDUs from a first cell of the first base station, and receive the second part of downlink RLC PDUs from a second cell of the second base station, where coverages of the first cell and the second cell overlap.

Optionally, as another embodiment, the receiving unit 2410 may further receive a radio resource control RRC connection reconfiguration message from the first base station, where the RRC connection reconfiguration message carries resource information of the second cell, and the resource information of the second cell is determined by the second base station.

Optionally, as another embodiment, the receiving unit 2410 may further receive an RRC connection reconfiguration message from the second base station, where the RRC connection reconfiguration message carries resource information of the first cell, and the resource information of the first cell is determined by the first base station.

Optionally, the foregoing first sending unit to third sending unit may be a same sending unit or identical sending units. For example, operations of the first sending unit to the third sending unit may be completed by a transmitter.

Figure 25:
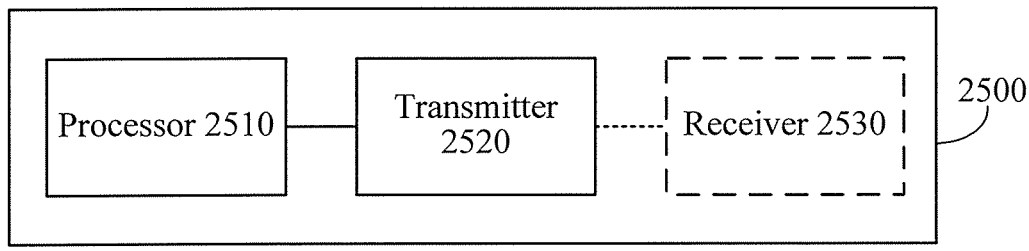
FIG. 25 is a schematic block diagram of a base station according to an embodiment of the present invention.

FIG. 25 is a schematic block diagram of a base station according to an embodiment of the present invention. A base station 2500 in FIG. 25 is the foregoing first base station. The base station 2500 includes a processor 2510 and a transmitter 2520.

The processor 2510 generates RLC PDUs. The transmitter 2520 sends a first part of downlink RLC PDUs in downlink RLC PDUs to a UE, and sends a second part of downlink RLC PDUs in the downlink RLC PDUs to a second base station, so that the second base station sends the second part of downlink RLC PDUs to the UE.

In the embodiment of the present invention, the first part of downlink RLC PDUs in the downlink RLC PDUs are sent to the UE, the second part of downlink RLC PDUs in the downlink RLC PDUs are sent to the second base station, and the second base station sends the second part of downlink RLC PDUs to the UE, so that the two base stations are capable of jointly sending data to the UE, thereby improving a peak rate and a throughput of the UE.

For other operations and functions of the base station 2500, reference may be made to the procedures involving the first base station in the foregoing method embodiments of FIG. 2a to FIG. 21, and to avoid repetition, descriptions are not provided herein again.

Optionally, as another embodiment, the base station 2500 may further include a receiver 2530.

The receiver 2530 may receive, from the UE, a first part of uplink RLC PDUs in uplink RLC PDUs generated by the UE, and receive, from the second base station, a second part of uplink RLC PDUs in the uplink RLC PDUs, where the second part of uplink RLC PDUs are received by the second base station from the UE.

Optionally, as another embodiment, the receiver 2530 may receive a first RLC status report from the UE. When the first RLC status report indicates to-be-retransmitted RLC PDUs in a first part of downlink RLC PDUs, the transmitter 2520 may retransmit the to-be-retransmitted RLC PDUs in the first part of downlink RLC PDUs to the UE.

The transmitter 2520 may further forward the first RLC status report to the second base station, where the first RLC status report indicates to-be-retransmitted RLC PDUs in the second part of downlink RLC PDUs, or send a retransmission message to the second base station, where the retransmission message is generated by the first base station according to the first RLC status report, and the retransmission message indicates the to-be-retransmitted RLC PDUs in the second part of downlink RLC PDUs.

Optionally, as another embodiment, the receiver 2530 may receive the first RLC status report from the second base station, where the first RLC status report is received by the second base station from the UE.

The processor 2510 may determine, according to the first RLC status report, to-be-retransmitted RLC PDUs in the first part of downlink RLC PDUs.

The transmitter 2520 may further retransmit the to-be-retransmitted RLC PDUs in the first part of downlink RLC PDUs to the UE.

Optionally, as another embodiment, the processor 2510 may further generate a second RLC status report according to reception situations of the first part of uplink RLC PDUs and the second part of uplink RLC PDUs. The transmitter 2520 may further send the second RLC status report to the UE.

The receiver 2530 may receive RLC PDUs in an uplink retransmission set determined by the UE according to the second RLC status report, where the uplink retransmission set includes to-be-retransmitted RLC PDUs in the first part of uplink RLC PDUs and/or to-be-retransmitted RLC PDUs in the second part of uplink RLC PDUs.

Optionally, as another embodiment, the receiver 2530 may receive the RLC PDUs in the uplink retransmission set from the UE; or receive RLC PDUs in a first uplink retransmission subset from the UE, and receive RLC PDUs in a second uplink retransmission subset from the second base station, where the RLC PDUs in the second uplink retransmission subset are received by the second base station from the UE, and the first uplink retransmission subset and the second uplink retransmission subset are obtained by the UE by dividing the uplink retransmission set; or receive the RLC PDUs in the uplink retransmission set from the second base station, where the RLC PDUs in the uplink retransmission set are received by the second base station from the UE.

Optionally, as another embodiment, the transmitter 2520 may send, on a first cell of the base station 2500, the first part of downlink RLC PDUs to the UE, and send the second part of downlink RLC PDUs to the second base station, so that the second base station sends, on a second cell of the second base station, the second part of downlink RLC PDUs to the UE, where coverages of the first cell and the second cell overlap.

Optionally, as another embodiment, the transmitter 2520 may further send a first request message to the second base station, where the first request message may be used to instruct the second base station to configure the second cell for the UE.

The receiver 2530 may receive a first response message from the second base station, where the first response message carries resource information of the second cell, and the resource information of the second cell is determined by the second base station according to the first request message.

The transmitter 2520 may further send a radio resource control RRC connection reconfiguration message to the UE, where the RRC connection reconfiguration message carries the resource information of the second cell.

Optionally, as another embodiment, the first request message may be further used to instruct the second base station to establish a DRB for the UE.

Optionally, as another embodiment, the receiver 2530 may receive a second request message from the second base station, where the second request message is used to instruct the base station 2500 to configure the first cell for the UE.

The processor 2510 may determine resource information of the first cell according to the second request message.

The transmitter 2520 may further send a second response message to the second base station, where the second response message carries the resource information of the first cell, so that the second base station notifies the UE of the resource information of the first cell.

Optionally, as another embodiment, the second request message may be further used to instruct the base station to establish a DRB for the UE. The processor 2510 may establish, according to the second request message, a PDCP entity, an RLC entity, and a logical channel that are corresponding to the DRB.

Optionally, as another embodiment, the second request message may be further used to instruct the base station 2200 to be responsible for data splitting.

The transmitter 2520 may further send a path switch request message to an MME according to the second request message, so that the MME requests, according to the path switch request message, a serving gateway to switch a data transmission path to a path from the serving gateway to the base station 2500.

Figure 26:
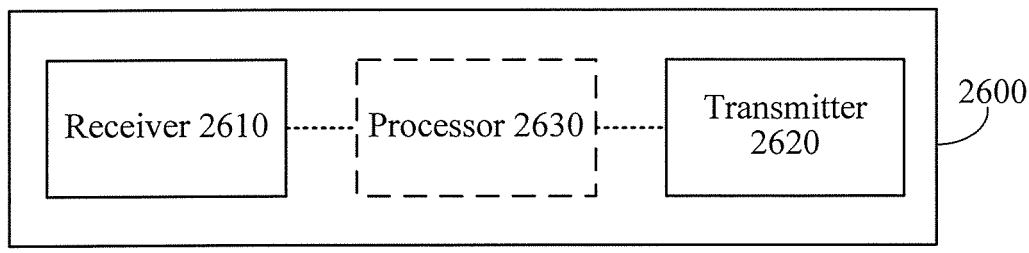
FIG. 26 is a schematic block diagram of a base station according to an embodiment of the present invention.

FIG. 26 is a schematic block diagram of a base station according to an embodiment of the present invention. A base station 2600 is the foregoing second base station. The base station 2600 includes a receiver 2610 and a transmitter 2620.

The receiver 2610 receives, from a first base station, a second part of downlink RLC PDUs in downlink RLC PDUs generated by the first base station. The transmitter 2620 sends the second part of downlink RLC PDUs to a UE.

In the embodiment of the present invention, the second part of downlink RLC PDUs in the downlink RLCPDUs generated by the first base station are sent to the UE, thereby improving a peak rate and a throughput of the UE.

For other functions and operations of the base station 2600, reference may be made to the procedures involving the second base station in the foregoing method embodiments of FIG. 2a to FIG. 21, and to avoid repetition, descriptions are not provided herein again.

Optionally, as another embodiment, the receiver 2610 may further receive, from the UE, a second part of uplink RLC PDUs in uplink RLC PDUs generated by the UE. The transmitter 2620 may further send the second part of uplink RLC PDUs to the first base station.

Optionally, as another embodiment, the base station 2600 may further include a processor 2630. The receiver 2610 may receive a first RLC status report from the first base station; the processor 2630 may determine, according to the first RLC status report, to-be-retransmitted RLC PDUs in the second part of downlink RLC PDUs; and the transmitter 2620 may further retransmit the to-be-retransmitted RLC PDUs in the second part of downlink RLC PDUs to the UE.

Alternatively, the receiver 2610 may further receive a retransmission message from the first base station, and the transmitter 2620 may further retransmit, according to the retransmission message, to-be-retransmitted RLC PDUs in the second part of downlink RLC PDUs to the UE, where the first retransmission message indicates the to-be-retransmitted RLC PDUs in the second part of downlink RLC PDUs.

Optionally, as another embodiment, the receiver 2610 may further receive a first RLC status report from the UE. The transmitter 2620 may further forward the first RLC status report to the first base station, so that when the first RLC status report indicates to-be-retransmitted RLC PDUs in a first part of downlink RLC PDUs, the first base station retransmits the to-be-retransmitted RLC PDUs in the first part of downlink RLC PDUs to the UE. When the first RLC status report indicates to-be-retransmitted RLC PDUs in the second part of downlink RLC PDUs, the transmitter 2620 may further retransmit the to-be-retransmitted RLC PDUs in the second part of downlink RLC PDUs to the UE.

Optionally, as another embodiment, the receiver 2610 may further receive RLC PDUs in an uplink retransmission set from the UE, and the transmitter 2620 may further send the RLC PDUs in the uplink retransmission set to the first base station, where the uplink retransmission set includes to-be-retransmitted RLC PDUs in a first part of uplink RLC PDUs and/or to-be-retransmitted RLC PDUs in a second part of uplink RLC PDUs.

Alternatively, the receiver 2610 may further receive RLC PDUs in a second uplink retransmission subset from the UE, and the transmitter 2620 may further send the RLC PDUs in the second uplink retransmission subset to the first base station, where the second uplink retransmission subset is obtained by the UE by dividing the uplink retransmission set.

Optionally, as another embodiment, the transmitter 2620 may send, on a second cell of the base station 2600, the second part of downlink RLC PDUs to the UE.

Optionally, as another embodiment, the receiver 2610 may further receive a first request message from the first base station, where the first request message may be used to instruct the base station to configure the second cell for the UE.

The processor 2630 may determine resource information of the second cell according to the first request message.

The transmitter 2620 may further send a first response message to the first base station, where the first response message carries the resource information of the second cell, so that the first base station notifies the UE of the resource information of the second cell.

Optionally, as another embodiment, the first request message may be further used to instruct the base station 2600 to establish a DRB for the UE. The processor 2630 may establish, according to the first request message, an RLC entity and a logical channel that are corresponding to the DRB.

Optionally, as another embodiment, the transmitter 2620 may further send a second request message to the first base station, where the second request message is used to instruct the first base station to configure a first cell of the first base station for the UE. The receiver 2610 may further receive a second response message from the first base station, where the second response message carries resource information of the first cell, and the resource information of the first cell is determined by the first base station according to the second request message. The transmitter 2620 may further send a radio resource control RRC connection reconfiguration message to the UE, where the RRC connection reconfiguration message carries the resource information of the first cell.

Optionally, as another embodiment, the second request message is further used to instruct the first base station to establish a DRB for the UE.

Figure 27:
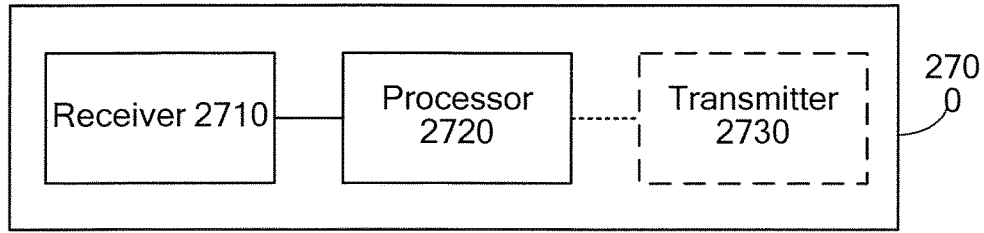
FIG. 27 is a schematic block diagram of a UE according to an embodiment of the present invention.

FIG. 27 is a schematic block diagram of a UE according to an embodiment of the present invention. A UE 2700 includes a receiver 2710 and a processor 2720.

The receiver 2710 receives, from a first base station, a first part of downlink RLC PDUs in downlink RLC PDUs generated by the first base station, and receives, from a second base station, a second part of downlink RLC PDUs in the downlink RLC PDUs, where the second part of downlink RLC PDUs are received by the second base station from the first base station. The processor 2720 reassembles the first part of downlink RLC PDUs and the second part of downlink RLC PDUs to form downlink RLC SDUs.

In the embodiment of the present invention, the UE receives, from the first base station, the first part of downlink RLC PDUs in the downlink RLC PDUs, and receives, from the second base station, the second part of downlink RLC PDUs that are obtained by the second base station from the first base station, so that the UE is capable of transmitting data with the two base stations jointly, thereby improving a peak rate and a throughput of the UE.

For other functions and operations of the UE 2700, reference may be made to the procedures involving the UE in the foregoing method embodiments of FIG. 2a to FIG. 21, and to avoid repetition, descriptions are not provided herein again.

Optionally, as another embodiment, the UE 2700 may further include a transmitter 2730. The processor 2720 may generate uplink RLC PDUs. The transmitter 2730 may send a first part of uplink RLC PDUs in the uplink RLC PDUs to the first base station, and send a second part of uplink RLC PDUs in the uplink RLC PDUs to the second base station.

Optionally, as another embodiment, the processor 2720 may generate a first RLC status report according to reception situations of the first part of downlink RLC PDUs and the second part of downlink RLC PDUs, where the first RLC status report indicates to-be-retransmitted RLC PDUs in the first part of downlink RLC PDUs and/or to-be-retransmitted RLC PDUs in the second part of downlink RLC PDUs.

The transmitter 2730 may send the first RLC status report to the first base station or the second base station.

The receiver 2710 may further receive the to-be-retransmitted RLC PDUs in the first part of downlink RLC PDUs from the first base station and/or receive the to-be-retransmitted RLC PDUs in the second part of downlink RLC PDUs from the second base station.

Optionally, as another embodiment, the receiver 2710 may further receive a second RLC status report from the first base station.

The processor 2720 may determine an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs.

The transmitter 2730 may send RLC PDUs in the uplink retransmission set to the first base station, or send RLC PDUs in the uplink retransmission set to the second base station, or send RLC PDUs in a first uplink retransmission subset to the first base station and send RLC PDUs in a second uplink retransmission subset to the second base station, where the first uplink retransmission subset and the second uplink retransmission subset are obtained by the UE by dividing the uplink retransmission set.

Optionally, as another embodiment, the receiver 2710 may receive the first part of downlink RLC PDUs from a first cell of the first base station, and receive the second part of downlink RLC PDUs from a second cell of the second base station, where coverages of the first cell and the second cell overlap.

Optionally, as another embodiment, the receiver 2710 may further receive a radio resource control RRC connection reconfiguration message from the first base station, where the RRC connection reconfiguration message carries resource information of the second cell, and the resource information of the second cell is determined by the second base station.

Optionally, as another embodiment, the receiver 2710 may further receive an RRC connection reconfiguration message from the second base station, where the RRC connection reconfiguration message carries resource information of the first cell, and the resource information of the first cell is determined by the first base station.

In the embodiment of the present invention, the UE receives, from the first base station, the first part of downlink RLC PDUs in the downlink RLC PDUs, and receives, from the second base station, the second part of downlink RLC PDUs that are obtained by the second base station from the first base station, thereby improving a peak rate and a throughput of the UE.

Figure 28:
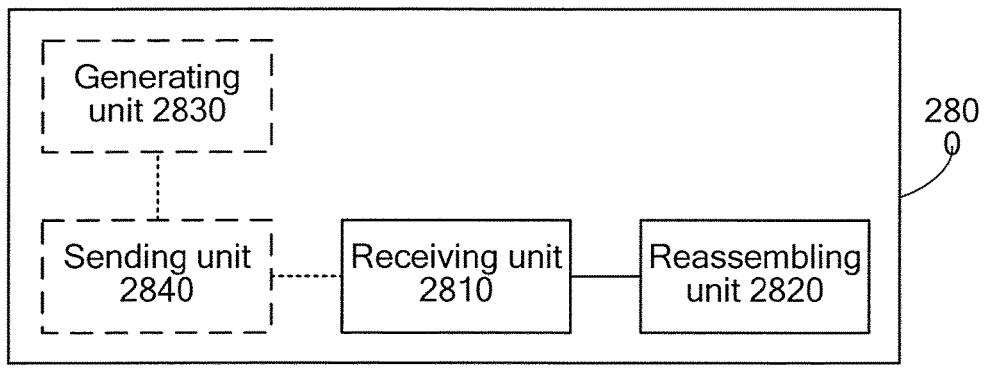
FIG. 28 is a schematic block diagram of a base station according to an embodiment of the present invention.

FIG. 28 is a schematic block diagram of a base station according to an embodiment of the present invention. A base station 2800 in FIG. 28 is the foregoing first base station. The base station 2800 includes a receiving unit 2810 and a reassembling unit 2820.

The receiving unit 2810 receives, from a UE, a first part of uplink RLC PDUs in uplink RLC PDUs generated by the UE, and receives, from a second base station, a second part of uplink RLC PDUs in the uplink RLC PDUs, where the second part of uplink RLC PDUs are received by the second base station from the UE. The reassembling unit 2820 reassembles the first part of uplink RLC PDUs and the second part of uplink RLC PDUs.

In the embodiment of the present invention, the first part of uplink RLC PDUs in the uplink RLC PDUs generated by the UE are received from the UE, and the second part of uplink RLC PDUs in the uplink RLC PDUs are received from the second base station, so that the two base stations are capable of jointly transmitting data with the UE, thereby improving a peak rate and a throughput of the UE.

For other functions and operations of the base station 2800, reference may be made to the procedure of the foregoing method embodiment of FIG. 2b, and to avoid repetition, descriptions are not provided herein again.

Optionally, as an embodiment, the base station may further include a generating unit 2830 and a sending unit 2840. The generating unit 2830 may generate a second RLC status report according to reception situations of the first part of uplink RLC PDUs and the second part of uplink RLC PDUs. The sending unit 2840 may send the second RLC status report to the UE. The receiving unit 2810 may receive RLC PDUs in an uplink retransmission set determined by the UE according to the second RLC status report, where the uplink retransmission set includes to-be-retransmitted RLC PDUs in the first part of uplink RLC PDUs and/or to-be-retransmitted RLC PDUs in the second part of uplink RLC PDUs.

Optionally, as another embodiment, the receiving unit 2810 may receive RLC PDUs in the uplink retransmission set from the UE. Alternatively, the receiving unit 2810 may receive RLC PDUs in a first uplink retransmission subset from the UE, and receive RLC PDUs in a second uplink retransmission subset from the second base station, where the RLC PDUs in the second uplink retransmission subset are received by the second base station from the UE, and the first uplink retransmission subset and the second uplink retransmission subset are obtained by the UE by dividing the uplink retransmission set. Alternatively, the receiving unit 2810 may receive the RLC PDUs in the uplink retransmission set from the second base station, where the RLC PDUs in the uplink retransmission set are received by the second base station from the UE.

Figure 29:
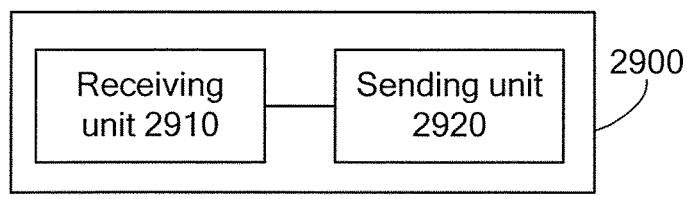
FIG. 29 is a schematic block diagram of a base station according to an embodiment of the present invention.

FIG. 29 is a schematic block diagram of a base station according to an embodiment of the present invention. A base station 2900 in FIG. 29 may be the foregoing second base station. The base station 2900 includes a receiving unit 2910 and a sending unit 2920.

The receiving unit 2910 receives, from a UE, a second part of uplink RLC PDUs in uplink RLC PDUs generated by the UE. The sending unit 2920 sends the second part of uplink RLC PDUs to a first base station.

In the embodiment of the present invention, the second part of uplink RLC PDUs in the uplink RLCPDUs generated by the UE are sent to the first base station, thereby improving a peak rate and a throughput of the UE.

Optionally, as an embodiment, the receiving unit 2910 may further receive RLC PDUs in an uplink retransmission set from the UE. The sending unit 2920 may further send RLC PDUs in an uplink retransmission set to the first base station, where the uplink retransmission set includes to-be-retransmitted RLC PDUs in the first part of uplink RLC PDUs and/or to-be-retransmitted RLC PDUs in the second part of uplink RLC PDUs. Alternatively, the receiving unit 2910 may receive RLC PDUs in a second uplink retransmission subset from the UE, and send the RLC PDUs in the second uplink retransmission subset to the first base station, where the second uplink retransmission subset is obtained by the UE by dividing the uplink retransmission set.

Figure 30:
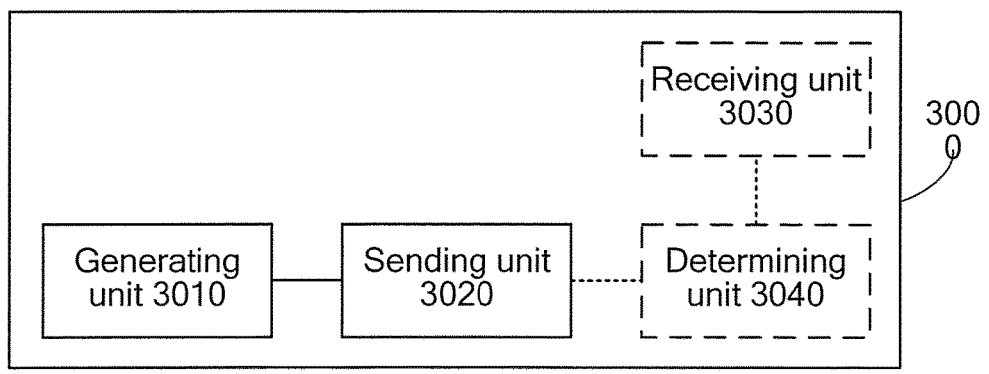
FIG. 30 is a schematic block diagram of a UE according to an embodiment of the present invention.

FIG. 30 is a schematic block diagram of a UE according to an embodiment of the present invention. A UE 3000 includes a generating unit 3010 and a sending unit 3020.

The generating unit 3010 generates uplink RLC PDUs. The sending unit 3020 sends a first part of uplink RLC PDUs in the uplink RLC PDUs to a first base station, and sends a second part of uplink RLC PDUs in the uplink RLC PDUs to a second base station, so that the second base station sends the second part of uplink RLC PDUs to the first base station.

In the embodiment of the present invention, the UE sends the first part of uplink RLC PDUs in the uplink RLC PDUs to the first base station, and sends the second part of uplink RLC PDUs to the second base station, and the second base station sends the second part of uplink RLC PDUs to the first base station, so that the UE is capable of transmitting data with the two base stations jointly, thereby improving a peak rate and a throughput of the UE.

Optionally, as an embodiment, the UE 3000 may further include a receiving unit 3030 and a determining unit 3040. The receiving unit 3030 may receive a second RLC status report from the first base station. The determining unit 3040 may determine an uplink retransmission set according to the second RLC status report, where the uplink retransmission set includes to-be-retransmitted RLC PDUs in the first part of uplink RLC PDUs and/or to-be-retransmitted RLC PDUs in the second part of uplink RLC PDUs. The sending unit 3020 may further send RLC PDUs in the uplink retransmission set to the first base station, or send RLC PDUs in the uplink retransmission set to the second base station, or send RLC PDUs in a first uplink retransmission subset to the first base station and send RLC PDUs in a second uplink retransmission subset to the second base station, where the first uplink retransmission subset and the second uplink retransmission subset are obtained by the UE by dividing the uplink retransmission set.

In the case of inter-base station CA, the UE may transmit data with each base station on cells aggregated by each base station. When a traffic volume of the UE decreases or radio conditions of the aggregated cells deteriorate, the UE further needs to listen to channels of these cells, which causes a waste of power of the UE. An embodiment of the present invention provides a cell resource management method.

Figure 31:
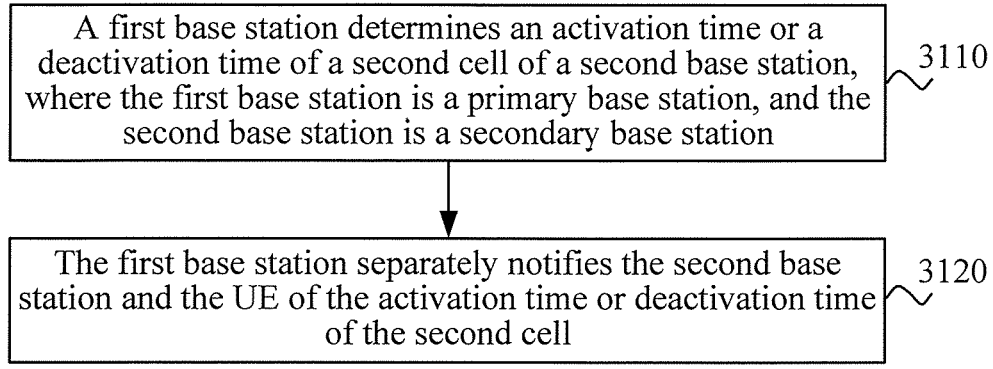
FIG. 31 is a schematic flowchart of a cell resource management method according to an embodiment of the present invention.

FIG. 31 is a schematic flowchart of a cell resource management method according to an embodiment of the present invention. The method of FIG. 31 is executed by a base station.

3110: A first base station determines an activation time or a deactivation time of a second cell of a second base station, where the first base station is a primary base station, and the second base station is a secondary base station.

The first base station is the primary base station, and the second base station is the secondary base station; then, the second cell of the second base station is an SCell. For example, the first base station may be a macro base station, and the second base station may be a micro base station.

When indication signaling indicates the activation time of the second cell, the indication signaling may be activation signaling. When indication signaling indicates the deactivation time of the second cell, the indication signaling may be deactivation signaling. For example, the activation signaling and the deactivation signaling may be MAC CEs (Control Element, control element).

3120: The first base station separately notifies the second base station and the UE of the activation time or deactivation time of the second cell.

Optionally, as another embodiment, the first base station separately sends indication signaling to the second base station and the UE, where the indication signaling may be used to indicate the activation time or deactivation time of the second cell.

Optionally, as another embodiment, the first base station may send indication signaling to the second base station, so that the second base station sends the indication signaling to the UE, where the indication signaling may be used to indicate the activation time or deactivation time of the second cell.

It should be noted that, before the deactivation time arrives, the second base station may send, to the first base station, an unacknowledged RLC PDU or an unsent RLC PDU in an RLC transmission buffer of the second cell, and an RLC PDU in an RLC reception buffer, or notify the first base station of SNs of the foregoing RLC PDUs.

In the embodiment of the present invention, the first base station determines the activation time or deactivation time of the second cell of the second base station, and notifies the UE of the activation time or deactivation time of the second cell, so that the UE can activate or deactivate the second cell, thereby saving power of the UE.

In addition, in the embodiment of the present invention, the first base station separately notifies the second base station and the UE of the activation time or deactivation time of the second cell, and therefore it can be ensured that effective times of the activation or deactivation between the second base station and the UE are the same, and a delay that occurs when the first base station and the second base station send the indication signaling through an X2 interface can be solved.

Figure 32:
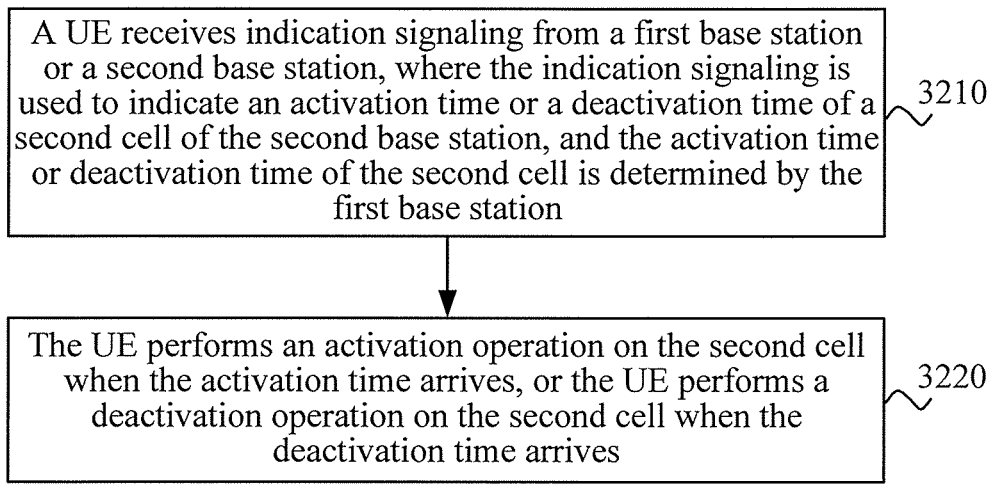
FIG. 32 is a schematic flowchart of a cell resource management method according to an embodiment of the present invention.

FIG. 32 is a schematic flowchart of a cell resource management method according to an embodiment of the present invention. The method of FIG. 32 is executed by a UE.

3210: A UE receives indication signaling from a first base station or a second base station, where the indication signaling may be used to indicate an activation time or a deactivation time of a second cell of the second base station, the first base station is a primary base station, the second base station is a secondary base station, and the activation time or deactivation time of the second cell is determined by the first base station.

3220: The UE performs an activation operation on the second cell when the activation time arrives, or the UE performs a deactivation operation on the second cell when the deactivation time arrives.

In the embodiment of the present invention, the UE receives the indication signaling from the first base station, so that the UE can activate or deactivate the second cell according to the indication signaling, thereby saving power of the UE.

Figure 33:
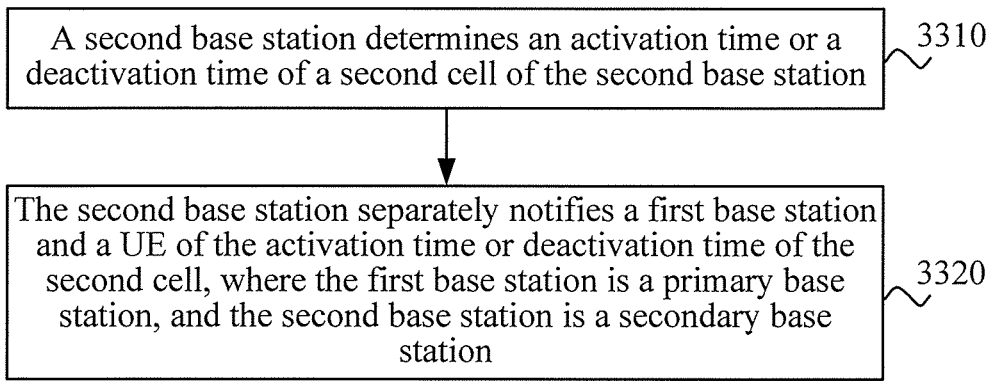
FIG. 33 is a schematic flowchart of a cell resource management method according to an embodiment of the present invention.

FIG. 33 is a schematic flowchart of a cell resource management method according to an embodiment of the present invention. The method of FIG. 33 is executed by a base station.

3310: A second base station determines an activation time or a deactivation time of a second cell of the second base station.

3320: The second base station separately notifies a first base station and a UE of the activation time or deactivation time of the second cell, where the first base station is a primary base station, and the second base station is a secondary base station.

The first base station is the primary base station, and the second base station is the secondary base station; then, the second cell of the second base station is an SCell. For example, the first base station may be a macro base station, and the second base station may be a micro base station.

Optionally, as another embodiment, the second base station separately sends indication signaling to the first base station and the UE, where the indication signaling may be used to indicate the activation time or deactivation time of the second cell.

Optionally, as another embodiment, the second base station may send indication signaling to the first base station, so that the first base station sends the indication signaling to the UE, where the indication signaling may be used to indicate the activation time or deactivation time of the second cell.

Optionally, as another embodiment, before the deactivation time arrives, the second base station may send, to the first base station, an unacknowledged RLC PDU or an unsent RLC PDU in an RLC transmission buffer of the second cell, and an RLC PDU in an RLC reception buffer, or notify the first base station of SNs of the foregoing RLC PDUs.

In the embodiment of the present invention, the second base station determines the activation time or deactivation time of the second cell of the second base station, and notifies the UE of the activation time or deactivation time of the second cell, so that the UE can activate or deactivate the second cell, thereby saving power of the UE.

Figure 34:
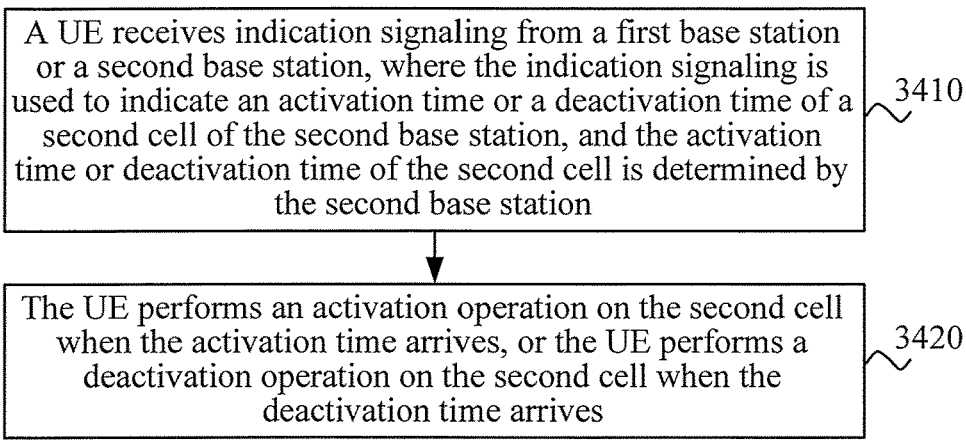
FIG. 34 is a schematic flowchart of a cell resource management method according to an embodiment of the present invention.

FIG. 34 is a schematic flowchart of a cell resource management method according to an embodiment of the present invention. The method of FIG. 34 is executed by a UE.

3410: A UE receives indication signaling from a second base station or a first base station, where the indication signaling may be used to indicate an activation time or a deactivation time of a second cell of the second base station, the first base station is a primary base station, the second base station is a secondary base station, and the activation time or deactivation time of the second cell is determined by the second base station.

3420: The UE performs an activation operation on the second cell when the activation time arrives, or the UE performs a deactivation operation on the second cell when the deactivation time arrives.

In the embodiment of the present invention, the UE receives the indication signaling from the first base station, so that the UE can activate or deactivate the second cell according to the indication signaling, thereby saving power of the UE.

In addition, in another embodiment, the UE may further maintain a deactivation timer corresponding to the second cell of the second base station, and when the deactivation timer times out, the UE deactivates the second cell of the second base station, and sends indication signaling to the first base station and the second base station, where the indication signaling may be used to indicate that the second cell is deactivated. The first base station may be a primary base station, and the second base station may be a secondary base station. After the second base station receives the indication signaling, the second base station may send, to the first base station, an unacknowledged RLC PDU or an unsent RLC PDU in an RLC transmission buffer of the second cell, and an RLC PDU in an RLC reception buffer, or notify the first base station of SNs of the foregoing RLC PDUs.

The following describes the cell resource management method in detail with reference to a specific example.

For example, it is assumed that the first base station is a macro base station, and the second base station is a micro base station. The macro base station is a primary base station, and the micro base station is a secondary base station. It is assumed that the micro base station provides two carriers, namely, CC1 and CC2, which are corresponding to serving cells SCell1 and SCell2, respectively; then, indication signaling for SCell1 and SCell2 may be sent to the UE on a PCell on the macro base station and SCell1 in an activated state or SCell2 in an activated state. Assuming that SCell1 is configured with a PUCCH, SCell1 can only be deactivated after SCell2 is deactivated; and during activation, SCell1 should be activated first. In this case, SCell1 and SCell2 may also be activated or deactivated at the same time.

After SCell2 is deactivated, all RLC PDUs in RLC1 and RLC2 that are distributed to the micro base station can be mapped to SCell1 and be sent or received.

The following provides descriptions with reference to the protocol stack shown in FIG. 10. After SCell1 of the micro base station is deactivated, in an RLC AM, unacknowledged RLC PDUs in transmission buffers of RLC1 and RLC2 of the micro base station need to be transmitted back to the macro base station, or SNs of corresponding RLC PDUs need to be indicated to the macro base station (a copy of original RLC PDUs needs to be saved in a transmission buffer or a retransmission buffer of the macro base station). In the RLC UM, unsent RLC PDUs in the transmission buffers of RLC1 and RLC2 of the micro base station need to be transmitted back to the macro base station, or SNs of corresponding RLC PDUs need to be indicated to the macro base station (a copy of original RLC PDUs needs to be saved in the transmission buffer or retransmission buffer of the macro base station). In the RLC AM and the RLC UM, RLC PDUs in reception buffers of RLC1 and RLC2 need to be sent to the macro base station.

After SCell1 of the micro base station is deactivated, RLC PDUs in RLC1 and RLC2 of the macro base station are not sent to the micro base station anymore. A first RLC status report received by the macro base station from the UE is not sent to the micro base station anymore either.

In the prior art, the UE may report, to a serving base station and by using power headroom reporting (Power Headroom Reporting, PHR), information about a difference between nominal (nominal) UE maximum transmit power on each serving cell in an activated state and estimated transmit power on an UL-SCH, and may also report information about a difference between nominal UE maximum transmit power on a primary serving cell (PCell) and estimated transmit power on the UL-SCH and a physical uplink control channel (Physical Uplink Control Channel, PUCCH). In this way, the serving base station can perform uplink power control according to the PHR. In the case of inter-base station CA, if all cells aggregated by two base stations are configured with PUCCHs, and the UE is configured as being capable of sending a PUSCH and a PUCCH on all the aggregated cells, no corresponding mechanism for implementing uplink power control of two base stations is available at present.

Figure 35:
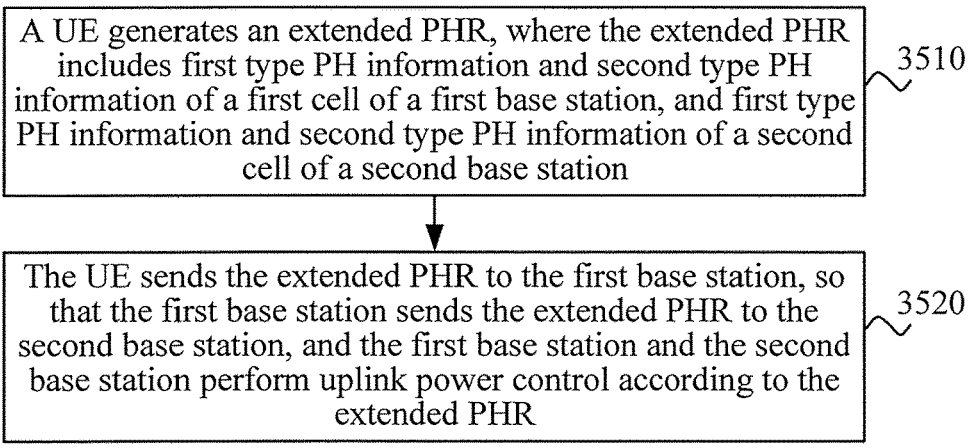
FIG. 35 is a schematic flowchart of an uplink power control method according to an embodiment of the present invention.

FIG. 35 is a schematic flowchart of an uplink power control method according to an embodiment of the present invention. The method of FIG. 35 is executed by a UE.

3510: A UE generates an extended PHR, where the extended PHR includes first type power headroom (Power Headroom, PH) information and second type PH information of a first cell of a first base station, and first type PH information and second type PH information of a second cell of a second base station.

It should be noted that, in the case of inter-base station CA, the first base station may be a primary base station, and the second base station may be a secondary base station; then, the first cell may be a PCell, and the second cell may be an SCell. In addition, the first base station may be a secondary base station, and the second base station may be a primary base station; then, the first cell may be an SCell, and the second cell may be a Pcell. The embodiment of the present invention does not set a limitation thereto.

PH may include type 1 (Type 1) PH and type 2 (Type 2) PH. Type 1 PH may be equal to maximum transmit power $P_{CMAX,c}$ configured by the UE on each serving cell in an activated state minus PUSCH transmit power thereof, and may be expressed as equation (1):

$$\text{Type 1 PH} = P_{CMAX,c} - \text{PUSCH transmit power} \qquad (1)$$

Type 2 PH may be equal to maximum transmit power $P_{CMAX,c}$ configured on a serving cell minus PUCCH transmit power and PUSCH transmit power thereof, and can be expressed as equation (2):

$$\text{Type 2 PH} = P_{CMAX,c} - \text{PUCCH transmit power} - \text{PUSCH transmit power} \qquad (2)$$

In the embodiment of the present invention, the first type PH information may include type 1 PH, and the second type PH information may include type 2 PH.

It should be noted that, when the first cell has an uplink resource, the first type PH information of the first cell may further include maximum transmit power of the first cell. When the second cell has an uplink resource, the first type PH information of the second cell may further include maximum transmit power of the second cell.

A condition for triggering PHR by the UE may include a downlink path loss change exceeds a preset threshold, a periodic PHR timer times out, a power management parameter (P-MPRc) change exceeds a preset threshold, and so on.

3520: The UE sends the extended PHR to the first base station, so that the first base station sends the extended PHR to the second base station, and the first base station and the second base station perform uplink power control according to the extended PHR.

After generating the extended PHR, the UE may send the extended PHR to the first base station according to the uplink resource of the first cell.

The first base station may send the extended PHR to the second base station through an X2 interface; and after the first base station and the second base station receive the extended PHR, the first base station and the second base station may perform uplink power control according to the extended PHR.

It should be noted that, after sending the extended PHR, the UE may enable or re-enable a prohibit PHR timer (prohibitPHR-Timer); and the UE cannot send the extended PHR again when the prohibit PHR timer is running. A duration of the prohibit PHR timer is generally much longer than a delay of the X2 interface. Therefore, the first base station or the second base station does not continuously receive the extended PHR sent by the UE or the PHR forwarded by the other base station within a short period of time, and fuzziness problems, for example, it is difficult for the first base station or the second base station to determine which extended PHR is the latest one, do not exist.

In the embodiment of the present invention, the UE generates an extended PHR; because the extended PHR includes PH information of the first cell of the first base station and PH information of the second cell of the second base station, after the UE sends the extended PHR to the first base station, and the first base station sends the extended PHR to the second base station, the first base station and the second base station are capable of performing uplink power control according to the extended PHR.

Figure 36:
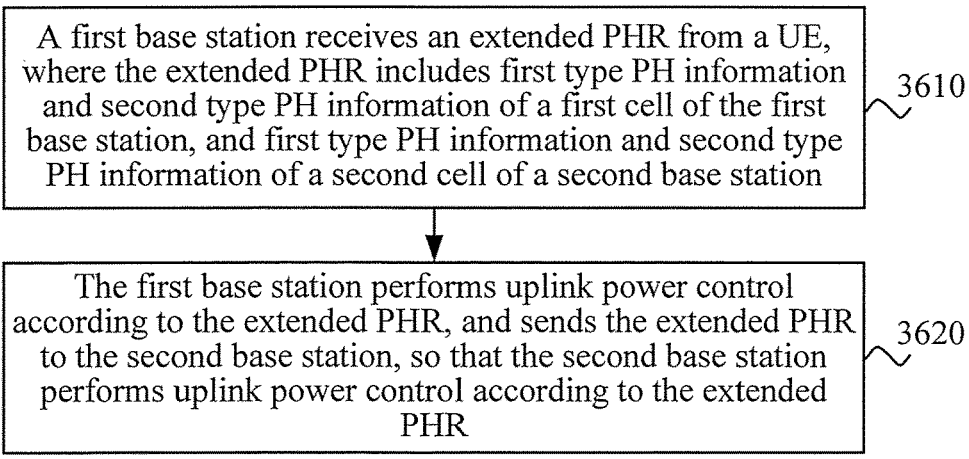
FIG. 36 is a schematic flowchart of an uplink power control method according to an embodiment of the present invention.

FIG. 36 is a schematic flowchart of an uplink power control method according to an embodiment of the present invention. The method of FIG. 36 is executed by a base station.

3610: A first base station receives an extended PHR from a UE, where the extended PHR includes first type PH information and second type PH information of a first cell of the first base station, and first type PH information and second type PH information of a second cell of a second base station.

It should be noted that, in the case of inter-base station CA, the first base station may be a primary base station, and the second base station may be a secondary base station. Then, the first cell may be a PCell, and the second cell may be an SCell. In addition, the first base station may further be a secondary base station, and the second base station may be a primary base station. Then, the first cell may be an SCell, and the second cell may be a Pcell, which is not limited in the embodiment of the present invention.

In the embodiment of the present invention, the first type PH information may include type 1 PH, and the second type PH information may include type 2 PH.

3620: The first base station performs uplink power control according to the extended PHR, and sends the extended PHR to the second base station, so that the second base station performs uplink power control according to the extended PHR.

In the embodiment of the present invention, the first base station receives an extended PHR from the UE, and sends the extended PHR to the second base station; because the extended PHR includes PH information of the first cell of the first base station and PH information of the second cell of the second base station, both the first base station and the second base station are capable of performing uplink power control according to the extended PHR.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working procedure of the foregoing system, apparatus, and unit, reference may be made to a corresponding procedure in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments. In addition, functional units in the embodiments of the present invention may be integrated into one processing unit, or each of the units may exist alone physically, or two or more units may be integrated into one unit.

When the functions are implemented in a form of a software functional module and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any mediums that can store program code, such as a USB flash drive, a removable hard disk, a read-only memory (Read-Only Memory, ROM), a random access memory (Random Access Memory, RAM), a magnetic disk, or an optical disc. The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    sending, by a first base station, a request to a second base station for configuration of a second cell, the request comprising data radio bearer (DRB) configuration information, wherein the DRB configuration information comprises an evolved radio access bearer (E-RAB) quality of service (QoS) parameter and a DRB identifier, and the E-RAB QoS parameter is a QoS parameter after a splitting decision made by the first base station;
    receiving, by the first base station, a response from the second base station, wherein the response comprises resource information of the second cell; sending, by the first base station, the resource information of the second cell to a user equipment (UE);
    receiving, by the first base station, an RRC connection reconfiguration complete message from the UE;
    sending, by the first base station, a configuration complete message to the second base station; and
    splitting, by the first base station, data of the DRB that is sent to the second base station.

2. The method according to claim 1, wherein the request is further used to instruct the second base station to create signaling radio bearer (SRB) for the UE.

3. The method according to claim 1, further comprising:
    receiving, by the first base station, a message sent from the second base station, wherein the message is used to indicate information about a buffer size for buffering split data to be sent from the first base station to the secondary base station.

4. The method according to claim 1, further comprising:
    receiving, by the first base station, extended Power Headroom Reporting (PHR), the PHR comprising:
        type 1 power headroom (PH) and type 2 PH of a first cell of the first base station; and
        type 1 PH of the second cell of the second base station.

5. An apparatus of a first base station, comprising:
    a processor configured to:
        split data of a data radio bearer (DRB) to be sent to the second base station;
    a transmitter configured to:
        send a request to a second base station for configuration of a second cell, the request comprising DRB configuration information, wherein the DRB configuration information comprises an evolved radio access bearer (E-RAB) quality of service (QoS) parameter and a DRB identifier, and the E-RAB QoS parameter is a QoS parameter after a splitting decision made by the first base station, and
        send a configuration complete message to the second base station after an RRC connection reconfiguration complete message is received;
    a receiver configured to receive a response from the second base station, wherein the response comprises resource information of the second cell; and
    wherein the transmitter is further configured to:
        send the resource information of the second cell to a user equipment (UE),
        receive the RRC connection reconfiguration complete message from the UE, and
        send the split data to the second base station.

6. The apparatus according to claim 5, wherein the request is further used to instruct the second base station to create signaling radio bearer (SRB) for the UE.

7. The apparatus according to claim 5, wherein:
    the receiver is further configured to receive a message sent from the second base station, wherein the message is used to indicate information a buffer size for buffering split data to be sent from the first base station to the secondary base station.

8. The apparatus according to claim 5, wherein the receiver is further configured to receive extended Power Headroom Reporting (PHR), the PHR comprising:
    type 1 power headroom (PH) and type 2 PH of a first cell of the first base station; and
    type 1 PH of the second cell of the second base station.

* * * * *